United States Patent [19]
Arai et al.

[11] Patent Number: 5,655,009
[45] Date of Patent: Aug. 5, 1997

[54] MODEM UNIT

[75] Inventors: Yasuhiro Arai; Nobuhide Maruo; Yoshiaki Narita, all of Kawasaki, Japan

[73] Assignee: Fujitsu Limited, Kawasaki, Japan

[21] Appl. No.: 32,114

[22] Filed: Mar. 17, 1993

[30] Foreign Application Priority Data

| Mar. 19, 1992 | [JP] | Japan | 4-064264 |
| Mar. 19, 1992 | [JP] | Japan | 4-064265 |
| Mar. 19, 1992 | [JP] | Japan | 4-064266 |
| May 18, 1992 | [JP] | Japan | 4-125110 |
| May 18, 1992 | [JP] | Japan | 4-125111 |
| May 28, 1992 | [JP] | Japan | 4-137253 |

[51] Int. Cl.$^6$ ............................. H04M 11/00
[52] U.S. Cl. ......................... 379/93.28; 455/558
[58] Field of Search ........................... 379/58, 59, 93, 379/94, 96, 97, 98, 99, 100, 413, 441, 442, 443, 444; 375/8, 9, 36; 439/55

[56] References Cited

U.S. PATENT DOCUMENTS

| 4,417,099 | 11/1983 | Pierce | 375/8 |
| 4,837,812 | 6/1989 | Takahashi et al. | 379/98 |
| 4,991,197 | 2/1991 | Morris | 379/98 |
| 5,031,208 | 7/1991 | Kawashima | 379/100 |
| 5,050,041 | 9/1991 | Shafi | 375/8 |
| 5,113,434 | 5/1992 | Fox | 379/413 |
| 5,127,041 | 6/1992 | O'Sullivan | 379/59 |
| 5,161,169 | 11/1992 | Galano et al. | 375/8 |
| 5,181,240 | 1/1993 | Sakuragi et al. | 375/8 |
| 5,183,404 | 2/1993 | Aldous et al. | 439/55 |
| 5,192,999 | 3/1993 | Graczyk et al. | 379/100 |
| 5,249,218 | 9/1993 | Sainton | 379/93 |

FOREIGN PATENT DOCUMENTS

| 55-37046 | 3/1980 | Japan . |
| 61-30847 | 2/1986 | Japan . |
| 20 61 672 | 5/1981 | United Kingdom . |

OTHER PUBLICATIONS

PCMCIA PC Card Standard, Release 2.1, Jul. 1993, pp. i–3–28.

J. Krebs, "Portable Computer and Host Talk Over Radio–Frequency Link", Electronics International, vol. 56, No. 17, Aug. 1983, pp. 142–145.

S. Edison, "Single Chip FSK Modem for Leased Line and Videotex", Electronic Engineering, vol. 56, No. 690, Jun. 1984, pp. 55–58, 61, 62, 65.

"Direct–Coupled Modem", Elektor, No. 10, Oct. 1984, pp. 48–55.

Patent Abstracts of Japan, vol. 11, No. 209 (E–521), Jul. 7, 1987 & JP-A-62 029 344 (Toshiba), Feb. 7, 1987.

Patent Abstracts of Japan, vol. 12, No. 458 (P–794), Dec. 2, 1988 & JP-A-63 180 121 (Toshiba Corp.) Jul. 25, 1988.

The article "Computer Shopper", Feb. 1992, p. 457.

Primary Examiner—Stella Woo
Attorney, Agent, or Firm—Staas & Halsey

[57] ABSTRACT

A modem unit is adapted to be coupled between a land or radio telephone line and a terminal equipment. The modem unit is provided with a modem circuit for modulating data received from the terminal equipment and for demodulating data transmitted to the terminal equipment. Additionally an isolation circuit for providing a DC isolation between the telephone line and the terminal equipment is included. The modem circuit and the isolation circuit are respectively provided on a single modem integrated circuit card.

13 Claims, 35 Drawing Sheets

F I G. 31
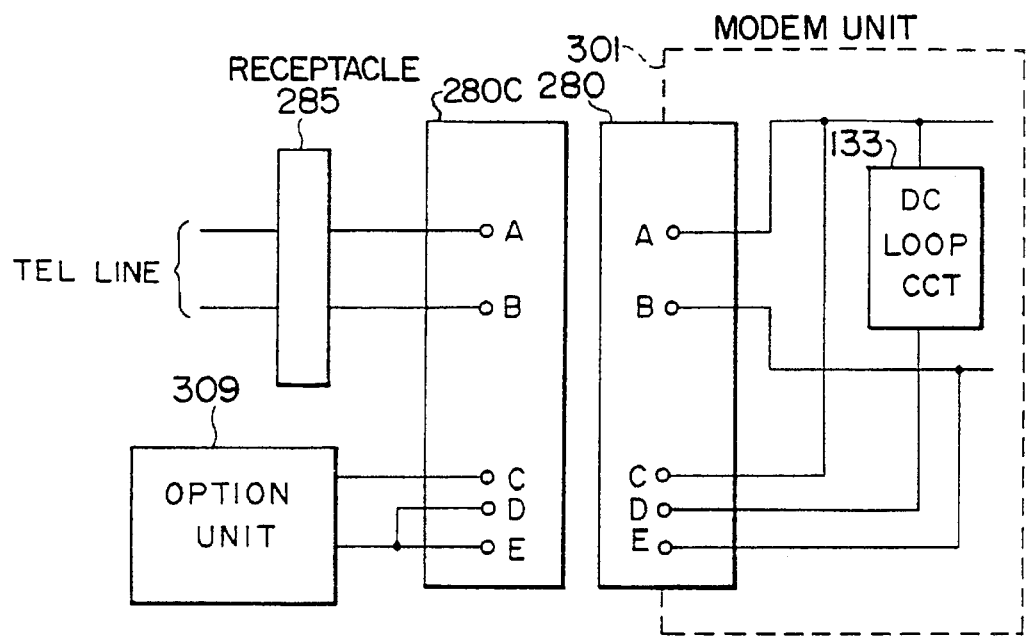
F I G. 32
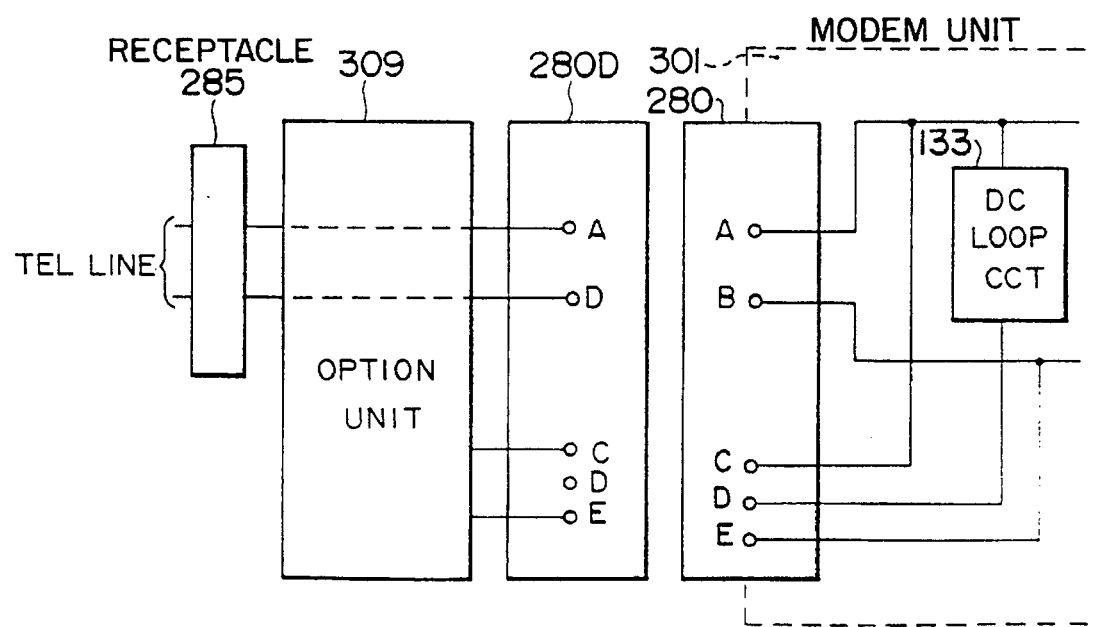

F I G. 33
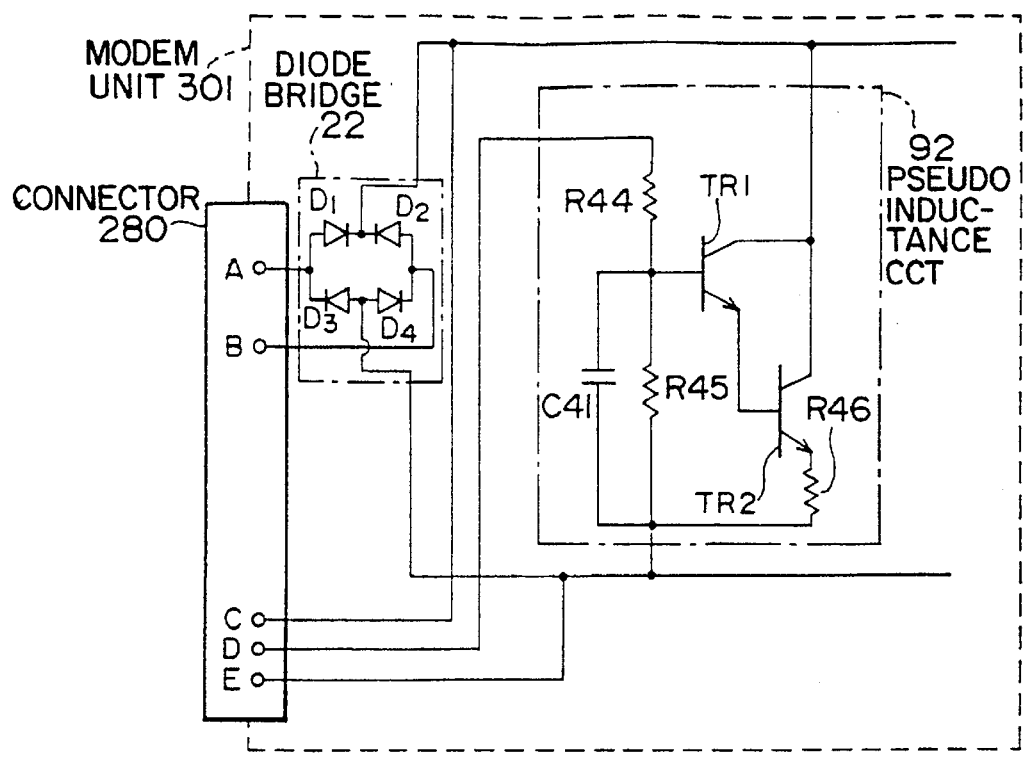
F I G. 34
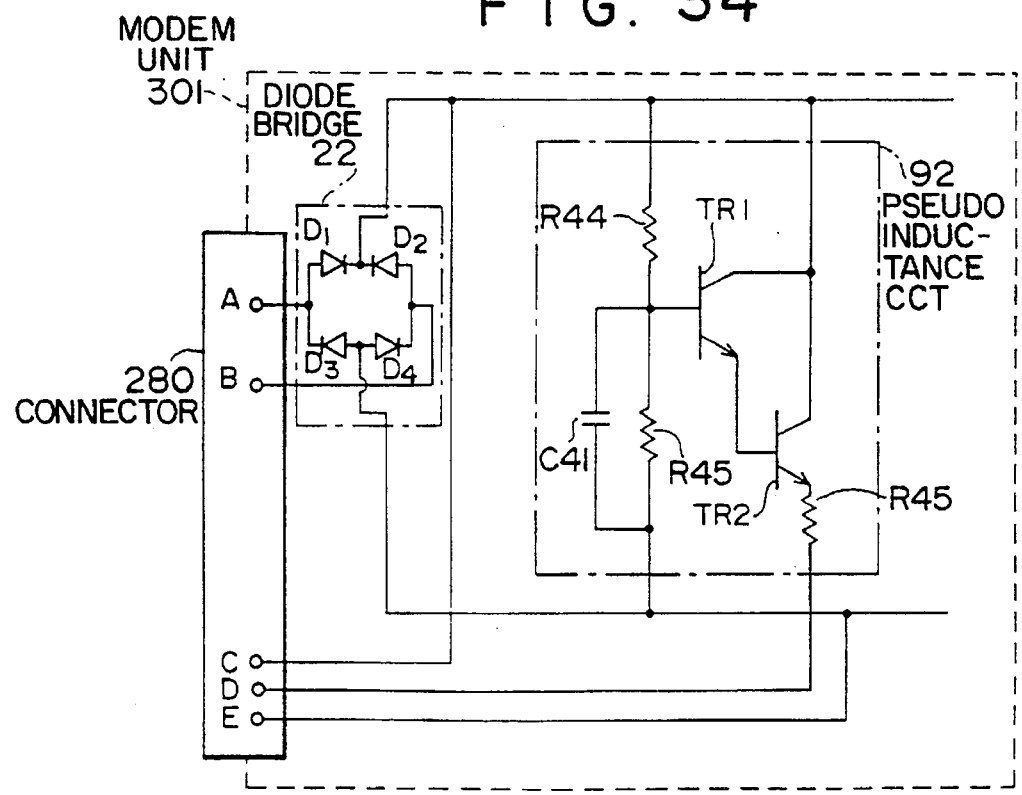

MODEM UNIT

BACKGROUND OF THE INVENTION

The present invention generally relates to modem units, and more particularly to a modem unit which enables a data exchange between personal computers and the like, via a telephone line.

The size and thickness of portable personal computers, portable word processors and the like have been reduced by recent technological development, and they continue to be further reduced. Additionally, data communications between computers via telephone lines have also become popular.

When making such data communications, a modem converts a digital signal into an analog signal and transmits the analog signal to the telephone line. The modem also receives the analog signal from the telephone line and converts the analog signal into a digital signal. In order to guarantee separation or isolation of the telephone line and a power source part of a data terminal equipment such as a computer, a line transformer is provided in the modem. For example, the DC line withstand voltage is set to 250 V and the isolation resistance is set to 1 MOhms or greater in Japan. The line withstand voltage may vary depending on the region or country, and other examples of the line withstand voltage are 1000 $V_{rms}$ (at AC 60 Hz) and 3.5 kV. The line transformer provides a coupling between the telephone line and the data terminal equipment with respect to the AC signal, and also provides DC isolation between the telephone line and the data terminal equipment.

The line transformer is bulky. For this reason, a conventional modem which uses the line transformer cannot be made thin and compact. Hence, it has been impossible to provide the conventional modem within a portable computer, an integrated circuit (IC) card and the like.

A description will now be given of the characteristics required of the modem, before explaining the construction of the conventional modem.

The following characteristics are required of a modem connected to a telephone line.

First, a circuit is required to form a DC current loop for capturing the telephone line. For example, such a circuit has a resistance of 50 to 300 Ohms at a current of 20 to 120 mA.

Second, it is necessary to isolate the telephone line and the modem unit with a high resistance with respect to the DC signal. For example, the high resistance must be 1 MOhms or greater at a DC voltage of 250 V.

Third, the AC signal must be transmitted between the telephone line and the circuit of the modem unit.

Fourth, although the AC signal on the side of the telephone line is comprised of balanced signals, the signals are processed as unbalanced signals on the side of the computer so that the circuits can be made in the form of an IC. Consequently, it is necessary to match the balanced and unbalanced signals.

Fifth, the signal which is transmitted on the telephone line is mixed with in-phase noise within the transmission path, and this in-phase noise must be eliminated.

The five requirements described above can easily be satisfied by the use of a line transformer. For this reason, the conventional modem unit is provided with a line transformer.

FIG. 1 shows an example of the conventional modem unit. In FIG. 1, a ring detection circuit 102 is connected to a telephone line 101 which connects to an exchange 100. The ring detection circuit 102 detects a calling signal from a remote end. Hook switches 103 respond to the on-hook/off-hook of the receiver. A line transformer 104 couples a primary side line (telephone line side) and the secondary line side (modem circuit side) with respect to the AC signal but provides a DC isolation between the two.

A modem circuit 105 converts an analog signal into a digital signal, and converts a digital signal into an analog signal. An interface 106 on the side of the modem unit couples the modem circuit 105 and an interface 107 of a data terminal equipment 108. The interface 107 on the side of the data terminal equipment 108 couples the data terminal equipment 108 and the interface 106 of the modem unit.

When the calling signal is input from the exchange 100 via the telephone line 101, the ring detection circuit 102 operates and inputs the calling signal to the modem circuit 105. The modem circuit 105 closes the hook switches 103 in response to the calling signal. The AC signal on the primary side line which is received from the telephone line 101 is transmitted to the secondary side via the line transformer 104. Hence, the analog signal is converted into the digital signal in the modem circuit 105, and the digital signal is input to the data terminal equipment 108 via the interfaces 106 and 107.

When transmitting data from the data terminal equipment 108 to the telephone line 101, the modem circuit 105 closes the hook switches 103 and makes a data transmission request with respect to the remote end. When the remote end answers, the modem circuit 105 converts the digital signal into the analog signal which is an AC signal, and this AC signal is transmitted to the primary side line via the line transformer 104. In addition, this AC signal is transmitted to the remote end via the telephone line 101.

A description will now be given of the transformer function of the conventional modem unit shown in FIG. 1, by referring to FIGS. 2(A) through 2(C).

FIG. 2(A) shows a case where a line transformer is used in the modem unit, and the illustration of other circuit parts is omitted. When a line transformer 120 is used, all of the five requirements described above are satisfied.

In other words, the DC loop is formed by the primary side line and the first demand is satisfied. The DC isolation between the primary side line and the secondary side line is achieved because the line transformer 120 is used, and the second demand is satisfied. The transmission of the AC signal is achieved because the line transformer 120 is used, and the third demand is satisfied. Matching of the balanced and unbalanced signals can also be accomplished since the line transformer 120 is used, and the fourth demand is satisfied. Furthermore, noise elimination can be made and the fifth demand can be satisfied for the following reasons.

Specifically, the noise which is mixed on the telephone line in the transmission path is transmitted via two wires, as in-phase signals, where the telephone line is comprised of two wires L1 and L2. For this reason, the in-phase signals when input to the line transformer 120 cause magnetic fluxes to cancel each other, and the noise component will not be transmitted to the secondary side of the line transformer 120.

Therefore, the line transformer 120 can easily satisfy the demands with respect to the modem unit. However, there is a problem in that the line transformer 120 is bulky because of the need for a DC current to flow, which is necessary to capture the line.

Accordingly, it is possible to provide a DC current loop independent of the line transformer as shown in FIG. 2(B), so that no DC current flows to the line transformer.

In FIG. 2(B), a repeater transformer 130 does not supply a DC component to the primary side and transmits only the AC component to the secondary side. A capacitor 131 is provided to cut off the DC component, and a loop coil 132 is provided to supply a DC current from the telephone line (L1, L2).

The repeater transformer 130 also satisfies the first, third, fourth and fifth demands of the modem unit, similarly to the line transformer 120. In addition, the second demand of the modem unit is satisfied by the loop coil 132.

However, there is a problem in that the size of the loop coil 132 cannot be reduced satisfactorily.

FIG. 2(C) shows a case where the DC current loop is formed by an active element. In a pseudo inductance circuit 140 shown in FIG. 2(C), a diode bridge 141 is provided so that the polarity of the operating voltage of a pseudo inductance 140 is maintained constant even if the polarity of the telephone line (L1, L2) is inverted. A capacitor C1 is provided to bypass the AC component so that the bias voltage of transistors TR1 and TR2 does not deviate by the AC component. Voltage dividing resistors R1 and R2 determine the bias voltage of the transistors TR1 and TR2. The transistors TR1 and TR2 form the DC current loop. An emitter resistance R3 forms the DC current loop together with the transistors TR1 and TR2.

A coupling capacitor C2 cuts off the DC voltage and passes only the AC component. In addition, a repeater transformer 142 is provided.

By the DC voltage biasing, an approximately constant DC current flows through the transistors TR1 and TR2 and the resistance R3 without being affected by the AC component. The DC voltage is cut off by the capacitor C2 and only the AC component is supplied to the primary side of the repeater transformer 142 and transmitted to the secondary side.

However, the conventional modem unit requires the line transformer, the repeater transformer, the loop coil or the like which are all bulky. Thus, the size of the modem unit cannot be reduced satisfactorily. As a result, it is impossible to accommodate all circuit parts of the modem unit including the transformer, within an IC card.

FIG. 3 shows another example of the conventional modem unit. A modem unit 200 basically corresponds to the modem unit shown in FIG. 2(C).

In the modem unit 200 shown in FIG. 3, input protection elements 201 protect the modem unit 200 from a high impulse voltage caused by a lightening or the like. A diode bridge 202 always maintains the polarity of the DC voltage which is applied to a modem circuit 210 constant even if the polarity of the DC voltage on the telephone line is inverted. An off-hook/dialing circuit 203 detects the off-hook and outputs a dial signal. A ring detection circuit 204 is comprised of a photocoupler 205, and detects the calling signal. The photocoupler 205 optically detects the calling signal.

A pseudo inductance circuit 206 bypasses the DC current from the telephone line. The pseudo inductance circuit 206 includes a capacitor C1, voltage dividing resistors R1 and R2, transistors TR1 and TR2, and coupling capacitors C2 and C3 for cutting off the DC current and passing the AC signal.

A line transformer 207 provides a DC isolation between the telephone line and a terminal equipment 211, and transmits the AC signal. A DC/DC converter 208 shifts the DC voltage on the telephone line, and supplies the shifted voltage to a modem circuit 210 as a power source voltage. A transformer 209 provides a DC isolation between the terminal equipment 211 and the telephone line. The modem circuit 210 modulates the output digital signal of the terminal equipment 211 into the analog signal, and also demodulates the analog signal from the telephone line into the digital signal.

When a call is made from the remote end, the ring detection circuit 204 is activated and the calling signal is detected by the photocoupler 205. When the calling signal is detected, the modem circuit 210 is notified.

The pseudo inductance circuit 206 bypasses the DC current from the telephone line. More specifically, the DC voltage is divided by the resistors R1 and R2 into the bias voltage of the transistors TR1 and TR2 which form a Darlington pair. The capacitor C1 presents the bias voltage of the transistor TR1 from deviating due to the AC component. Hence, an approximately constant current flows from the collector to the emitter of each of the transistors TR1 and TR2 regardless of the magnitude of the AC component. The DC current is cut off by the capacitors C2 and C3. For this reason, the DC current will not flow to the line transformer 207, and only the AC signal is input to the line transformer 207 and transmitted to the modem circuit 210.

The modem circuit 210 converts the output digital signal of the terminal equipment 211 into the analog signal, and transmits this analog signal to the telephone line via the line transformer 207, the capacitors C2 and C3 and the pseudo inductance circuit 206.

The DC/DC converter 208 subjects the DC voltage from the telephone line to a DC/DC conversion, and supplies the DC voltage to the modem circuit 210. The transformer 209 of the DC/DC converter 208 guarantees the DC isolation between the telephone line and the terminal equipment 211.

The off-hook/dialing circuit 203 is comprised of a photocoupler or the like, and transmits a dial signal by detecting an off-hook signal.

This modem unit 200 also uses the line transformer 210 which is bulky. For example, the line transformer 210 has a height of approximately 10 mm. Therefore, the modem unit 200 including the line transformer 210 cannot be made in the form of an IC circuit.

SUMMARY OF THE INVENTION

Accordingly, it is a general object of the present invention to provide a novel and useful modem unit in which the problems described above are eliminated.

Another and more specific object of the present invention is to provide a modem unit adapted to be coupled between a land or radio telephone line and a terminal equipment. The modem unit provided comprises modem circuit means, coupled to the terminal equipment, for modulating data received from the terminal equipment and for demodulating data transmitted to the terminal equipment; and isolation means, coupled to the modem circuit means, for providing a DC isolation between the telephone line and the terminal equipment, where the modem circuit means and the isolation means are respectively provided on a single modem integrated circuit card. According to the modem unit of the present invention, the entire modem unit is provided on the single modem integrated circuit card, thereby making it extremely convenient to carry the modem unit.

Still another object of the present invention is to provide the modem unit described above wherein the isolation means includes capacitor means, coupled to the telephone line, for cutting off a DC current from the telephone line and for passing an AC signal from the telephone line. The modem unit further comprises a first differential circuit having a non-inverting input terminal which receives a received signal from one wire of the telephone line via the capacitor means, an inverting input terminal which receives a received signal from the other wire of the telephone line via the capacitor means, and an output terminal which supplies an output analog signal to the modem circuit means wherein the analog signal is converted into a digital signal which is transmitted to the terminal equipment, and a second differential circuit having an input terminal which receives a digital signal which originates from the terminal equipment and is converted into an analog input signal in the modem circuit means, and a pair of output terminals which supply an analog signal having a polarity inverted with respect to the analog input signal and an analog signal having the same polarity as the analog input signal to the telephone line via the capacitor means. According to the modem unit of the present invention, no transformer is required.

A further object of the present invention is to provide the modem unit of the type described first above wherein the isolation means includes photocoupler means for optically exchanging signals between the modem circuit means and the terminal equipment. According to the modem unit of the present invention, no transformer is necessary.

Another object of the present invention is to provide the modem unit of the type described first above wherein the modem integrated circuit card has a shape and size which are approximately the same as those of a memory integrated circuit card which is provided with a slot through which a battery of the memory integrated circuit card is replaceable, and the modem integrated circuit card includes connecting means, provided at a predetermined position corresponding to that of the slot of the memory integrated circuit card, for coupling the modem unit to the telephone line. According to the modem unit of the present invention, it is possible to load the modem unit into the terminal equipment without the need to modify the construction of the terminal equipment which is designed to accept the existing memory integrated circuit card.

Still another object of the present invention is to provide the modem unit of the type described first above which further comprises network control means having terminals for coupling to the telephone line, and connector means having first terminals for coupling to the telephone line, the first terminals being coupled to the terminals of the network control means, where the isolation means includes hybrid circuit means for coupling the telephone line and the modem circuit means with respect to an AC signal. According to the modem unit of the present invention, it is possible to arbitrarily connect the modem unit to the land telephone line or the radio telephone line by use of the connector means.

A further object of the present invention is to provide the modem unit described immediately above wherein the connector means further includes second terminals coupled to the modem circuit means.

Another object of the present invention is to provide the modem unit described above having the connector means, wherein the connector means further includes a pair of second terminals which are coupled to the hybrid circuit means and a third terminal which is coupled to the network control means, the second and third terminals are connectable to an external unit, and one of the second terminals and the third terminals are short-circuited when no external unit is coupled to the modem unit.

Still another object of the present invention is to provide the modem unit of the type described first above which further comprises a battery for supplying power to various parts of the modem unit, detection means, coupled to the battery, for detecting an output voltage level of the battery, and selection means, coupled to the detection means, for selecting a frequency of a clock which drives the modem circuit means depending on the voltage level detected by the detection means, where the modem circuit means includes determination means, coupled to the detection means, for determining a modem function of the modem circuit means based on the voltage level detected by the detection means and function request information specified from the terminal equipment. According to the modem unit of the present invention, it is possible to automatically continue the data communication even if the voltage level of the battery falls, by reducing the clock frequency and reducing the modem functions.

Other objects and further features of the present invention will be apparent from the following detailed description when read in conjunction with the accompanying drawings.

DETAILED DESCRIPTION OF THE DRAWINGS

FIG. 1 is a system block diagram showing an example of a conventional modem unit;

FIGS. 2(A) through 2(C) show circuit diagrams for explaining the transformer function of the conventional modem unit;

Figure 28A:
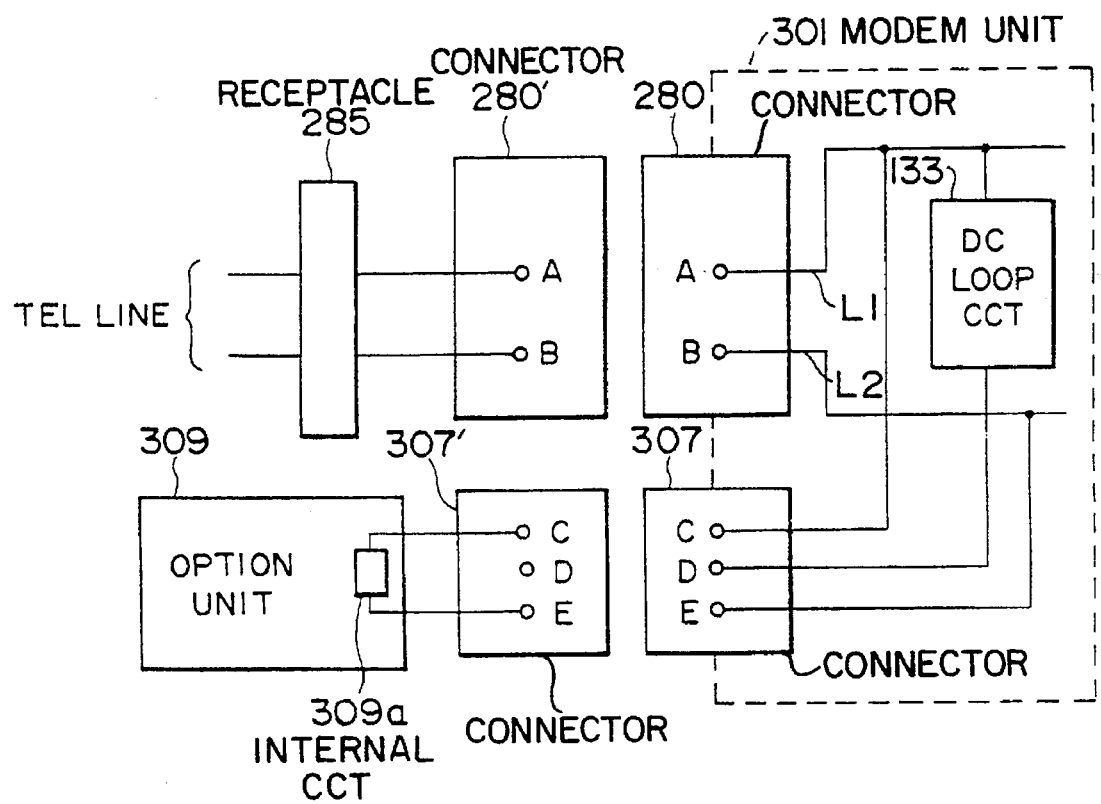
Figure 28B:
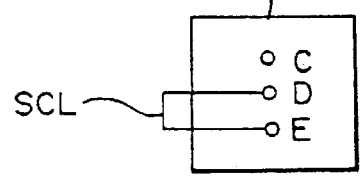
Figure 29A:
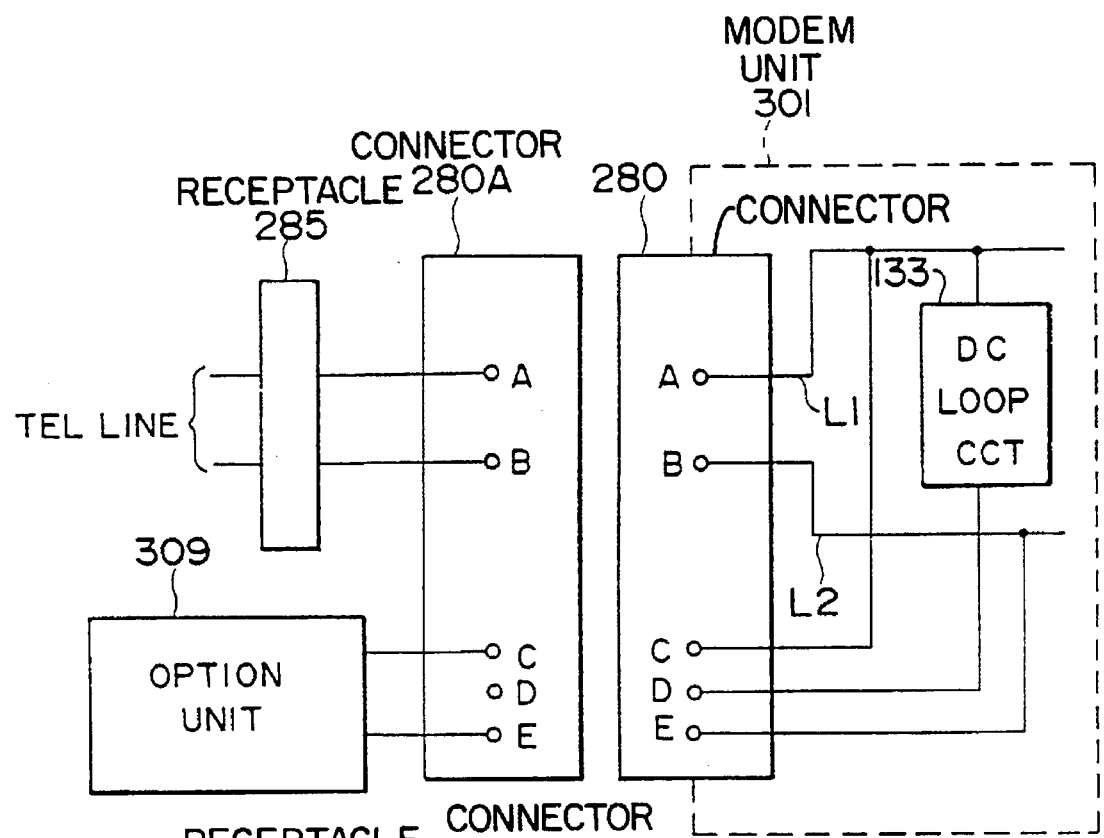
Figure 29B:
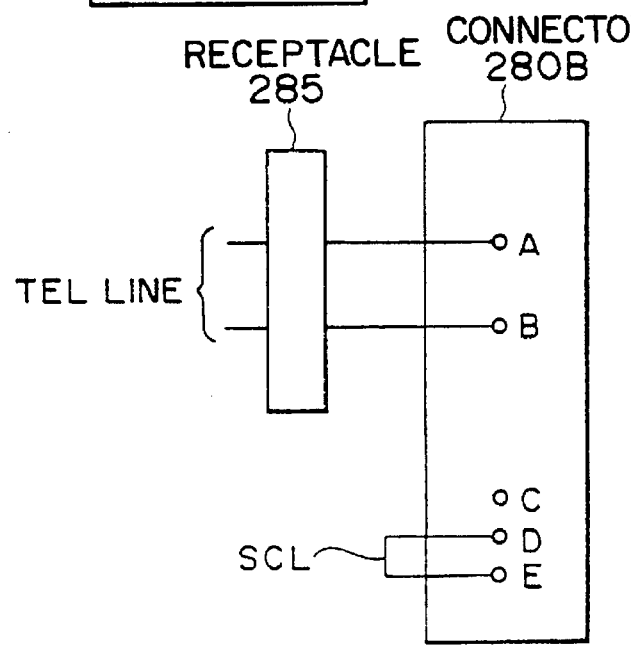
Figure 30A:
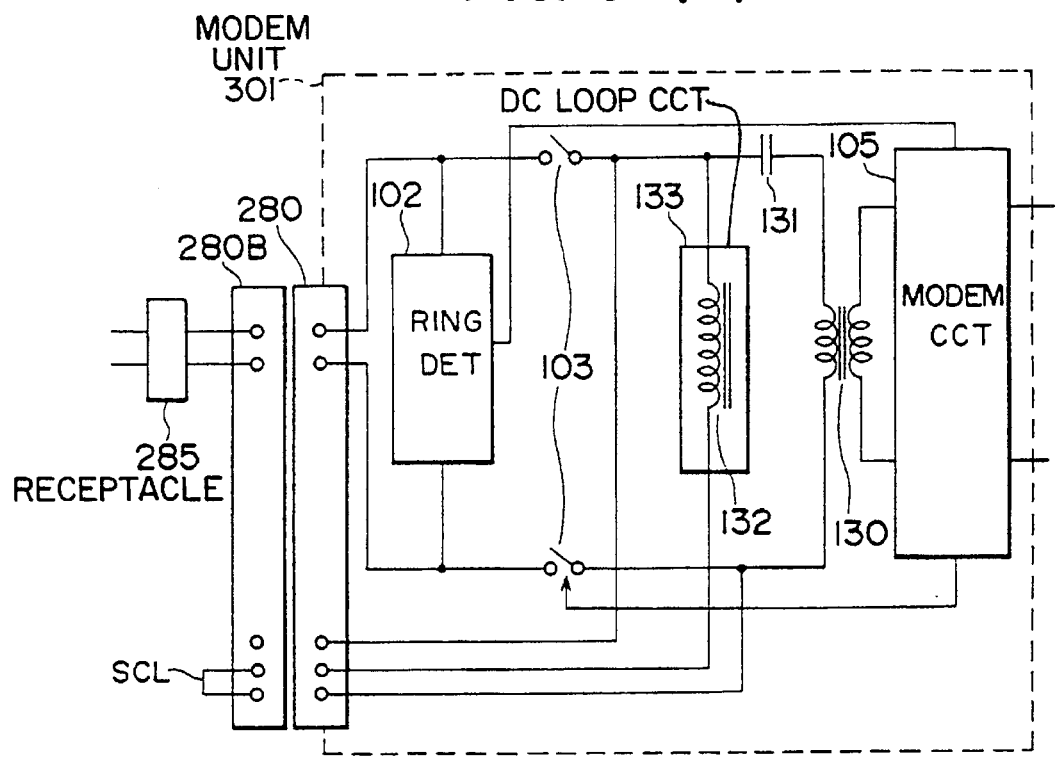
Figure 30B:
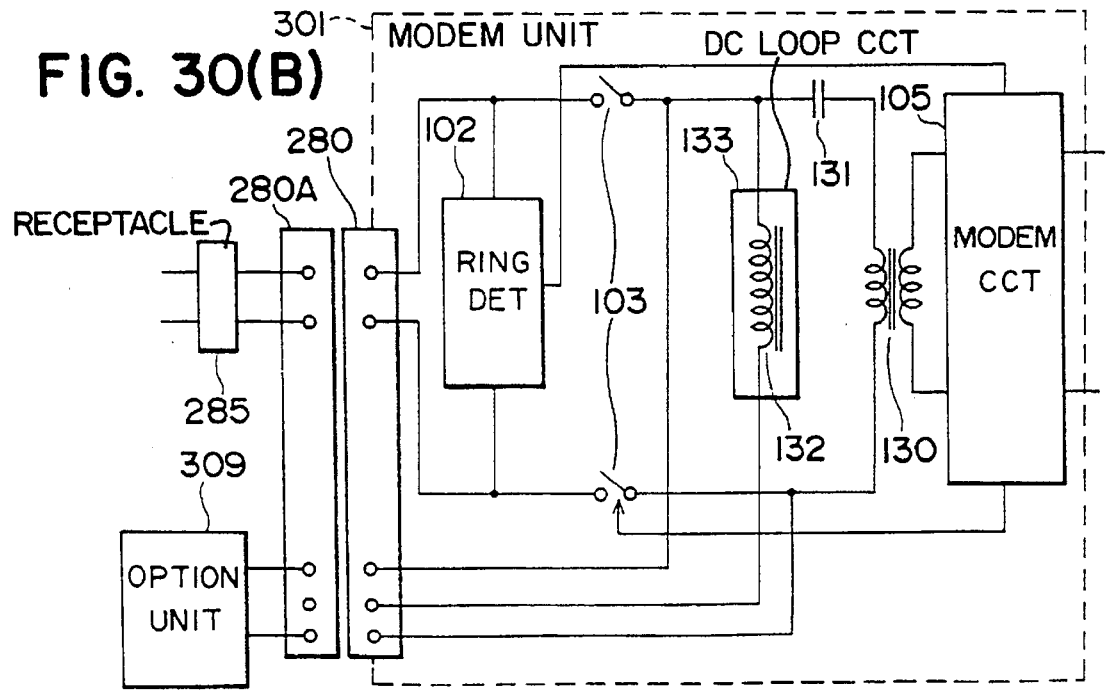
Figure 35:
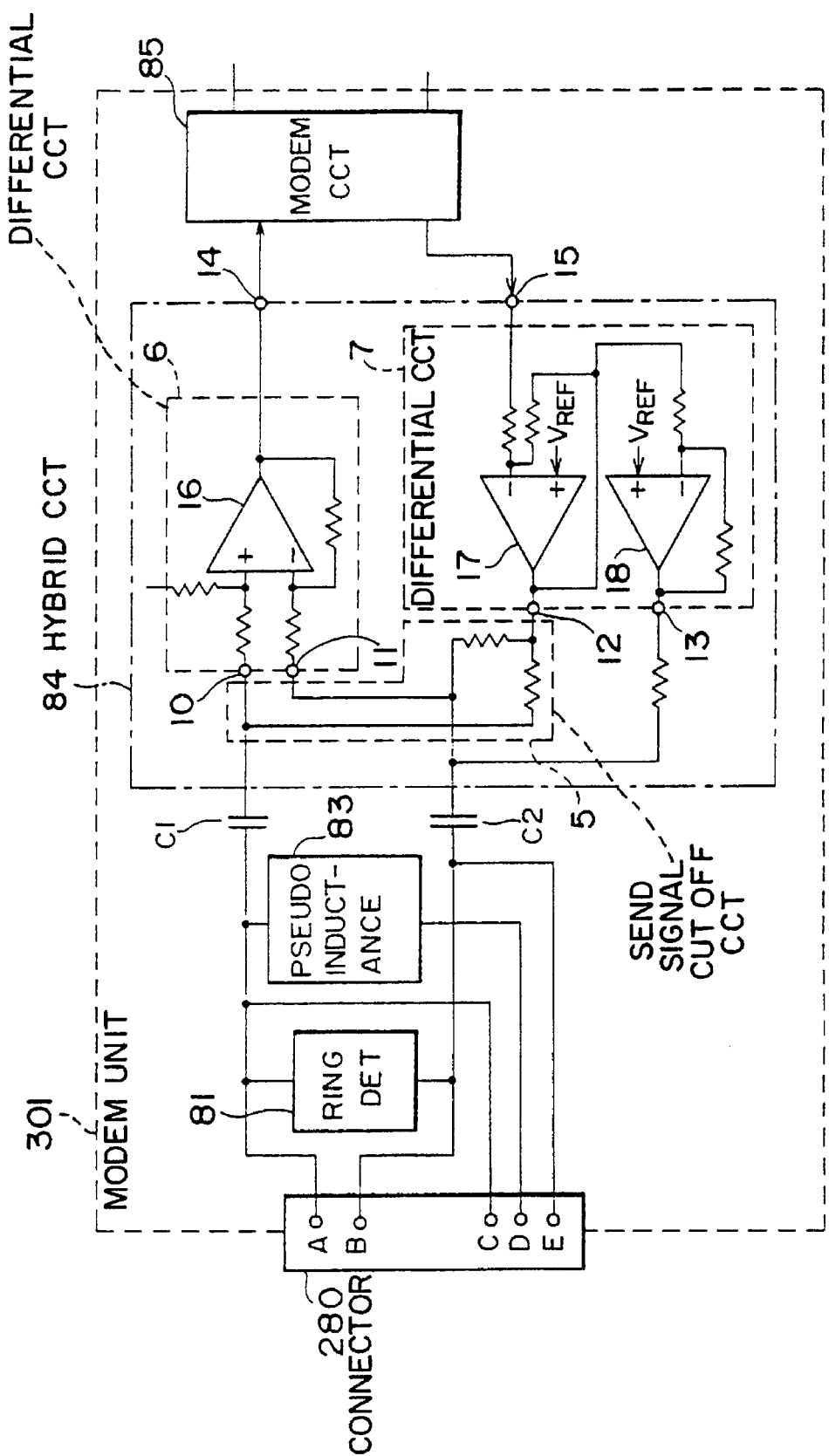
Figure 36:
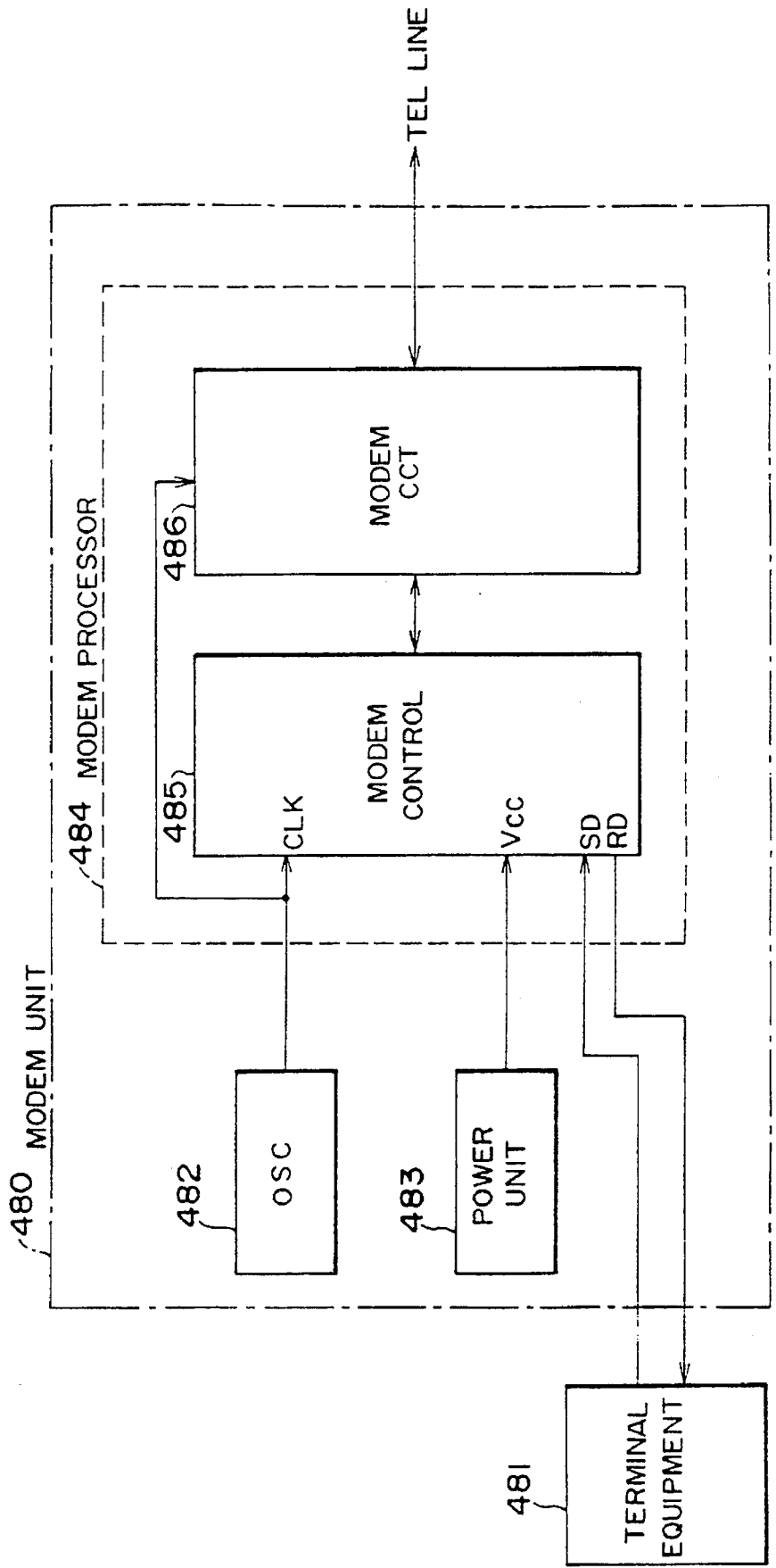
Figure 37:
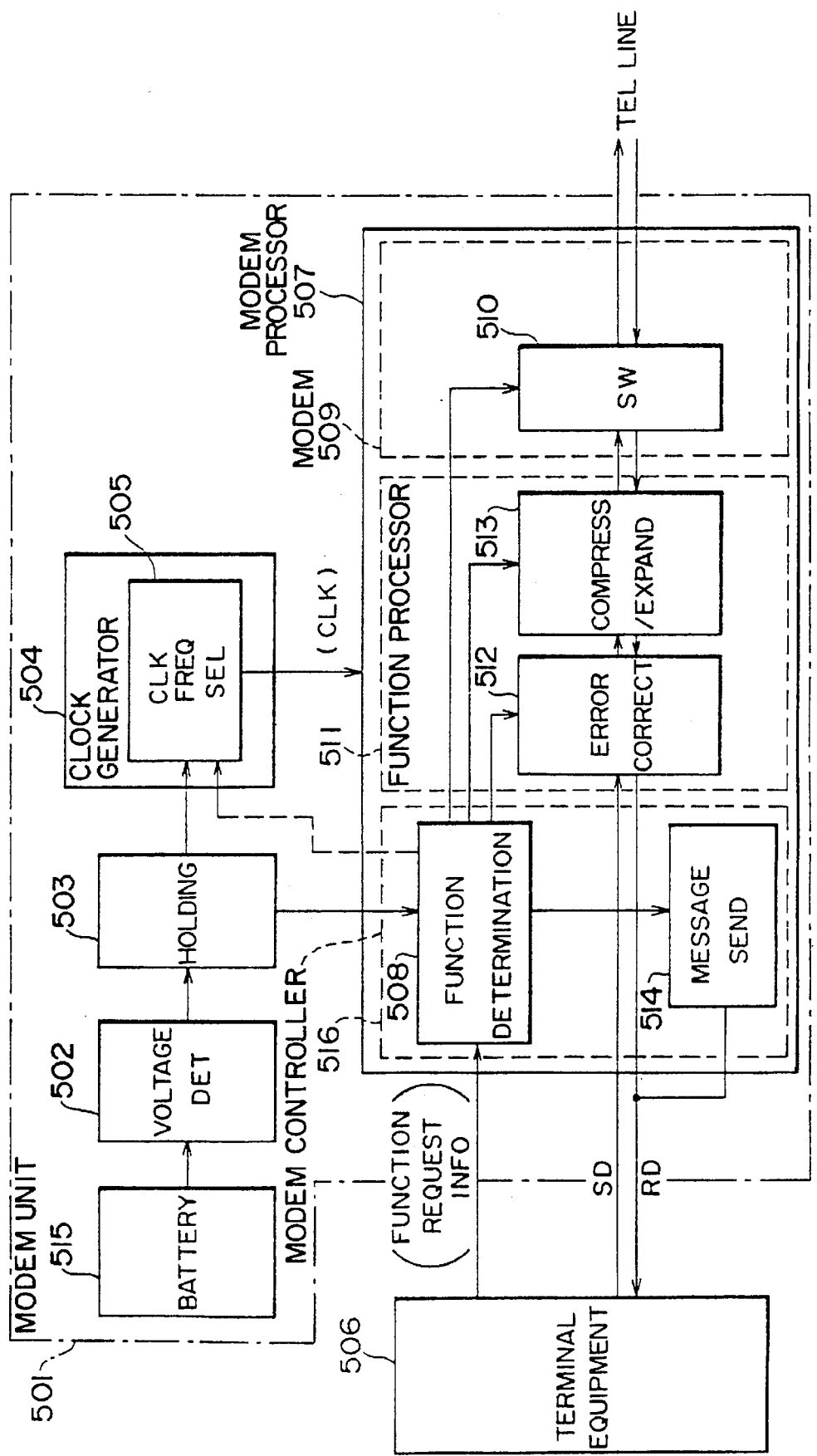
Figure 38:
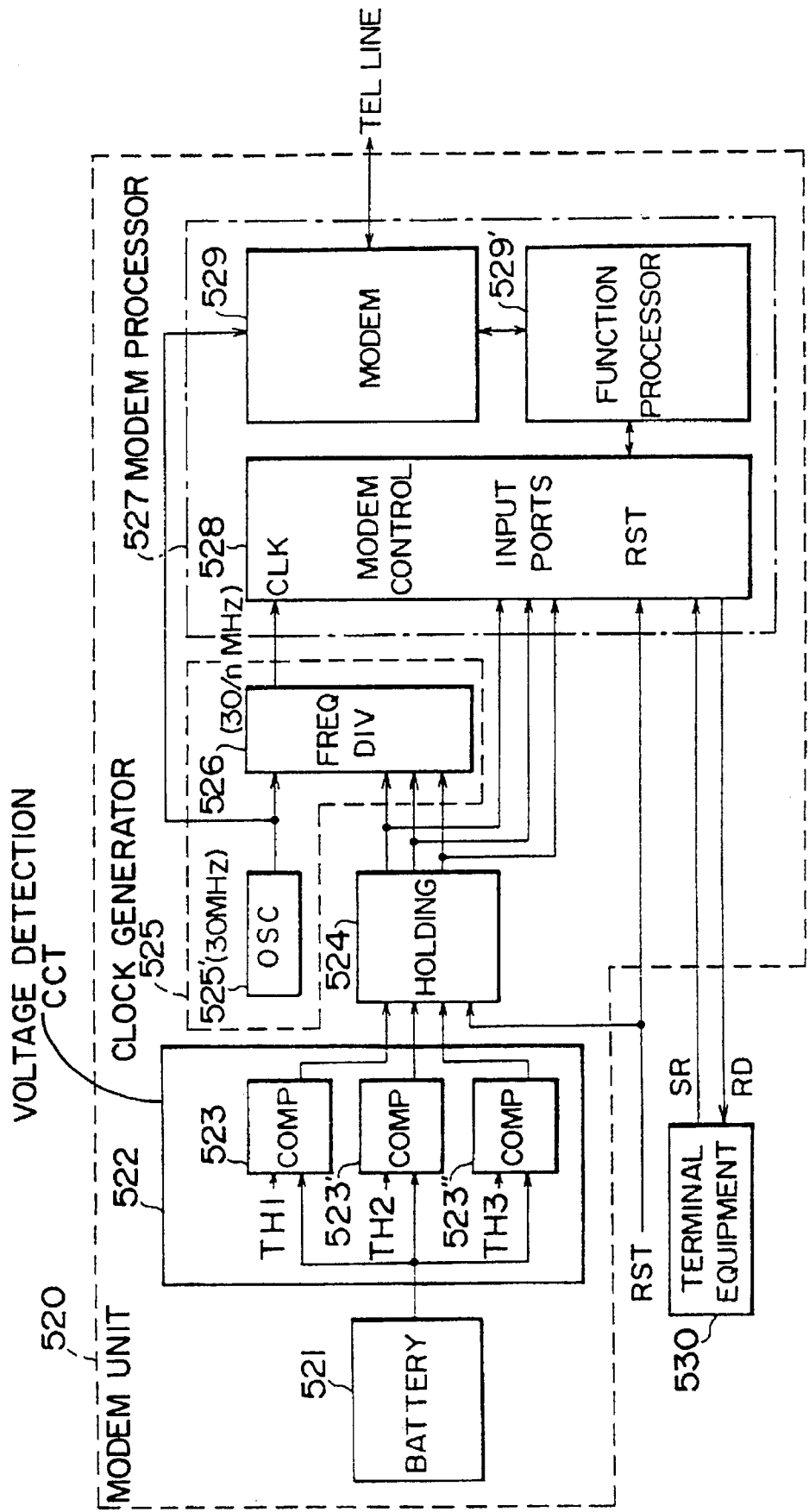
Figure 39:
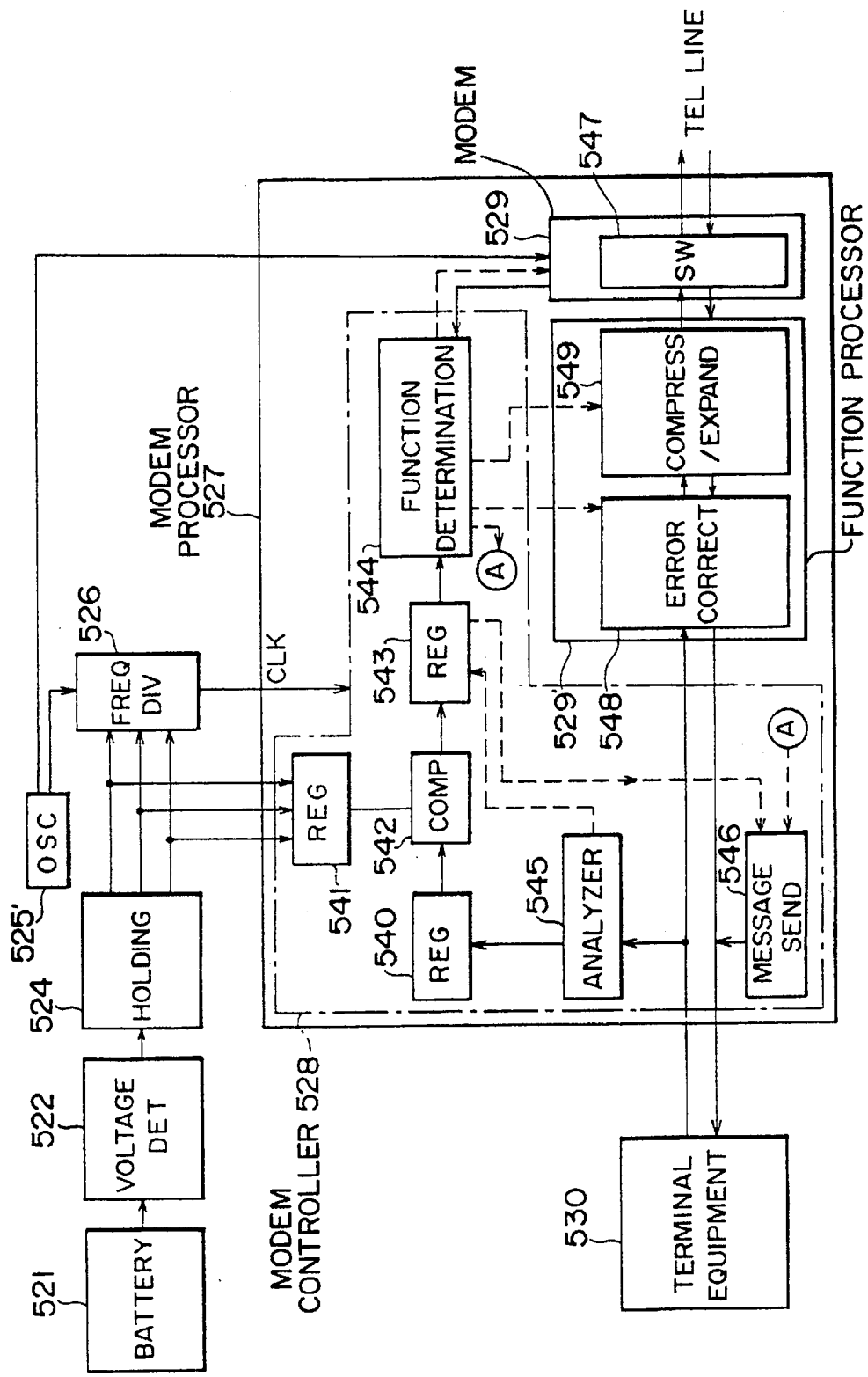
Figure 40:
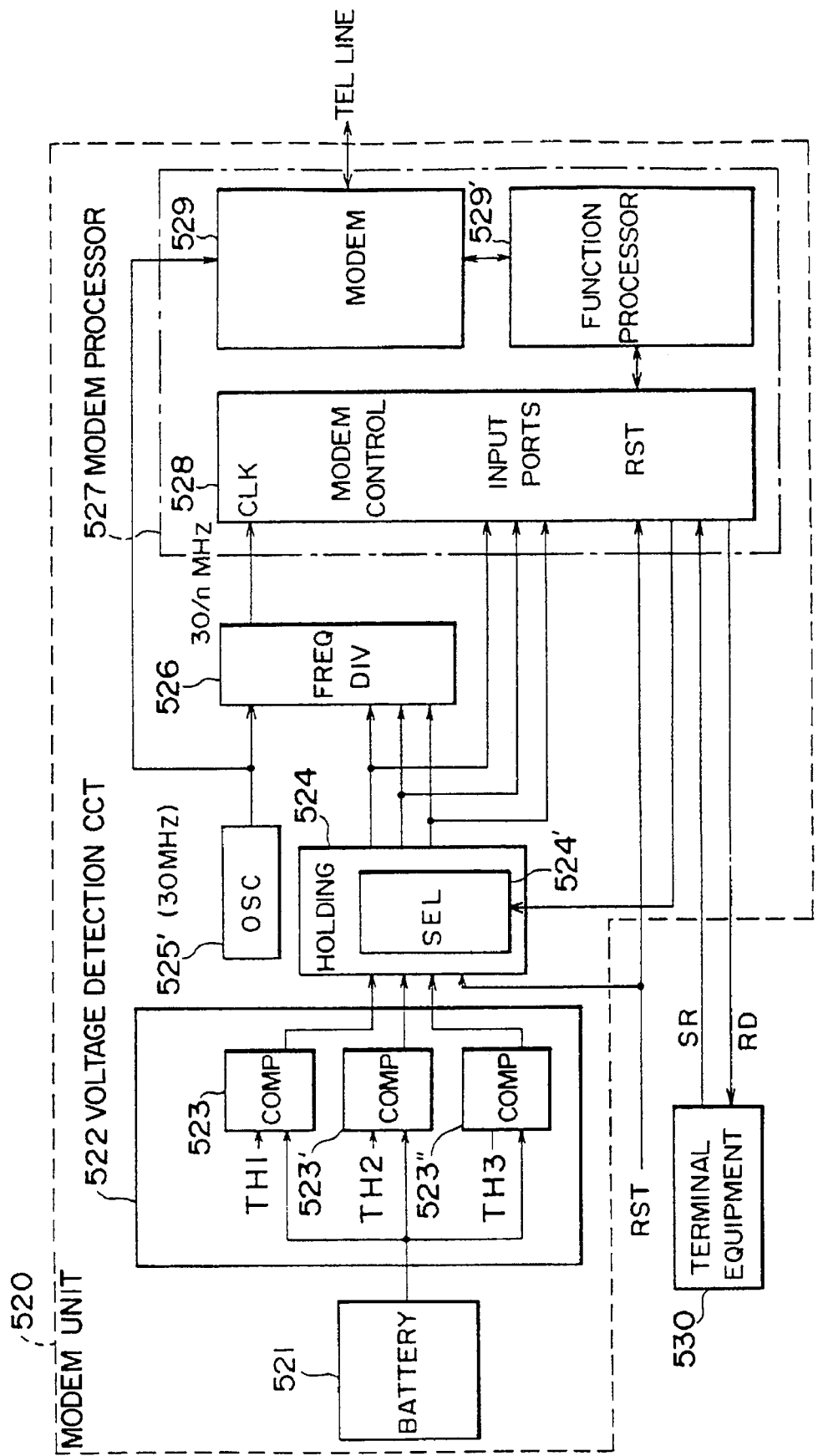

FIGS. 28(A) and 28(B) show an essential part of a sixth embodiment of the modem unit according to the present invention;

FIGS. 29(A) and 29(B) show an essential part of a seventh embodiment of the modem unit according to the present invention for explaining the operation principle thereof;

FIGS. 30(A) and 30(B) show the seventh embodiment in more detail;

FIG. 31 is a system block diagram showing an essential part of an eighth embodiment of the modem unit according to the present invention;

FIG. 32 is a system block diagram showing an essential part of a ninth embodiment of the modem unit according to the present invention;

FIG. 33 is a circuit diagram showing a tenth embodiment of the modem unit according to the present invention;

FIG. 34 is a circuit diagram showing an eleventh embodiment of the modem unit according to the present invention;

FIG. 35 is a system block diagram showing a twelfth embodiment of the modem unit according to the present invention;

FIG. 36 is a system block diagram for explaining the problems of a conventional battery-operated modem unit;

FIG. 37 is a system block diagram for explaining the operating principle of thirteenth and fourteenth embodiments of the modem unit according to the present invention;

FIG. 38 is a system block diagram showing the thirteenth embodiment;

FIG. 39 is a system block diagram showing an embodiment of a modem processor of the thirteenth embodiment;

FIG. 40 is a system block diagram showing the fourteenth embodiment; and

Figure 41:
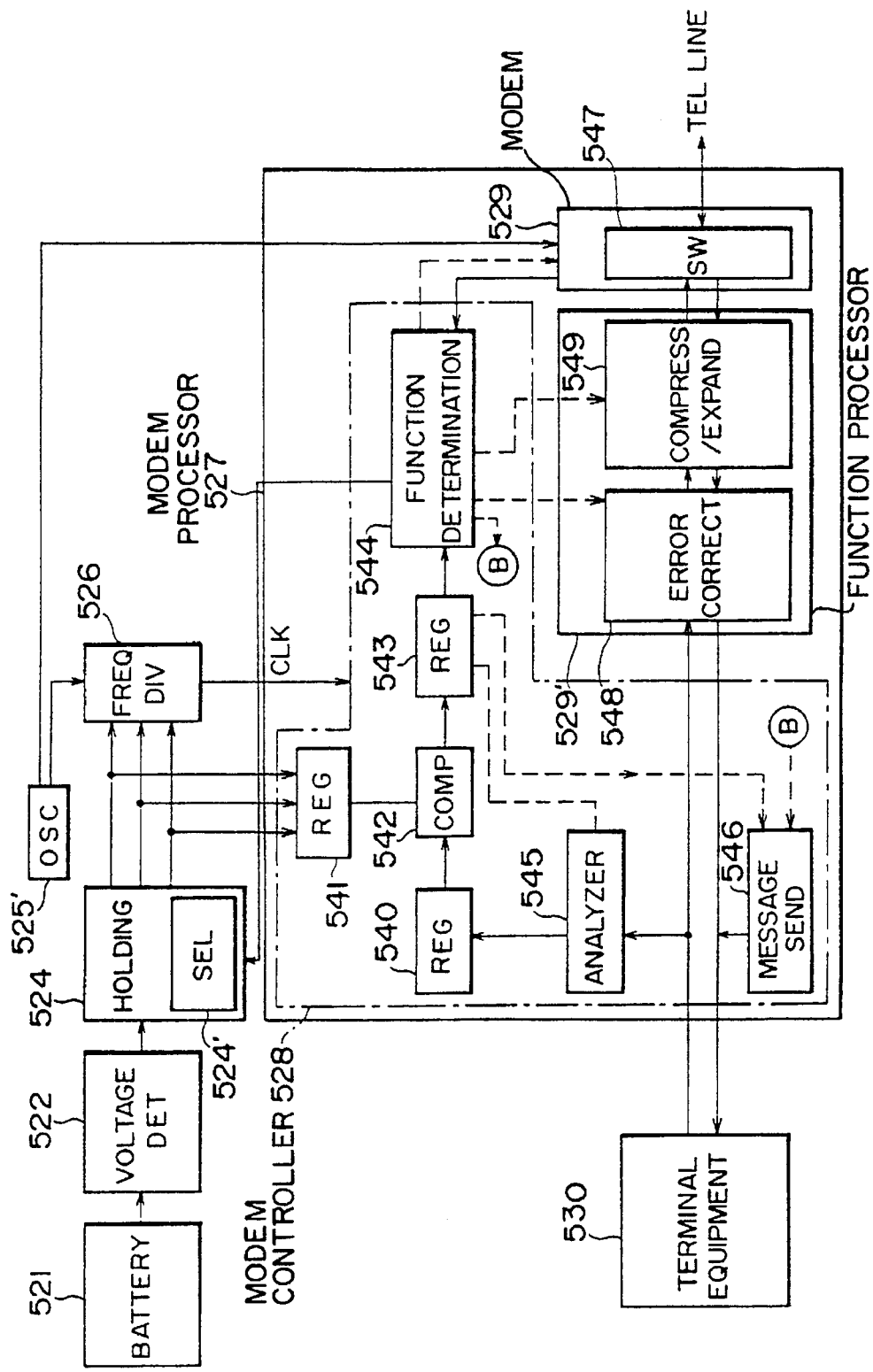

FIG. 41 is a system block diagram showing an embodiment of the modem processor of the fourteenth embodiment.

DETAILED DESCRIPTION OF THE INVENTION

First, a description will be given of the operating principle of a first embodiment of a modem unit according to the present invention, by referring to FIG. 4.

Figure 4:
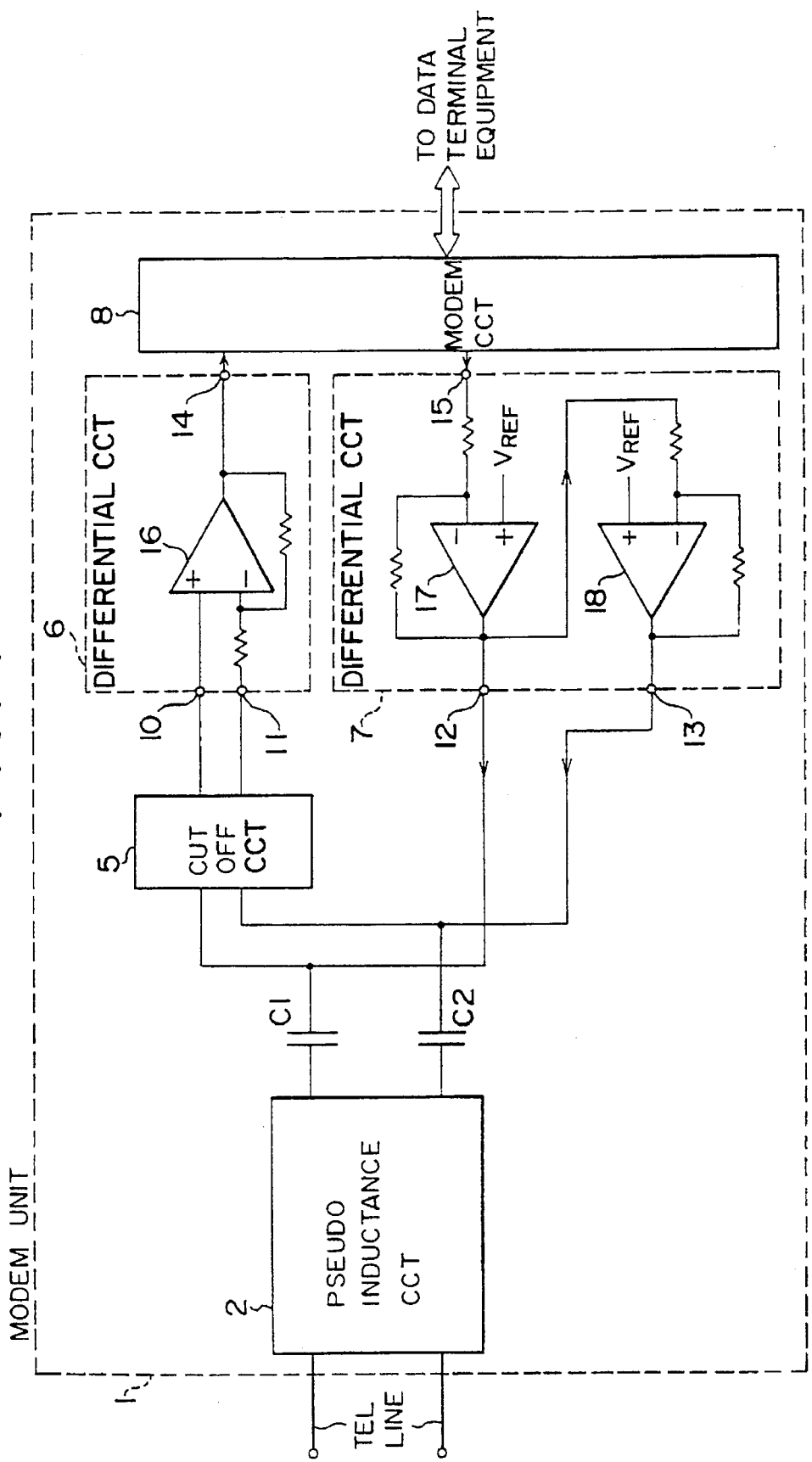
FIG. 4 is a system block diagram for explaining the operating principle of a first embodiment of a modem unit according to the present invention.

A modem unit 1 shown in FIG. 4 generally includes a pseudo inductance circuit 2, capacitors C1 and C2, a send signal cut off circuit 5, differential circuits 6 and 7, and a modem circuit 8. For example, the pseudo inductance circuit 2 has the same construction as the pseudo inductance circuit 140 shown in FIG. 2(C). The capacitors C2 and C3 cut off the DC current from a telephone line and pass only the AC signal. The send signal cut off circuit 5 prevents a send signal of the modem unit 1 from being input to a reception circuit thereof at the time of a transmission.

The differential circuit 6 receives one of analog balanced received signals output from the pseudo inductance circuit 2 to an inverting input terminal and the other to a non-inverting input terminal, and outputs analog unbalanced received signals. The differential circuit 7 receives analog unbalanced signals which are subjected to the digital-to-analog (D/A) conversion in the modem circuit 8, and outputs complementary output signals. More specifically, a signal which is inverted with respect to the input signal is output from one output terminal of the differential circuit 7, and a signal having the same polarity as the input signal is output from the other output terminal of the differential circuit 7.

The modem circuit 8 demodulates the analog received signal into the digital signal and supplies this digital signal to a data terminal equipment (not shown). In addition, the modem circuit 8 modulates the output digital signal of the data terminal equipment into the analog signal and supplies the analog signal to the telephone line.

The differential circuit 6 has a non-inverting input terminal 10, an inverting input terminal 11, and an output terminal 14 for outputting the received signal. In this particular case, the differential circuit 6 is comprised of an operational amplifier 16. The differential circuit 7 has an inverting output terminal 12, a non-inverting output terminal 13, and an input terminal 15 for receiving the send signal. In this particular case, the differential circuit 7 is comprised of operational amplifiers 17 and 18. A description will now be given of the operation of the modem unit 1. The DC current from the telephone line is cut off by the capacitors C1 and C2 and will not be input to the differential circuits 6 and 7.

When making a reception, the AC signal component from the telephone line is input to the differential circuit 6 via the pseudo inductance circuit 2 and the capacitors C1 and C2. The received signal is essentially comprised of balanced signals. Hence, the signal from the capacitor C1 is input to the non-inverting input terminal 10 of the differential circuit 6, and the signal from the capacitor C2 is input to the inverting input terminal 11 of the differential circuit 6. The polarity of the signal input to the inverting input terminal 11 is inverted using the input signal to the non-inverting input terminal 10 as a reference voltage, and is output from the output terminal 14. Accordingly, the differential circuit 6 outputs the input balanced signals as unbalanced signals.

When making a transmission, the modem circuit 8 converts the output digital signal of the data terminal equipment into the analog signal which is essentially comprised of unbalanced send signals. For example, the send signal is input to the inverting input terminal of the operational amplifier 17 within the differential circuit 7, and the polarity-inverted signal is output from the inverting output terminal 12. In addition, the output signal of the operational amplifier 17 is input to the inverting input terminal of the operational amplifier 18, and the polarity-inverted signal is output from the non-inverting output terminal 13 as a signal having the same polarity as the signal input to the input terminal 15. A reference voltage $V_{REF}$ is input to the non-inverting input terminals of the operational amplifiers 17 and 18. The outputs of the operational amplifiers 17 and 18 are output to the telephone line via the capacitors C1 and C2 and the pseudo inductance circuit 2, as balanced signals.

Of course, the constructions of the differential circuits 6 and 7 are not limited to those shown in FIG. 4, and the method of inputting the signals thereto are also not limited to that shown in FIG. 4.

Figure 5:
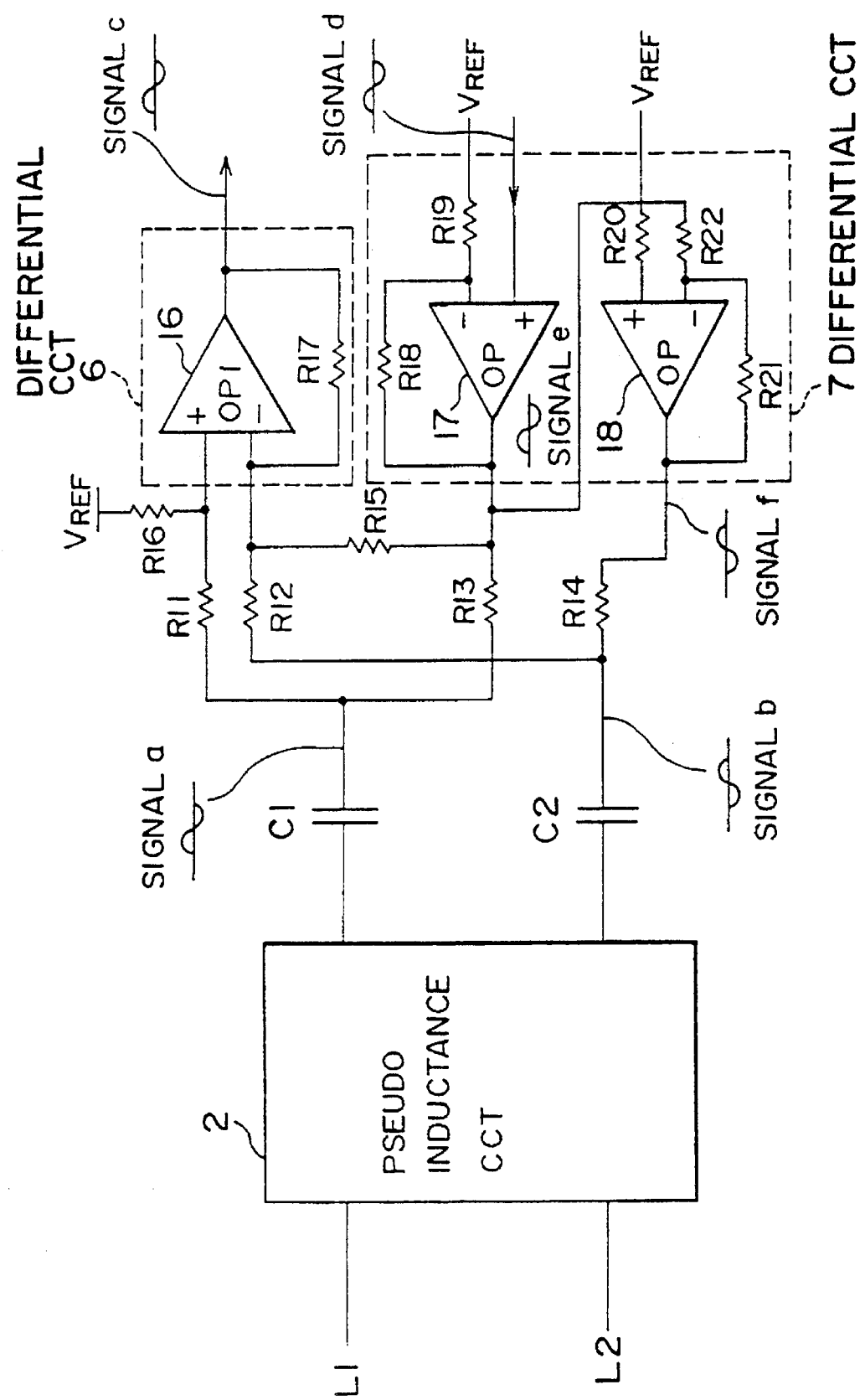
FIG. 5 is a system block diagram showing the first embodiment.

A description will now be given of the first embodiment, by referring to FIG. 5. In FIG. 5, those parts which are the same as those corresponding parts in FIG. 4 are designated by the same reference numerals, and a description thereof will be omitted.

In FIG. 5, the telephone line is comprised of two wires L1 and L2. A resistor R11 together with a resistor R16 determines the reference voltage which is input to the non-inverting input terminal of the operational amplifier 16 which forms the differential circuit 6, based on the AC component which is input from the wire L1. A resistor R12 together with a resistor R17 determines the amplification of the operational amplifier 16 with respect to the AC component which is input from the wire L2. The resistor R17 forms a negative feedback resistance of the operational amplifier 16. Resistors R13 and R14 determine the impedance of the modem unit with respect to the AC component.

A resistor R15 prevents the send signal of the modem unit from being input to the differential circuit 6 as a received signal at the time of the transmission. A resistor R18 forms a negative feedback resistance of the operational amplifier 17, and determines the amplification of the operational amplifier 17 together with a resistor R19. A resistor R20 is provided to stabilize the operation of the operational amplifier 18. A resistor R21 forms a negative feedback resistance of the operational amplifier 18, and determines the amplification of the operational amplifier 18 together with a resistor R22.

When making a reception, a substantially balanced transmission takes place on the telephone line. For example, a send signal a having the waveform shown in FIG. 5 is output from the capacitor C1, and a signal b having the waveform shown in FIG. 5 is output from the capacitor C2. In this case, a signal c having the waveform shown is output from the operational amplifier 16. The signal a is input to the non-inverting input terminal of the operational amplifier 16 as the reference voltage. The signal b is input to the inverting input terminal of the operational amplifier 16. Hence, the output signal c of the operational amplifier 16 is inverted relative to the signal b. More specifically, the signal c is output based on the balanced signals a and b input to the operational amplifier 16.

When making a transmission, a send signal d having the waveform shown in FIG. 5, for example, is input to the differential circuit 7. This send signal d is input to the non-inverting input terminal of the operational amplifier 17. As a result, a signal e having the same phase as the signal d is output from the operational amplifier 17. This output signal e of the operational amplifier 17 is input to the inverting input terminal of the operational amplifier 18. Hence, a signal f is output from the operational amplifier 18. The output signals e and f of the differential circuit 7 are transmitted to the telephone line as balanced signals via the capacitors C1 and C2 and the pseudo inductance circuit 2.

In addition, an appropriate amount of the send signal e is applied to the inverting input terminal of the operational amplifier 16 via the resistor R15. As a result, the signal f which is applied to the inverting input terminal of the operational amplifier 16 via the resistors R14 and R12 and the signal e which is applied to the non-inverting input terminal of the operational amplifier 16 via the resistors R13 and R11 cancel each other, so that essentially no send signal is input to the differential circuit 6. Therefore, it is possible to prevent the send signal from being input to the modem unit as a received signal at the time of the transmission.

According to this first embodiment, the transformer function and the loop coil function with respect to the DC current are realized by active circuits including no transformer. For this reason, it is possible to make the entire modem unit in the form of an IC, and the modem unit as a whole can be made thin. More specifically, it is possible to accommodate the entire modem unit within an IC card.

A description will now be given of the operating principle of a second embodiment of the modem unit according to the present invention, by referring to FIG. 6.

Figure 6:
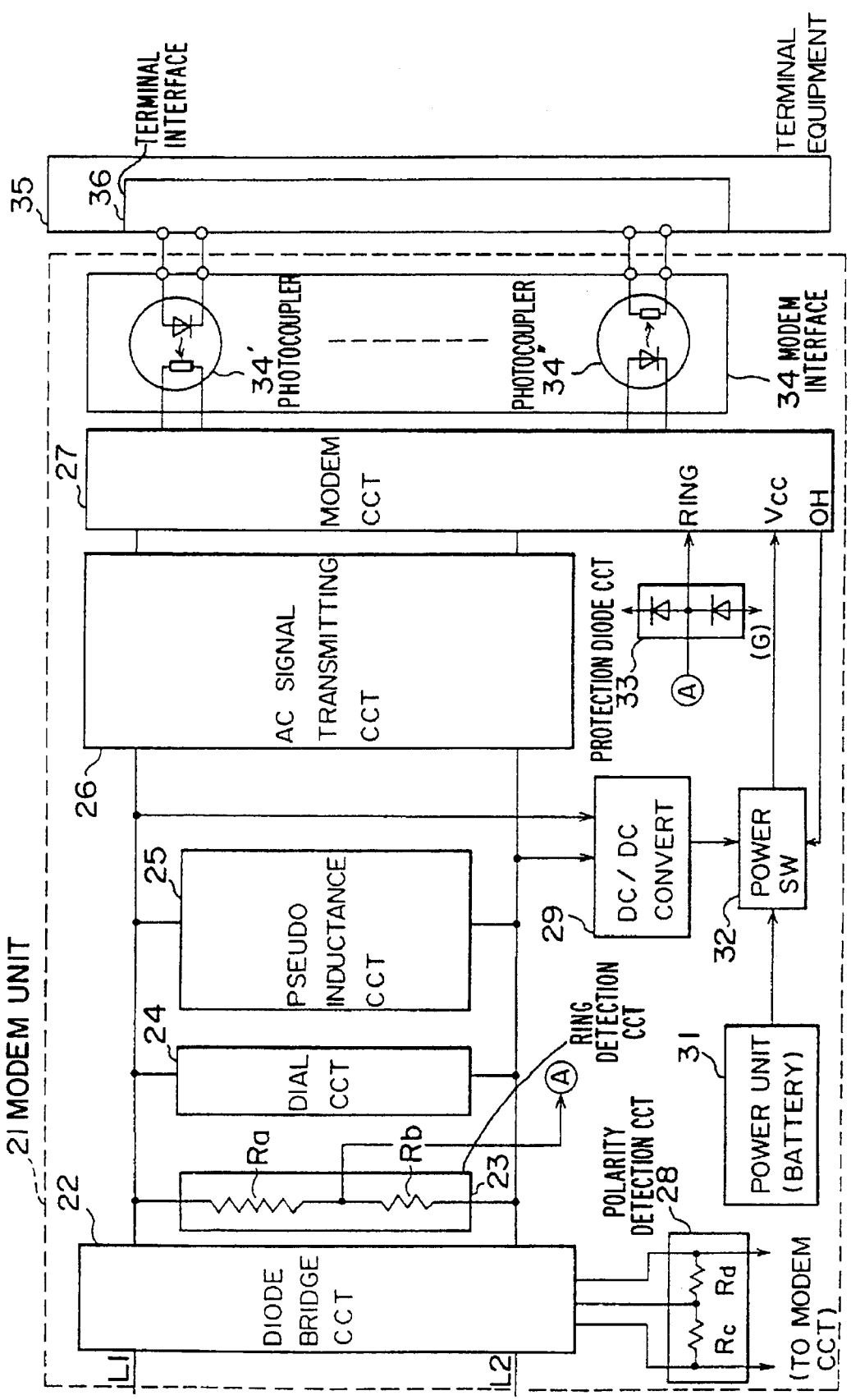
FIG. 6 is a system block diagram for explaining the operating principle of a second embodiment of the modem unit according to the present invention.

In FIG. 6, a modem unit 21 includes a diode bridge 22, a ring detection circuit 23, a dialing circuit 24, a pseudo inductance circuit 25, an AC signal transmitting circuit 26, a modem circuit 27, a polarity detection circuit 28, a DC/DC converter 29, a power unit 31, a power switch 32, a protection diode circuit 33, and a modem interface 34.

The ring detection circuit 23 is comprised of voltage dividing resistors Ra and Rb, and detects a call from the remote end based on the divided voltage. The AC signal transmitting circuit 26 is comprised of active circuits having a transformer function without the use of a transformer, and transmits an analog signal between the telephone line and the modem circuit 27, where the telephone line is comprised of wires L1 and L2. The modem circuit 27 demodulates an analog signal into a digital signal, and modulates a digital signal into an analog signal.

The polarity detection circuit 28 is comprised of voltage dividing resistors Rc and Rd and detects the polarity inversion on the telephone line. The DC/DC converter 29 subjects the DC voltage on the telephone line to a DC/DC conversion and supplies the output voltage to the modem circuit 27 as a power source voltage. The power unit 31 is comprised of a battery, for example, and supplies the power source voltage to the modem circuit 27 in a state where the modem circuit 27 and the telephone line are not connected. The power switch 32 switches and selects the output power source voltage of the power unit 31 or the DC/DC converter 29.

The modem interface 34 exchanges signals between the modem circuit 27 and a terminal interface 36 of a terminal equipment 35. The modem interface 34 is comprised of photocouplers 34' and 34".

The diode bridge 22 prevents the polarity of the DC voltage which is applied to the modem circuit 27, from changing even if the polarity of the DC voltage on the telephone line is inverted.

When a call is received from the remote end, a divided voltage is generated by the voltage dividing resistors Ra and Rb of the ring detection circuit 23. This divided voltage is input to a ring voltage input terminal RING of the modem circuit 27. The protection diode circuit 33 protects the modem unit 21 from an excessively large input, so that a voltage greater than 5 V will not be input to the ring voltage input terminal RING.

The DC/DC converter 29 subjects the DC voltage from the telephone line to the DC/DC conversion. The power switch 32 detects an off-hook signal OH from the modem circuit 27, and switches the power source voltage which is supplied to the modem circuit 27 from the output power source voltage of the power unit 31 to the output power source voltage of the DC/DC converter 29 in response to the detection of the off-hook signal OH.

The AC signal transmitting circuit 26 includes coupling capacitors for cutting off the DC current from the telephone line and for passing the AC signal, and differential circuits. The AC signal transmitting circuit 26 converts the balanced signals from the telephone line into unbalanced signals. In addition, the AC signal transmitting circuit 26 converts the unbalanced signals from the modem circuit 27 into balanced signals, and transmits the balanced signals to the wires L1 and L2 which form the telephone line.

The modem interface 34 exchanges signals between the terminal equipment 35 and the modem circuit 27. The photocoupler 34' transmits the signal from the modem circuit 27 to the terminal equipment 35. The photocoupler 34" transmits the signal from the terminal equipment 35 to the modem circuit 27.

The modem circuit 27 converts a transmitting digital signal into an analog signal and supplies the analog signal to the AC signal transmitting circuit 26. In addition, the modem circuit 27 converts a received analog signal from the AC signal transmitting circuit 26 into a digital signal and supplies this digital signal to the terminal equipment 35 via the modem interface 34.

Because the modem interface 34 provides a DC isolation between the terminal equipment 35 and the modem circuit 27, the polarity detection circuit 28 may have a simple construction comprised of the voltage dividing resistors Rc and Rd. More specifically, the polarity detection circuit 28 detects the polarity change of the DC voltage on the telephone line by detecting the change of the divided voltage generated by the voltage dividing resistors Rc and Rd.

In a personal computer communication typified by the CCITT Recommendations V.22bis, the answer from the remote end is made by transmitting a signal from the remote end. For this reason, it is not essential to provide the polarity detection circuit 28.

Figure 3:
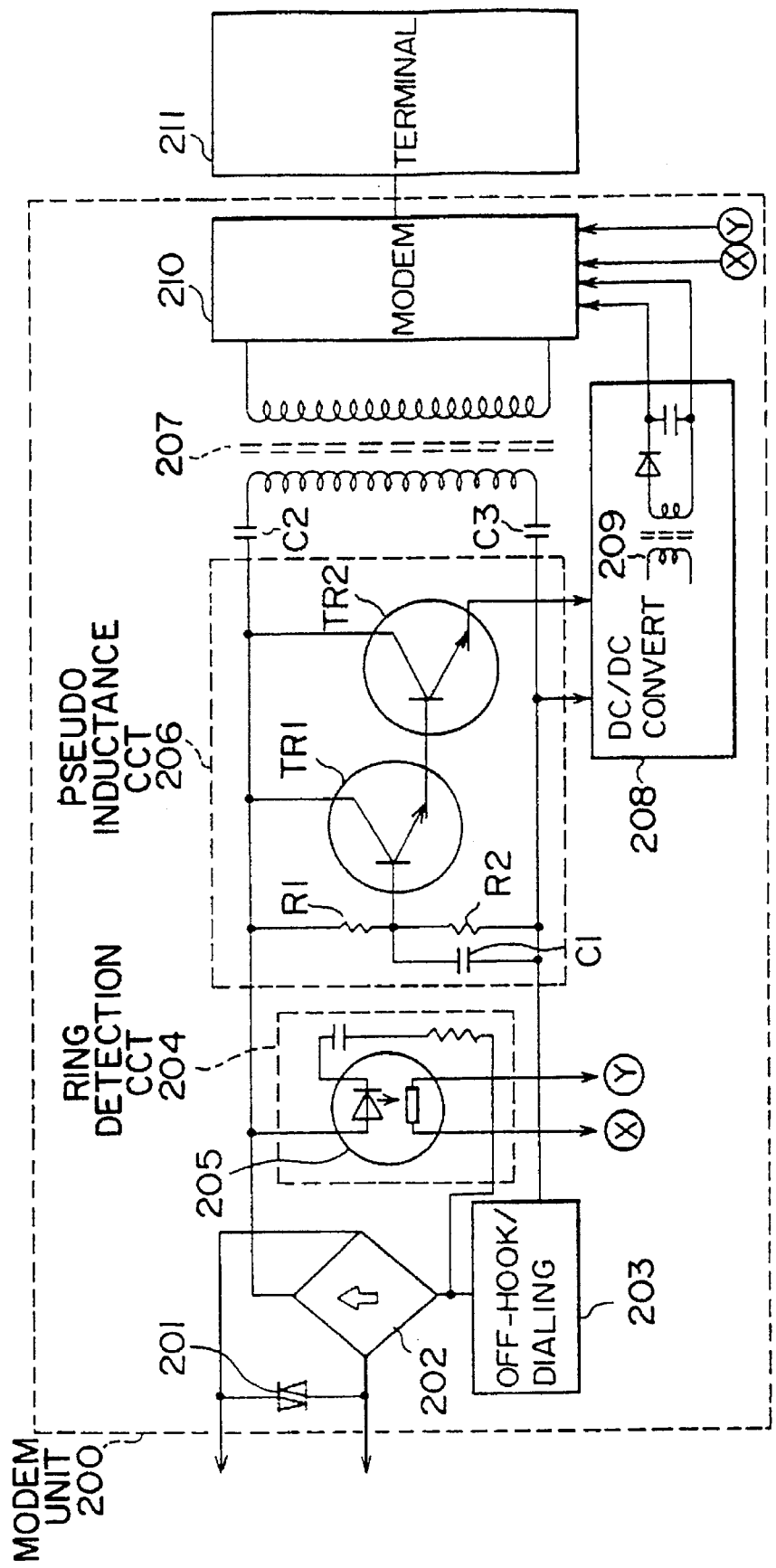
FIG. 3 is a system block diagram showing another example of the conventional modem unit.

The dialing circuit 24 and the pseudo inductance circuit 25 may have the same construction as those of the conventional modem unit shown in FIG. 3, for example. Hence, a description thereof will be omitted.

According to this second embodiment, the terminal equipment 35 and the modem unit 21 are coupled via the modem interface 34, that is, via the photocouplers 34' and 34". For this reason, the DC isolation between the modem unit 21 and the terminal equipment 35 is complete. As a result, the modem unit 21 does not require the means for realizing the power unit isolation between the telephone line and the terminal equipment 35 as in the conventional case so as to guarantee the DC withstand voltage of 250 V or greater and an isolation resistance of 0.2 MOhms or greater, for example. Consequently, the polarity detection circuit 28 and the ring detection circuit 23 can be formed by the resistors Ra, Rb, Rc and Rd and the protection diode circuit 33, thereby eliminating the need to use the photocoupler which is conventionally used. The illustration of a protection diode circuit for maintaining the output voltage of the polarity detection circuit 28 within a predetermined range is omitted in FIG. 6.

Similarly to the reasons described above, the transformer conventionally required in the DC/DC converter 29 can be eliminated in this embodiment. Furthermore, the coupling of the telephone line and the modem circuit 27 with respect to the AC signal, is accomplished by the AC signal transmitting circuit 26 which uses differential circuits and capacitors to realize the functions of the conventional line transformer. As a consequence, the line transformer can be eliminated, thereby making it easy to make the entire modem unit 21 in the form of an IC card.

Figure 7:
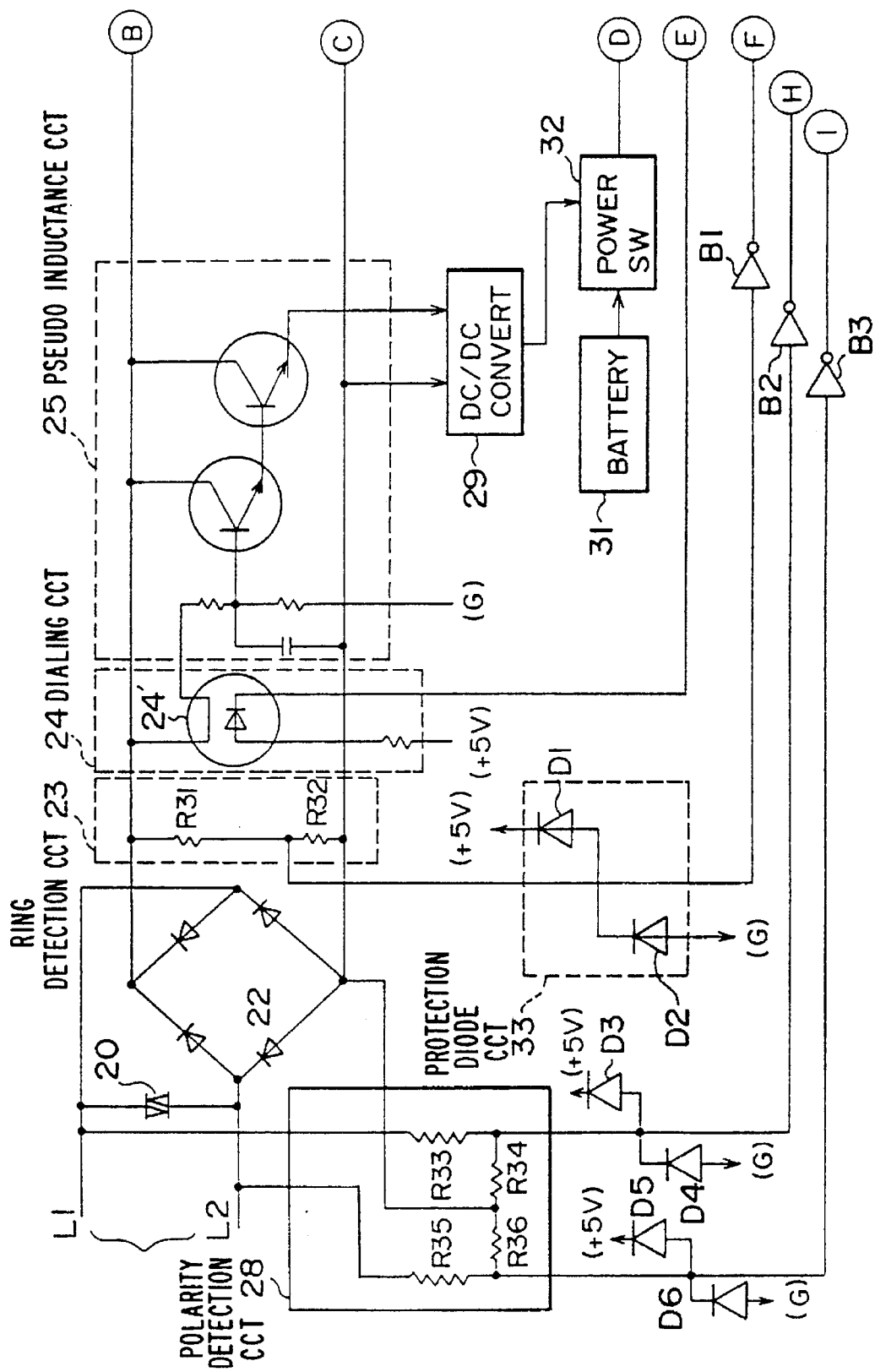
FIGS. 7 and 8 are system block diagrams respectively showing the second embodiment.
Figure 8:
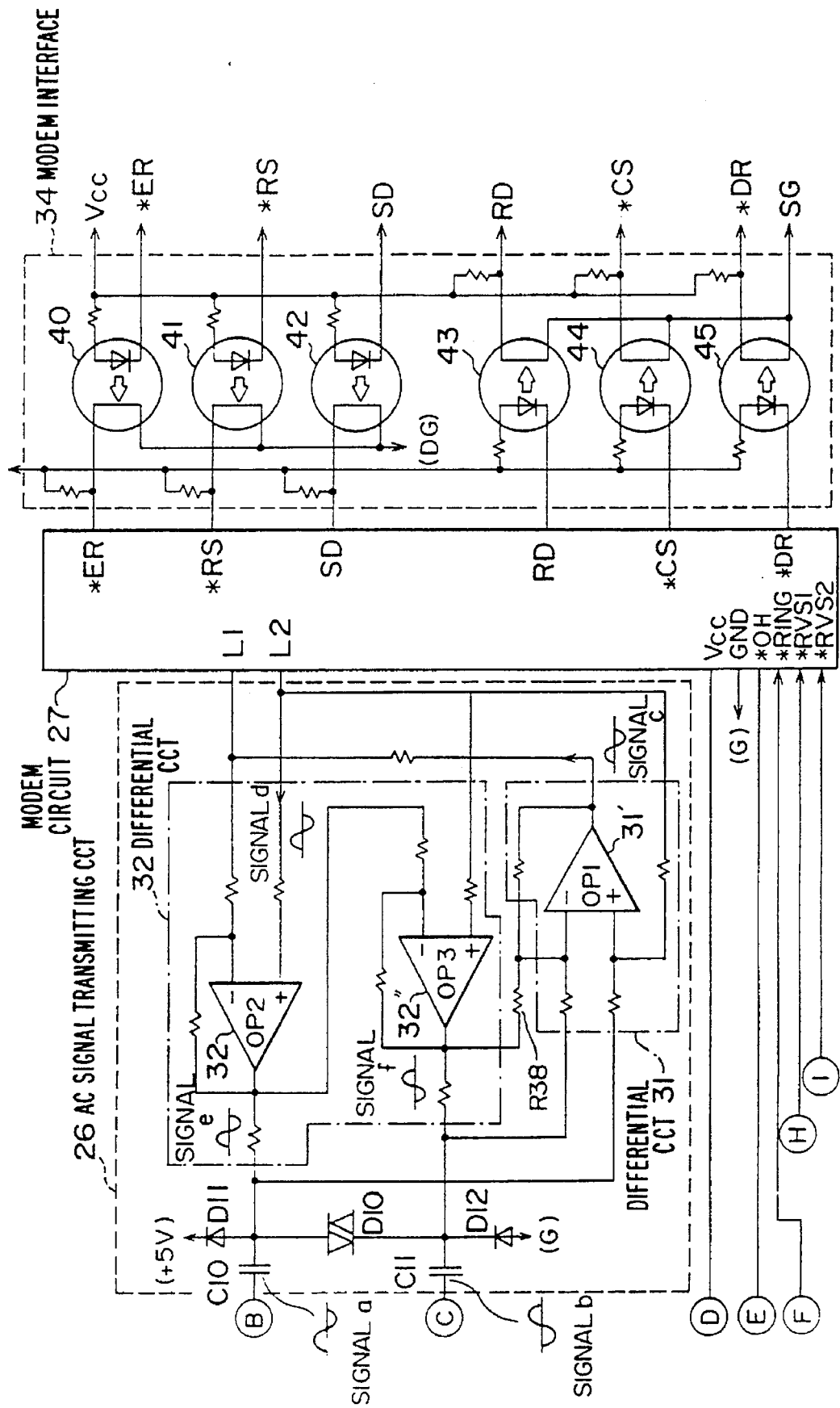

A more detailed description will now be given of the second embodiment, by referring to FIGS. 7 and 8. Terminals B, C, D, E, F, H and I shown in FIG. 7 respectively connect to the corresponding terminals B, C, D, E, F, H and I shown in FIG. 8. In FIGS. 7 and 8, those parts which are the same as those corresponding parts in FIG. 6 are designated by the same reference numerals, and a description thereof will be omitted.

In FIG. 7, input protection elements 20 protect the modem unit from a high impulse voltage caused by lightning or the like. The ring detection circuit 23 is comprised of voltage dividing resistors R31 and R32. A buffer B1 inputs the ring detection voltage from the ring detection circuit 23 to the modem circuit 27. The protection diode circuit 33 is comprised of diodes D1 and D2, and protects the buffer B1. The dialing circuit 24 is comprised of a photo MOS relay 24' and outputs the dial signal. The polarity detection circuit 28 is comprised of voltage dividing resistors R34, R35, R36 and R37 for detecting the voltage polarity on the telephone line, and outputs the polarity detection voltage. Diodes D3, D4, D5 and D6 are provided to maintain the polarity detection voltage within a predetermined range so that buffers B2 and B3 are protected. The buffers B2 and B3 input the polarity detection voltage to the modem circuit 27.

In FIG. 8, the AC signal transmitting circuit 26 includes differential circuits 31 and 32, capacitors C10 and C11, input protection elements D10, input protection diodes D11 and D12, and a resistor R38. The differential circuit 31 is comprised of an operational amplifier 31'. The differential circuit 32 is comprised of operational amplifiers 32' and 32". The input protection diodes D11 and D12 protect the operational amplifiers 31', 32' and 32" from an excessively large input voltage. The resistor R38 prevents the send signal from the terminal equipment (not shown) from being fed back to the terminal equipment.

The modem interface 34 includes photocouplers 40, 41, 42, 43, 44 and 45.

The modem circuit 27 is provided with analog signal output terminals L1 and L2, a power source voltage input terminal VCC, a ground terminal GND, an off-hook signal output terminal *OH, a ring detection signal input terminal *RING, polarity detection voltage input terminals *RVS1 and RVS2, an equipment ready signal input terminal *ER, a request to send signal input terminal *RS, a send signal input terminal SD, a received signal output terminal RD, a clear to send signal output terminal *CS, and a data set ready signal output terminal *DR. The symbol "*" indicates negative logic.

The off-hook signal output terminal *OH outputs the off-hook signal which turns ON by an off-hook and turns OFF by an on-hook. The equipment ready signal input terminal *ER receives the equipment ready signal from the terminal equipment indicating the receivable state of the terminal equipment. The request to send signal input terminal *RS receives a request to send signal from the terminal equipment. The send signal input terminal SD receives the send signal from the terminal equipment. The clear to send signal output terminal *CS outputs the clear to send signal to the terminal equipment. The data set ready signal output terminal *DR outputs the data set ready signal to the terminal equipment to notify the ready state of the modem unit.

The symbols used for the inputs and outputs of the modem interface 34 are the same as those used for the input and output terminals of the modem circuit 27.

A description will now be given of the operation of the circuit shown in FIGS. 7 and 8.

When making the dialing, the off-hook signal *OH is turned ON and the dialing circuit 24 outputs the dial signal to the telephone line (L1, L2) via the photo MOS relay 24'.

When making the dialing according to a different system, the off-hook signal *OH is first turned ON and a DTMF signal is thereafter output to the telephone line (L1, L2) from the modem circuit 27.

The ring detection circuit 23 operates as follows. When a ringing voltage is input from the telephone line, an AC signal having a maximum of 83 Vrms is applied across the diode bridge 22. The output voltage of the diode bridge 22 is divided by the resistors R31 and R32 of the ring detection circuit 23, so as to obtain a voltage in a range of 0 to 5 V. Furthermore, the voltage range is guaranteed by the diodes D1 and D2 of the protection diode circuit 33. The ring detection signal is thus input to the ring detection signal input terminal *RING of the modem circuit 27 via the buffer B1.

The polarity detection circuit 28 operates as follows. When the polarity on the telephone line is inverted at the exchange (not shown), a potential difference between the wires L1 and L2 of the telephone line changes from +48 V to −48 V. This voltage change is obtained via the resistors R33 through R36, and the voltage range is guaranteed by the protection diodes D3 through D6. Thus, the polarity detection voltages are input to the polarity detection voltage input terminals *RVS1 and *RVS2 of the modem circuit 27 via the buffers B2 and B3.

The voltage dividing resistors R31 and R32 of the ring detection circuit 23 and the voltage dividing resistors R33 through R36 of the polarity detection circuit 28 are set sufficiently large so as to satisfy the standards of the telephone line.

The operation of the DC/DC converter 29 and the power switch 32 is the same as that described with reference to FIG. 6. In addition, the operation of the input protection elements 20, the diode bridge 22 and the pseudo inductance circuit 25 is the same as that of the circuit shown in FIG. 3, for example.

A description will now be given of the operation of the modem interface 34 and the modem circuit 27.

The following processes are carried out when the terminal equipment transmits the data.

(1) The equipment ready signal *ER which indicates that the terminal equipment is ready, is received from the terminal equipment. This equipment ready signal *ER is input to the modem circuit 27 via the photocoupler 40.

(2) The modem circuit 27 outputs the data set ready signal *DR which indicates that the modem circuit 27 is ready. This data set ready signal *DR is supplied to the terminal equipment via the photocoupler 45.

(3) The terminal equipment transmits the request to send signal *RS. This request to send signal *RS is input to the modem circuit 27 via the photocoupler 41. The modem circuit 27 supplies a carrier wave on the telephone line in response to the request to send signal *RS. The modem circuit (not shown) on the receiving end detects the data from the carrier wave.

(4) The modem circuit 27 transmits the clear to send signal *CS to the terminal equipment via the photocoupler 44.

(5) The terminal equipment transmits the send data SD in response to the clear to send signal *CS from the modem circuit 27. The send data SD is input to the modem circuit 27 via the photocoupler 42, and is converted into an analog signal which is transmitted to the telephone line.

The following processes are carried out when receiving the data from the telephone line.

More specifically, the modem circuit 27 converts the received analog signal into a digital signal. This digital signal is transmitted to the terminal equipment via the photocoupler 43 as the received data RD.

A description will now be given of the operation of the AC signal transmitting circuit 26.

(1) At the time of the reception:

The transmission can be regarded as being essentially balanced on the telephone line, and thus, the polarities of the signals passing through the capacitors C10 and C11 are opposite to each other. For example, if a sending signal a shown in FIG. 8 passes through the capacitor C10, it will be assumed for the sake of convenience that a signal b is output from the capacitor C12, and that the operational amplifier 31' outputs a signal c.

The sending signal a is input to the non-inverting input terminal of the operational amplifier 31' as a reference voltage. The signal b is input to the inverting input terminal of the operational amplifier 31'. As a result, the signal c which is an inverted signal of the signal b is output from the operational amplifier 31'. This signal c is input to the modem circuit 27 as an unbalanced signal.

(2) At the time of the transmission:

It will be assumed for the sake of convenience that a send signal d shown in FIG. 8 is output from the modem circuit 27. This send signal d is input to the non-inverting input terminal of the operational amplifier 32'. As a result, a signal e having the same phase as the signal d is output from the operational amplifier 32'. In addition, the output signal d of the operational amplifier 32' is input to the inverting input terminal of the operational amplifier 32''. Thus, a signal f which is an inverted signal of the signal d is output from the operational amplifier 32''. The signals e and f are output to the telephone line via the capacitors C10 and C11 and the pseudo inductance circuit 25 as balanced signals.

In addition, the send signal f is input to the operational amplifier 31' via the resistor R38 so as to prevent the send signal f from being fed back and output from the operational amplifier 31'.

In the modem interface 34, the photocouplers 40 through 45 couple the terminal equipment and the modem circuit 27. But if no DC isolation were provided, the capacitors C10 and C11 would need to have a DC withstand voltage of 250 V and an isolation resistance of 0.2 MOhms or greater in order to satisfy the standards. The capacitors C10 and C11 would then become relatively large so as to meet the withstand voltage requirement. However, the capacitors C10 and C11 simply need to withstand the DC voltage on the telephone line in this embodiment because the photocouplers 40 through 45 are used, and the capacitors C10 and C11 can be made small.

Therefore, according to this embodiment, the modem unit does not include a transformer such as the line transformer, and there is no direct coupling between the power unit part of the modem unit and the terminal equipment. Hence, it is unnecessary to take into consideration the withstand voltage with respect to the power unit part. Consequently, the modem unit as a whole can be made small, and the entire modem unit can be made in the form of an IC card.

A description will now be given of a general IC card.

Figure 9:
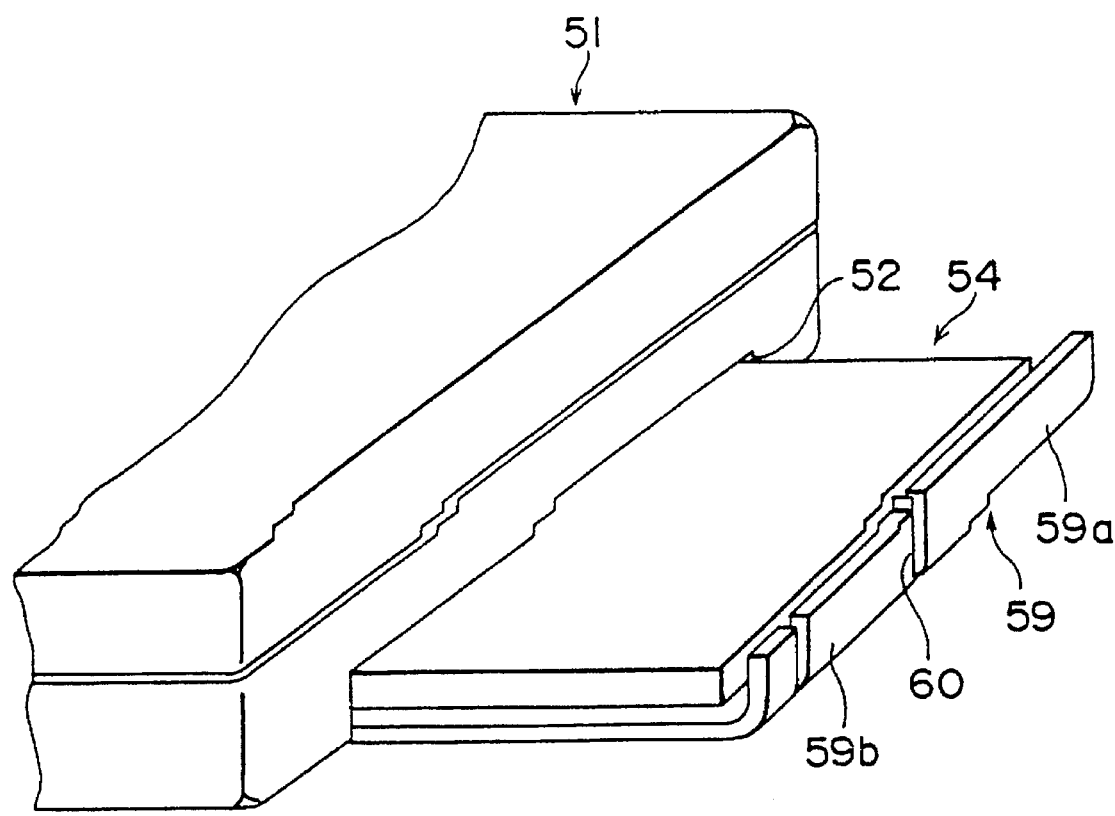
FIG. 9 is a perspective view showing an IC card which is loaded into a portable data processing unit.

FIG. 9 shows an IC card which is inserted into a portable data processing unit such as a portable personal computer. The portable data processing unit is comprised of a unit body 51 having a loading opening 52 on a side of the unit body 51. Various kinds of IC cards can be loaded into the portable data processing unit via the loading opening 52.

Figure 10:
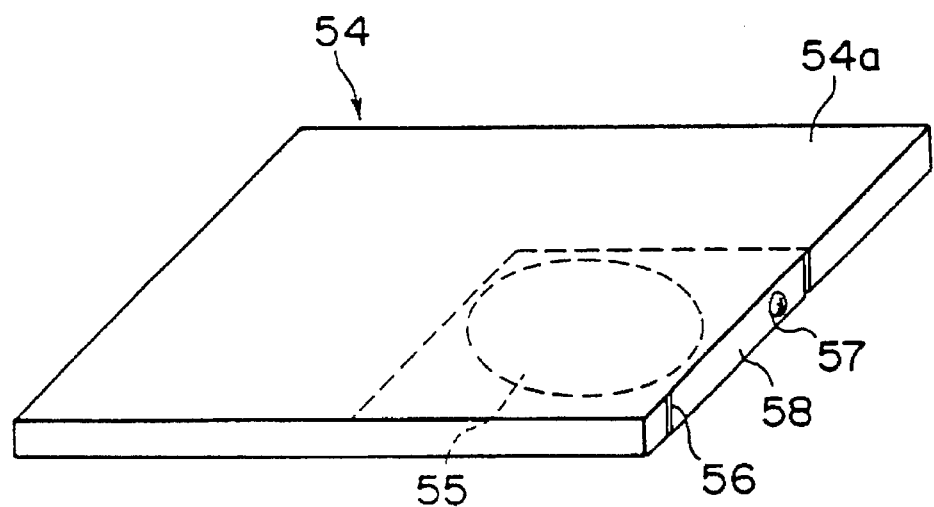
FIG. 10 is a perspective view showing the IC card.

FIG. 10 shows an example of the IC card which can be loaded into the portable data processing unit. A SRAM (or memory) card 54 accommodates a battery 55 for preserving stored data. In order to make the battery 55 replaceable, the memory card 54 is provided with a battery changing slot 56. This changing slot 56 is normally closed by a lid 58 which is secured on a card body 54a by a screw 57.

Figure 11:
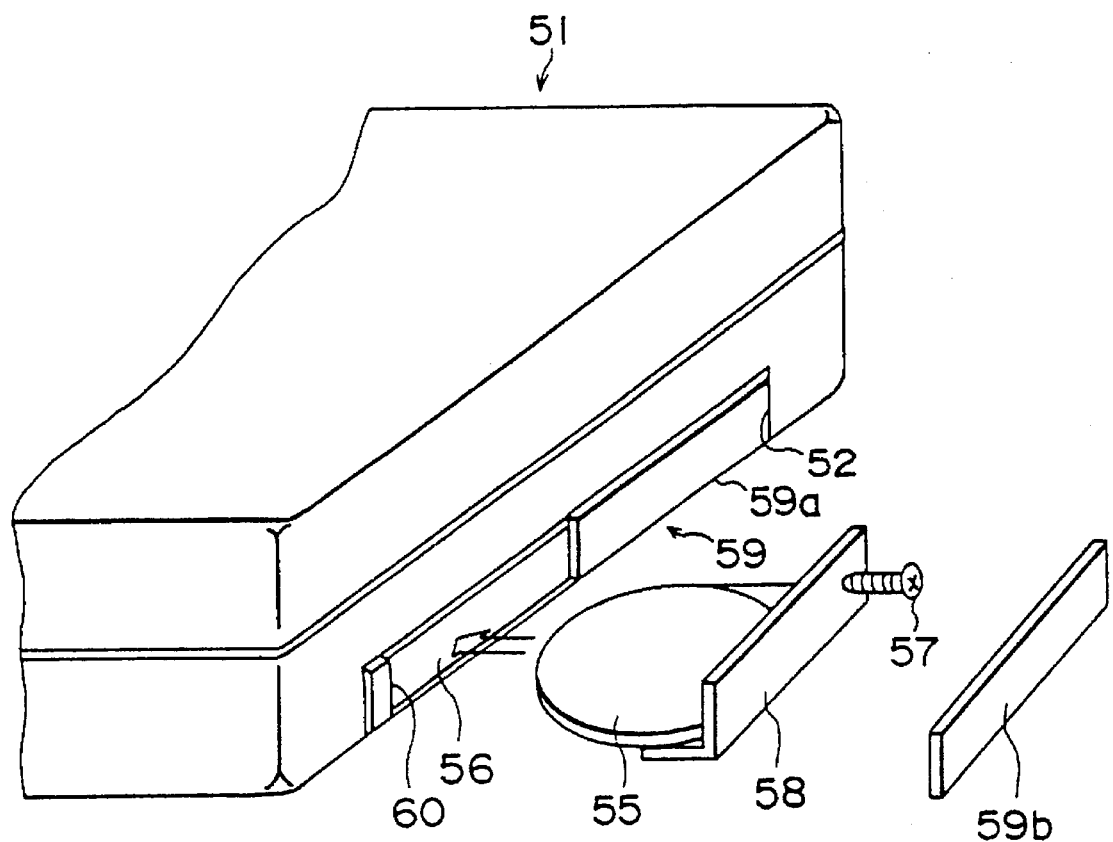
FIG. 11 is a perspective view for explaining the replacement of a battery of the IC card.

In order to preserve the memory contents, the battery 55 must be changed in a state where the memory card 54 is loaded into the portable data processing unit. More specifically, in a state where the power is supplied to the memory card 54 from the portable data processing unit. As shown in FIG. 11, the lid 58 is removed in the state where the memory card 54 is loaded into the portable data processing unit via the loading opening 52 when replacing the battery 55.

A lid member 59 is provided on the unit body 51 so that the memory card 54 is not exposed to the outside in the loaded position and so that the loading opening 52 is not exposed to the outside when no memory card 54 is loaded. This lid member 59 closes the loading opening 52.

This lid member 59 is comprised of a body part 59a having an opening 60 for enabling the battery replacement, and a detachable lid 59b which normally closes the opening 60. The position of the opening 60 is approximately the same among the various memory cards because the position where the battery is accommodated is approximately unified. When removing the battery 55, the lid 59b is removed, and the screw 57 is loosened so as to remove the lid 58.

Figure 12:
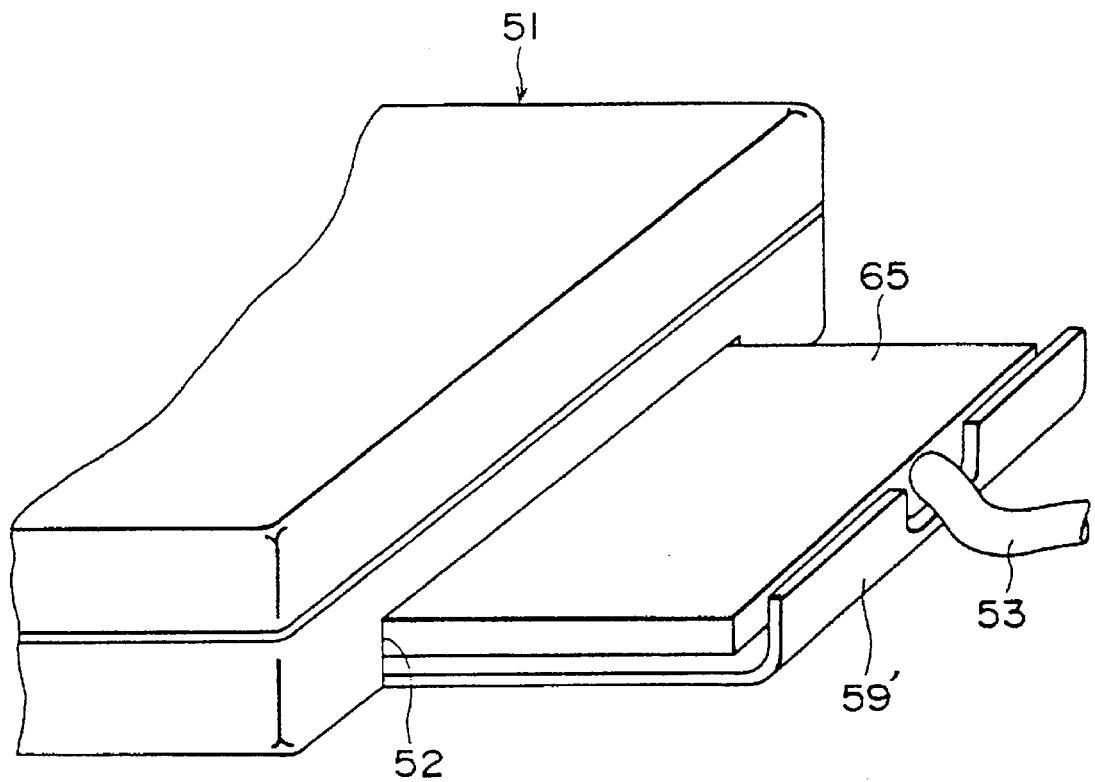
FIG. 12 is a perspective view showing a modem IC card which is loaded into the portable data processing unit.

FIG. 12 shows a modem IC card 65 which is loaded into the loading opening 52 of the unit body 51. In FIG. 12, those parts which are the same as those corresponding parts in FIG. 9 are designated by the same reference numerals, and a description thereof will be omitted.

Figure 13:
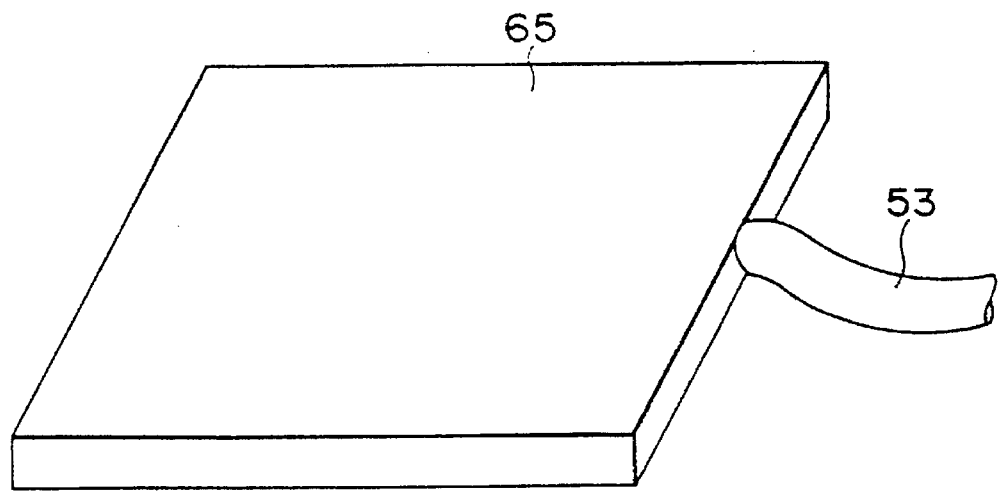
FIG. 13 is a perspective view showing the modem IC card.

As shown in FIGS. 12 and 13, the modem IC card 65 is provided with an external connecting part 53 at a central part along the side of the modem IC card 65. The external connecting part 53 may be a cable, a connector or the like. The modem IC card 65 has an external shape and size which are approximately the same as those of the existing memory card 54.

If the modem IC card is loaded into the unit body 51 via the loading opening 52, the external connecting part 53 will hit the lid member 59. For this reason, it is necessary to use the modem IC card 65 in a state where the lid member 59 is removed from the unit body 51. But the removal of the lid member 59 will damage the external appearance of the unit body 51.

In order to eliminate this problem, it is conceivable to provide a special lid member 59' exclusively for use with the modem IC card 65. However, the modem IC card 65 is in most cases an optional feature of the portable data processing unit, and the need to provide this special lid member 59' would increase the cost of the system.

A description will now be given of a third embodiment of the modem unit according to the present invention. In this embodiment, the entire modem unit is made in the form of an IC card, and will be referred to as a modem IC card. For example, the modem unit itself may have the structure of the first or second embodiment described above.

Figure 14:
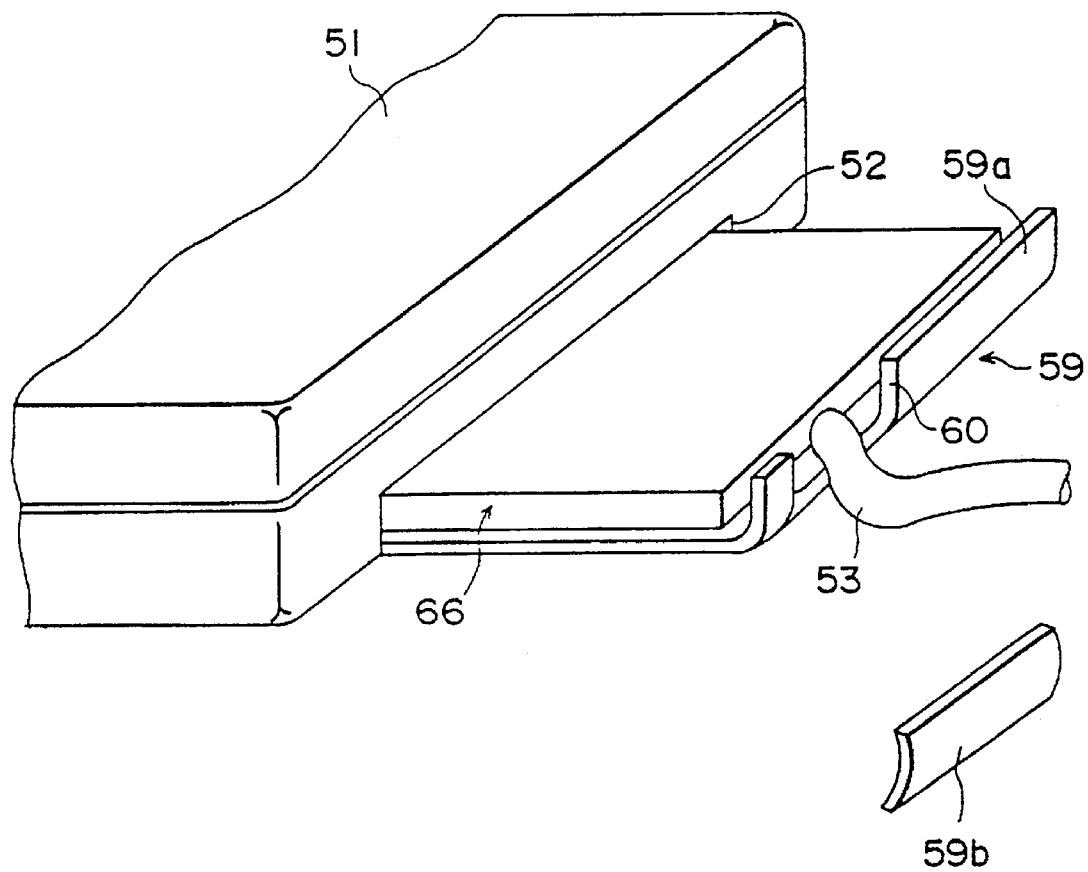
FIG. 14 is a perspective view showing a third embodiment of the modem unit according to the present invention which is loaded into the portable data processing unit.
Figure 15:
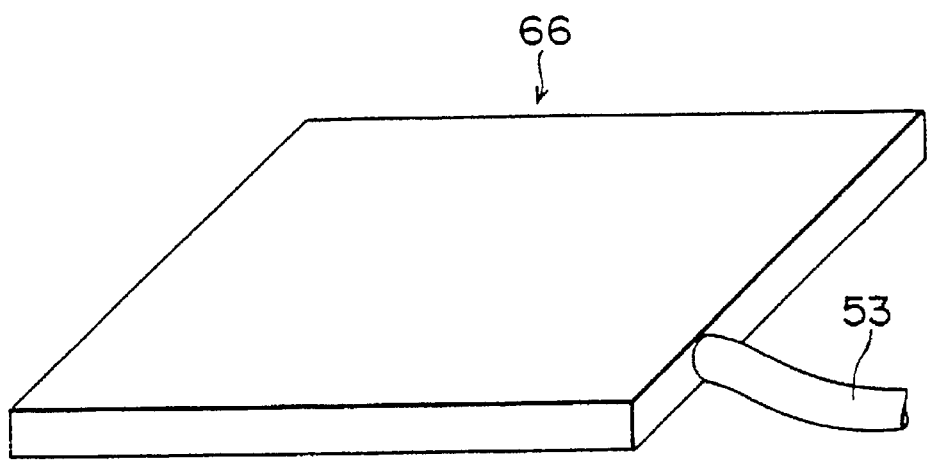
FIG. 15 is a perspective view showing the third embodiment.

FIG. 14 shows this embodiment of the modem unit, that is, a modem IC card 66, which is loaded into the unit body 51 of the portable data processing unit. FIG. 15 shows the modem IC card 66.

The unit body 51 of the portable data processing unit has the loading opening 52, and the lid member 59 for normally closing the loading opening 52, as shown in FIG. 14. The lid member 59 is comprised of the body part 59a and the detachable lid 59b. The opening 60 for enabling the battery 55 of the memory card 54 to be replaced is normally closed by detachable lid 59b.

In the loaded position of the above-described memory card 54 within the unit body 51, the loading opening 52 is closed by the lid member 59 which is fitted with the lid 59b. Hence, the battery 55 of the memory card 54 can be replaced as described above in conjunction with FIG. 11, that is, by first removing the lid 59b and thereafter removing the lid 58 of the memory card 54.

Unlike the memory card 54, the modem IC card 66 has an external connecting part (cable) 53 which extends from the side of the modem IC card 66. A receptacle (not shown) is provided on a tip end of the external connecting cable 53, and connects to the telephone line or a mobile telephone, for example. This external connecting cable 53 is arranged at a position corresponding to the position of the lid 59b, that is, the part of the lid member 59 where the opening 60 is provided. In addition, the diameter of the external connecting cable 53 is such that the external connecting cable 53 completely fits within the opening 60.

Accordingly, when loading the modem IC card 66 into the portable data processing unit, the lid member 59 is once pulled out of the unit body 61, and the lid 59b is removed. Then, the modem IC card 66 is placed on the lid member 59. In this state, the external connecting cable 53 completely fits within the opening 60 of the lid member 59 as shown in FIG. 14, and will not hit the body part 59a of the lid member 59. Thereafter, the lid member 59 is pushed into the unit body 51 so as to complete the loading operation.

In other words, by arranging the external connecting cable 53 at the position corresponding to the opening 60 of the lid member 59, it becomes unnecessary to use the special lid member 59' shown in FIG. 12. Because the position of the opening 60 is approximately the same among the existing memory cards, this embodiment enables compatible use of the modem IC card 66 with the portable data processing unit having the lid member 59.

Figure 16:
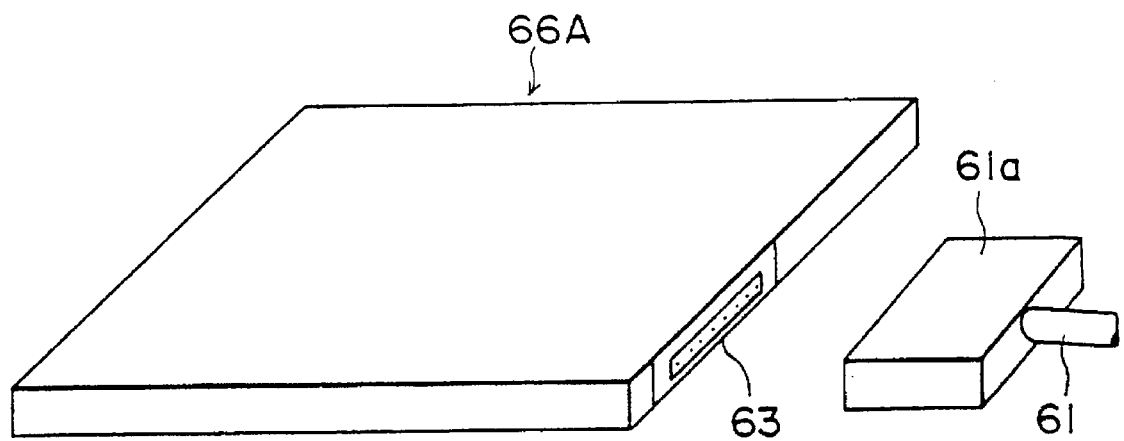
FIG. 16 is a perspective view showing a modification of the third embodiment together with a connector.

FIG. 16 shows a modification of the third embodiment together with a connector 61a. In the case of the modem IC card 66 shown in FIG. 15, the external connecting cable 53 is connected directly on the side of the modem IC card 66. However, in this modification, a connector 61a is provided on a tip end of an external connecting cable 61, and a modem IC card 66A is provided with a connector 63 for receiving the connector 61a. The size of the connector 61a is slightly smaller than the opening 60 of the lid member 59, so that the connector 61a completely fits within the opening 60 in a state where the connector 61a is connected to the connector 63 of the modem IC card 66A. The connector 61a can be connected to and disconnected from the connector 63 of the modem IC card 66A in the state where the modem IC card 66A is loaded into the unit body 51.

According to the third embodiment and the modification thereof, it is possible to effectively utilize the opening which is provided in the lid member for enabling battery replacement of the memory card, so that the external connecting part (cable) can be drawn outside from the modem IC card via the opening in the lid member without the need for a specially designed lid member exclusively for the modem IC card.

A description will now be given of the problems of the modem unit which is provided independently of the data processing unit, by referring to FIGS. 17 and 18.

Figure 17:
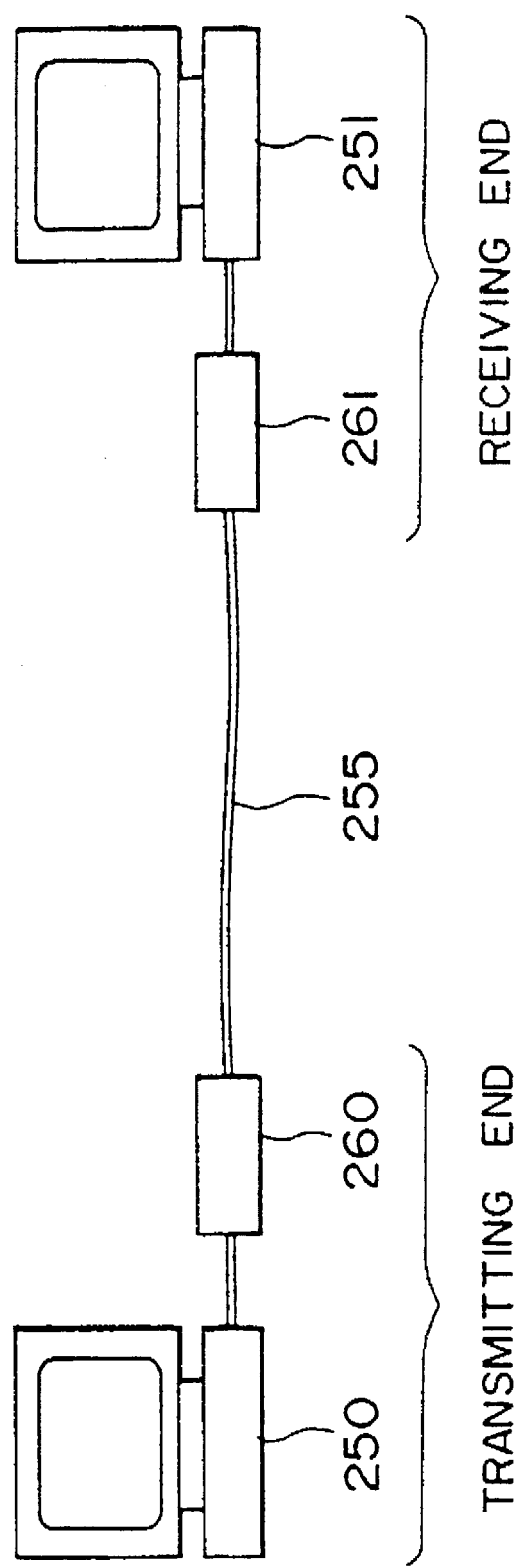
FIG. 17 is a diagram for explaining a data communication system using modem units.

A data communication system shown in FIG. 17 includes a transmitting end and a receiving end which are coupled via a telephone line 255. The transmitting end includes a personal computer 250, and a modem unit 260 coupled between the personal computer 250 and the telephone line 255. The receiving end includes a personal computer 251, and a modem unit 261 coupled between the personal computer 251 and the telephone line 255. For example, the personal computers 250 and 251 are the portable kind.

The modem unit 260 converts the output digital data of the personal computer 250 into an analog signal, and transmits the analog signal to the receiving end via the telephone line 255. The modem unit 261 converts the analog signal which is received from the telephone line 255 into a digital signal, and supplies the digital signal to the personal computer 251.

Figure 1:
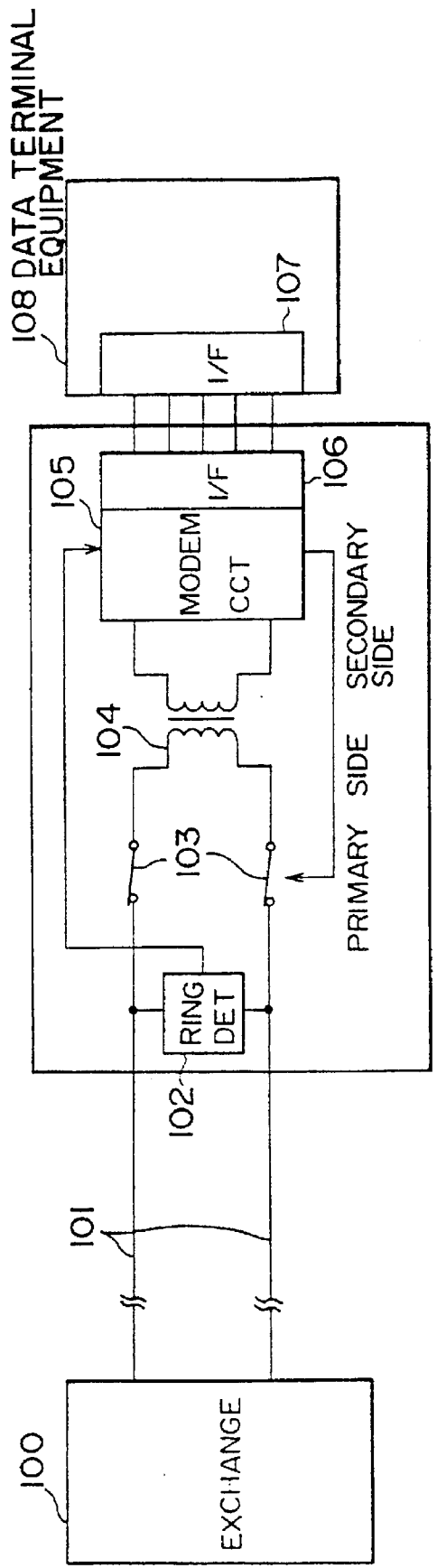
Figure 2A:
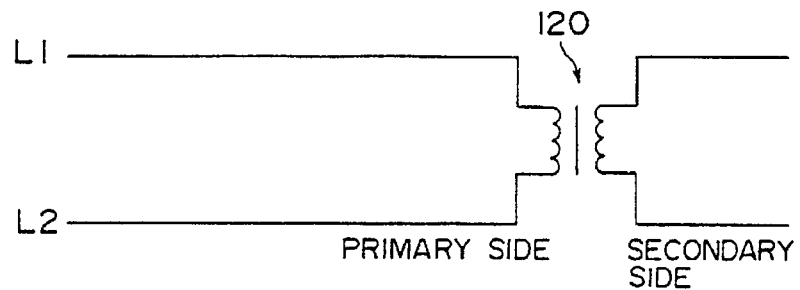
Figure 2B:
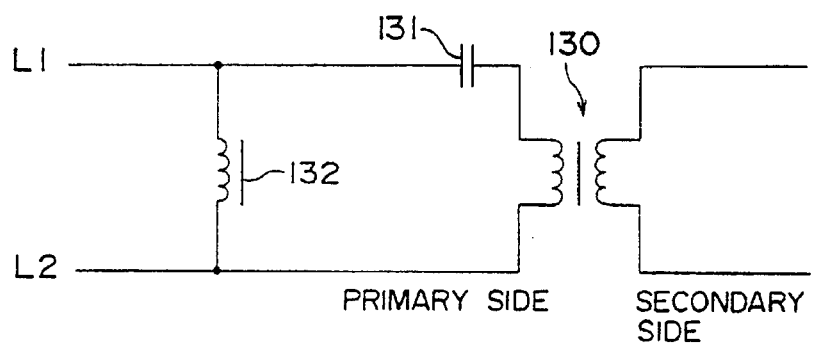
Figure 2C:
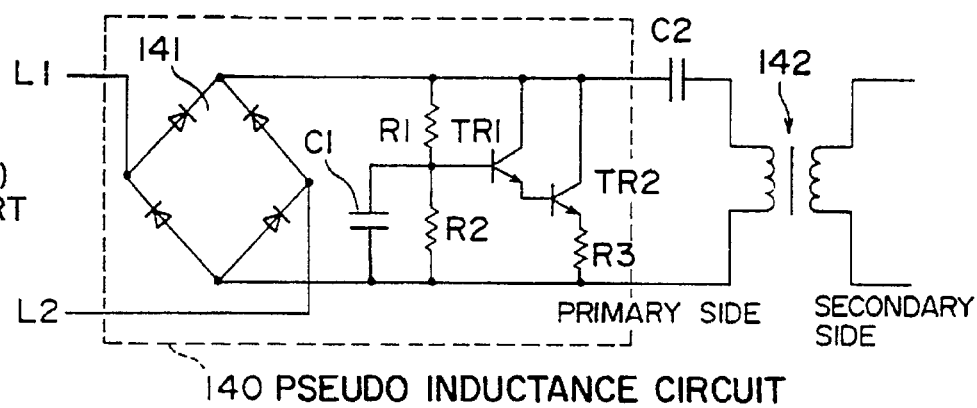
Figure 18:
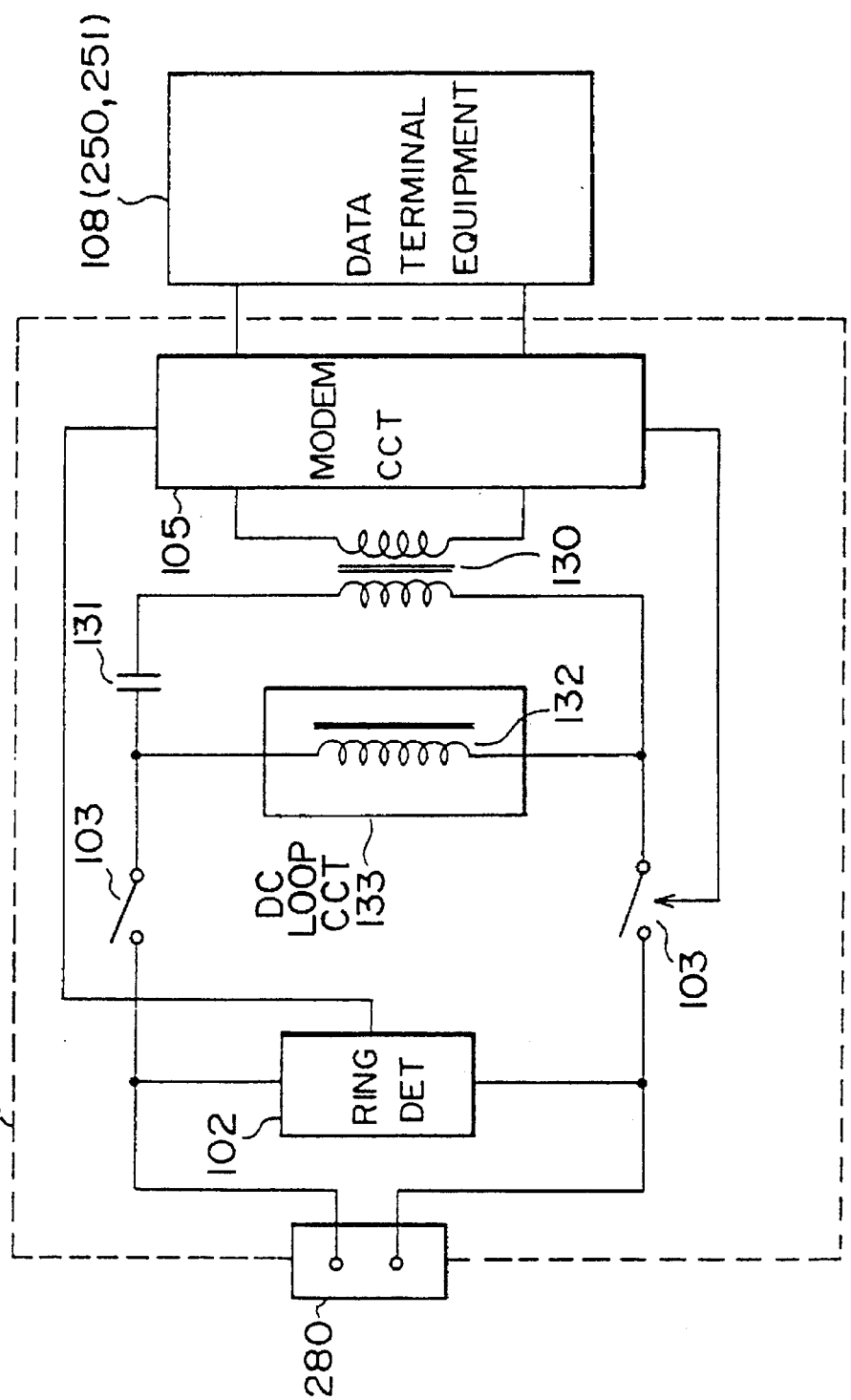
FIG. 18 is a system block diagram showing an example of the conventional modem unit used in the data communication system shown in FIG. 17.

FIG. 18 shows the construction of the modem unit 260. The construction of the modem unit 261 is identical to that of the modem unit 260, and a description thereof will be omitted. In FIG. 18, those parts which are the same as those corresponding parts in FIGS. 1 and 2(B) are designated by the same reference numerals, and a description thereof will be omitted.

A connector 280 connects to the telephone line 255. However, if the data communication is to be made via radio, it is necessary to connect the modem unit 260 (or 261) to a mobile telephone (not shown) and to the personal computer 250 (or 251). But since the repeater transformer 130, a DC loop circuit 133 including the loop coil 132 and the like of the modem unit 260 (or 261) are bulky and cannot be built into a modem IC card, it is inconvenient in that the user must carry not only the mobile telephone but also the modem IC card and the bulky remaining portion of the modem unit 260 (or 261). In addition, the bulky remaining portion of the modem unit 260 (or 261) is relatively heavy compared to the wire portion, and undesirable stress is generated at the connecting part particularly if the bulky remaining portion simply hangs from the personal computer 250 (or 251) which is set on an end of a table, for example. Furthermore, it requires at least two connecting cables to connect the bulky remaining portion of the modem unit 260 (or 261) to the telephone line and to the personal computer 250 (or 251).

A description will now be given of the operating principle of a fourth embodiment of the modem unit according to the present invention, by referring to FIG. 19. According to this embodiment, the entire modem unit is built into the modem IC card by use of a hybrid circuit in place of the line transformer or the like. Additionally, a connector is designed so as to facilitate data communication when connecting the modem IC card to the personal computer and the mobile telephone.

Figure 19:
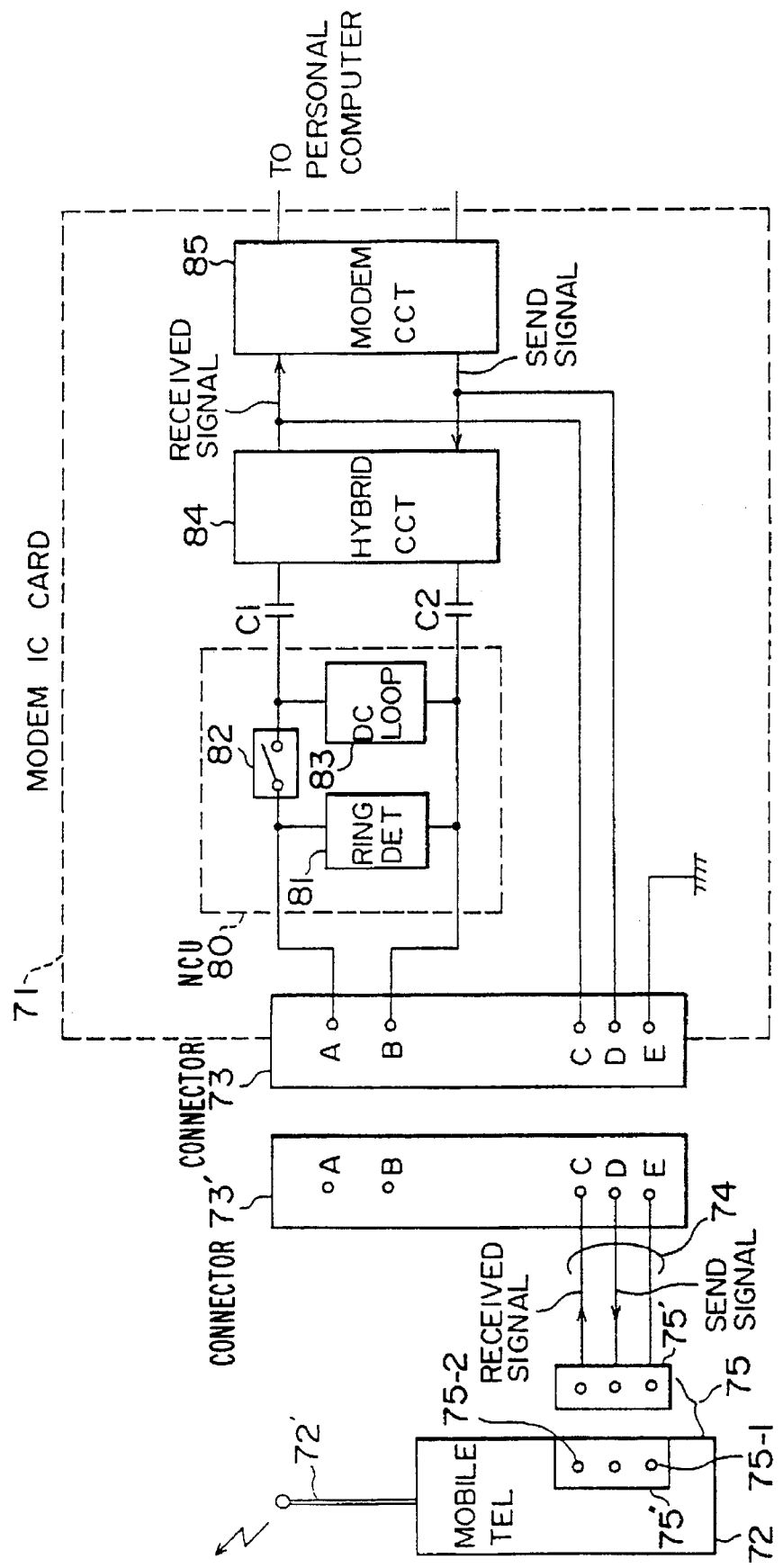
FIG. 19 is a system block diagram for explaining the operating principle of a fourth embodiment of the modem unit according to the present invention.

In FIG. 19, a modem IC card 71 includes a connector 73, a network control unit (NCU) 80, capacitors C1 and C2, a hybrid circuit 84, and a modem circuit 85. The NCU 80 includes a ring detection circuit 81, a DC loop circuit 83, a hook switch 82 and the like. The DC loop circuit 83 is comprised of active elements and a pseudo inductance circuit which is comprised solely of passive elements. The hybrid circuit 84 is comprised of active elements and a circuit which is comprised solely of passive elements. The NCU 80, the hybrid circuit 84 and the modem circuit 85 are respectively made in the form of ICs.

A mobile telephone 72 includes an antenna 72' and a connector 75". The modem IC card 71 and the mobile telephone 72 are coupled via a connecting cable 74. The connecting cable 74 has a connector 73' which connects to the connector 73 of the modem IC card 71, and a connector 75' which connects to the connector 75" of the mobile telephone 72.

The connector 73' has terminals A, B, C, D and E which connect to corresponding terminals A, B, C, D and E of the connector 73 of the modem IC card 71. The connector 75' has send/receive terminals 75 which connect to corresponding send/receive terminals 75 of the mobile telephone 72. More particularly, the send/receive terminals 75 of the connector 75" include a microphone input terminal 75-1, that is, a send signal input terminal 75-1 of the mobile telephone 72, and an earphone output terminal 75-2, that is, a received signal output terminal 75-2 of the mobile telephone 72.

Figure 20:
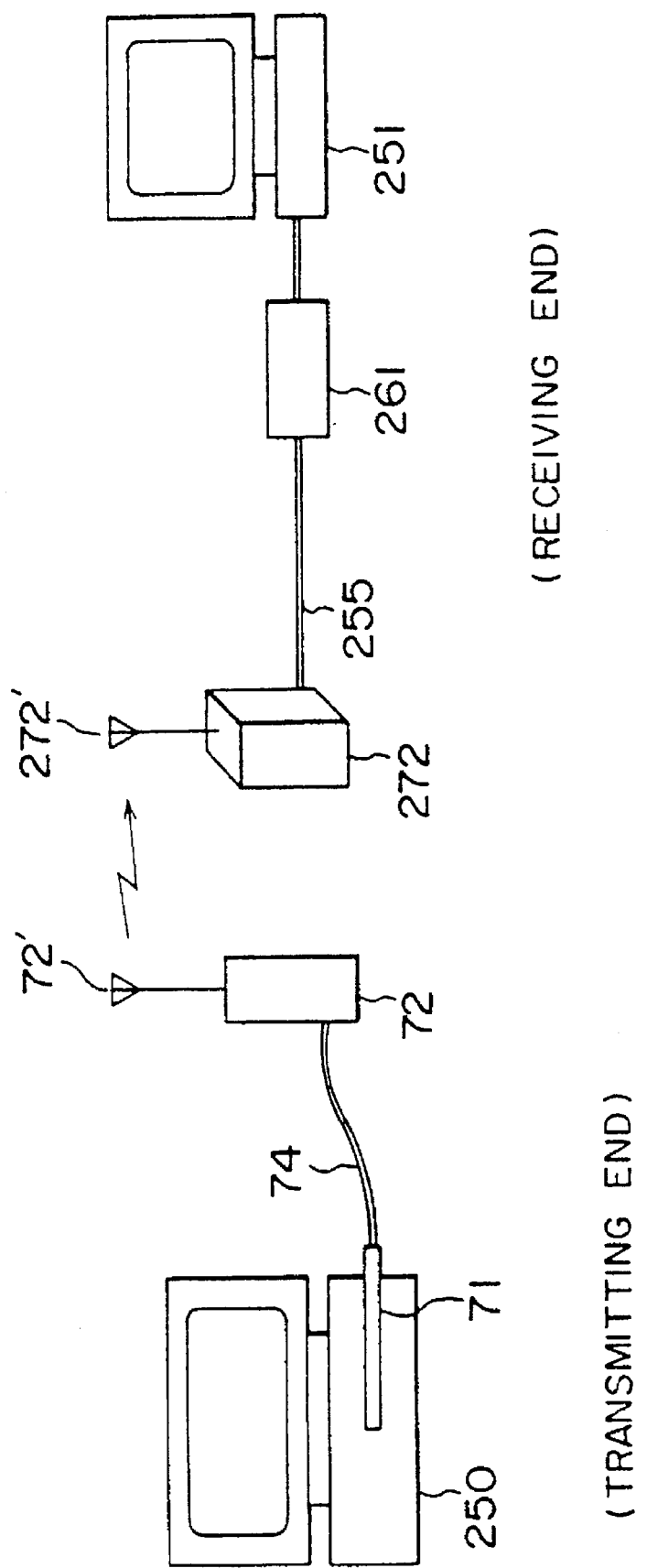
FIG. 20 is a diagram for explaining a data communication system using the fourth embodiment.

FIG. 20 shows a communication system applied with the fourth embodiment. In FIG. 20, those parts which are the same as those corresponding parts in FIG. 17 are designated by the same reference numerals, and a description thereof will be omitted.

In FIG. 20, the transmitting end includes the personal computer 250, the modem IC card 71 which is loaded into the personal computer 250, and the mobile telephone 72 which is coupled to the modem IC card 71 via the connecting cable 74. The receiving end includes a base station 272 having an antenna 272', the modem unit 261 which is coupled to the base station 272 via the telephone line 255, and the personal computer 251 which is coupled to the modem unit 261. Of course, the modem IC card 71 may be used in place of the modem unit 261.

The send data output from the personal computer 250 is converted into an analog signal by the modem IC card 71 and is supplied to the mobile telephone 72 via the connecting cable 74. The mobile telephone 72 modulates the analog signal (data) and transmits the data in the form of a radio wave from the antenna 72'. The base station 272 receives the radio wave from the mobile telephone 72 via the antenna 272', and demodulates the received data into the original analog signal. This analog signal is supplied to the modem unit 261 via the telephone line 255. The modem unit 261 converts the analog signal from the telephone line 255 into a digital signal, and supplies this digital signal to the personal computer 251.

Returning now to the description of FIG. 19, the connector 73' is connected to the connector 73 of the modem IC card 71 when making a data communication, using the modem IC card 71 and the mobile telephone 72. Further, the modem IC card 71 is loaded into the personal computer 250 shown in FIG. 20. The connector 75' on the other end of the connecting cable 74 is connected to the connector 75" of the mobile telephone 72.

The output digital signal of the personal computer 250 is converted into an analog signal in the modem circuit 85, and is input to a send signal input terminal 75-1 of the mobile telephone 72 via the terminal D of the connector 73 as the send signal. The send signal is transmitted as data via radio, from the mobile telephone 72.

Similarly, when receiving the data from the base station 272, the received data from the mobile telephone 72 is input to the modem circuit 85 via the terminal C of the connector 73' in the form of an analog signal. The modem circuit 85 converts the analog signal into a digital signal, and supplies the digital signal to the personal computer 250.

Figure 21:
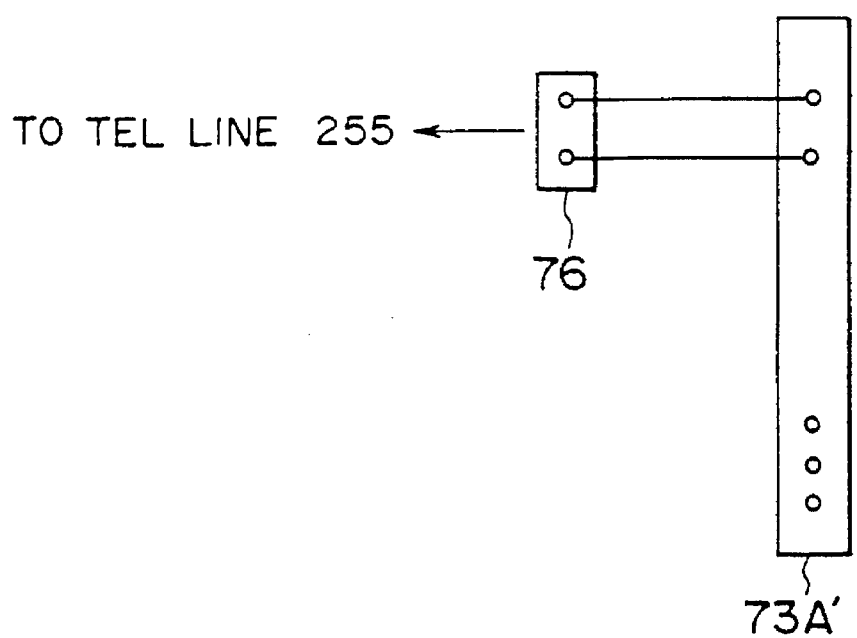
FIG. 21 shows an embodiment of a connecting cable which connects to a telephone line in the fourth embodiment.

A connecting cable 74A shown in FIG. 21 which is connected to the telephone line 255 is used when making the data communication using the modem IC card 71 via the telephone line 255. The connecting cable 74A has a connector 73A' which connects to the connector 73 of the modem IC card 71, and a receptacle 76 which connects to terminals of the telephone line 255.

In this case, data from the personal computer 250 is converted into an analog signal by the modem circuit 85 of the modem IC card 71. This analog signal is formed into balanced signals in the hybrid circuit 84 and output to the telephone line 255 via terminals A and B of the connector 73.

When receiving data from the telephone line 255, the AC component of the data which is received via the terminals A and B of the connector 73, is input to the hybrid circuit 84 via the capacitors C1 and C2 as balanced signals. The hybrid circuit 84 converts the balanced signals into unbalanced signals, and supplies the unbalanced signals to the modem circuit 85. The modem circuit 85 converts the unbalanced signals into a digital signal, and supplies the digital signal to the personal computer 250.

Figure 22:
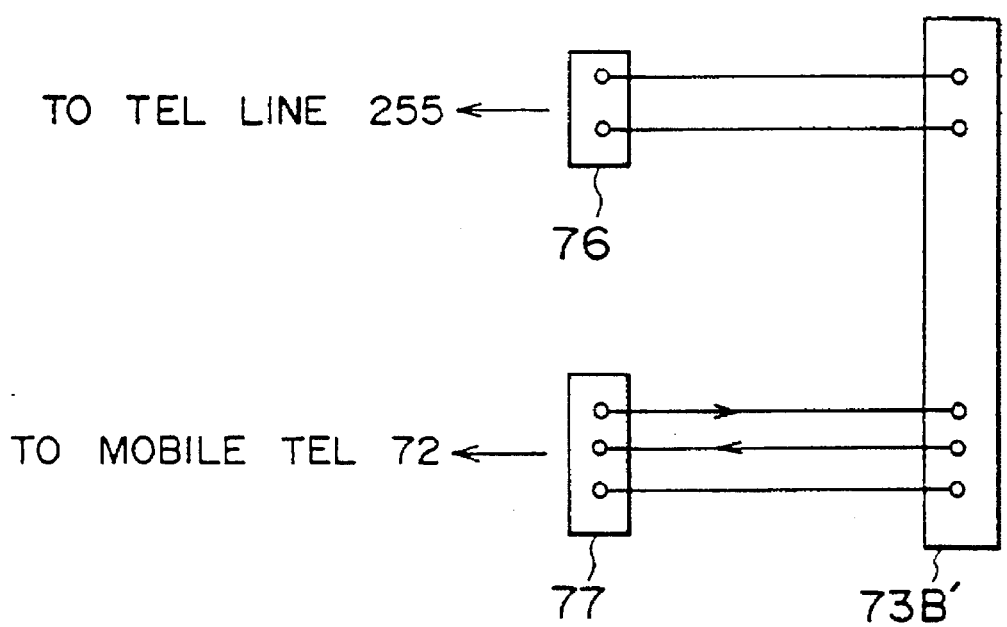
FIG. 22 shows an embodiment of a connecting cable which is connectable to the telephone line and a mobile telephone in the fourth embodiment.

It is also possible to use a connecting cable 74B shown in FIG. 22. The connecting cable 74B can be used in common when connecting to the mobile telephone 72 and when connecting to the telephone line 255. This connecting cable 74B has a connector 73B' which connects to the connector 73 of the modem IC card 71, a receptacle 76, and a stereo jack 77. The receptacle 76 is connectable to the telephone line 255. The stereo jack 77 is connectable to the connector 75" of the mobile telephone 72, more specifically, to the send/receive terminals 75. For example, the send/receive terminals 75 may be connection terminals of a headset which integrally has earphones and a microphone to be worn on the head of the user.

According to this embodiment, the entire modem unit is built within the modem IC card 71. This modem IC card 71 can be connected to the personal computer 250 (or 251) and to the mobile telephone 72 or the telephone line 255 using a single connecting wire 74 (or 74A or 74B), because the entire modem unit is built into the modem IC card 71 which is loaded into the personal computer 250 (or 251). For example, it is possible to simply connect the modem IC card 71 to the telephone line 255 or the mobile telephone 72 using a single standard connector such as a single 9-pin connector.

Figure 23:
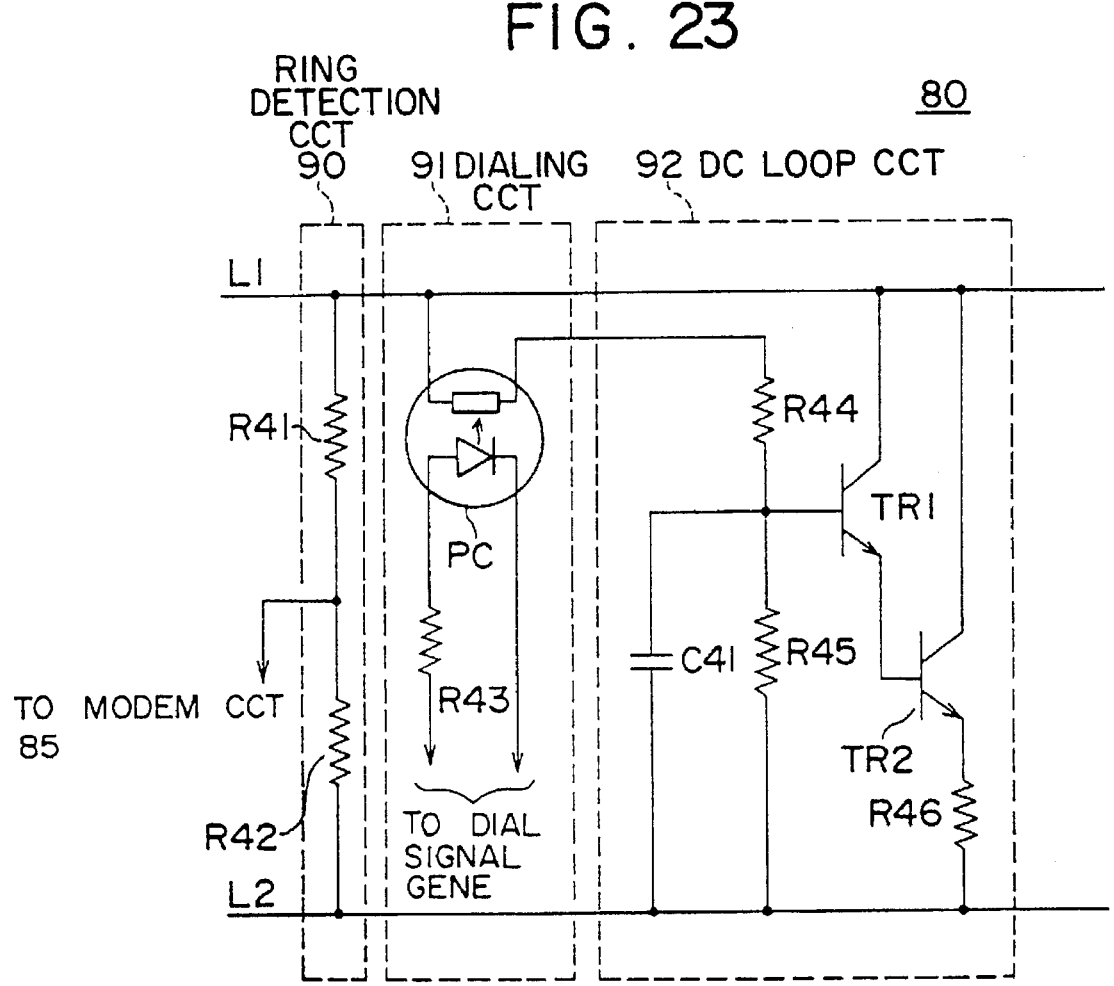
FIG. 23 is a circuit diagram showing an embodiment of an NCU shown in FIG. 19.

FIG. 23 shows an embodiment of the NCU 80 shown in FIG. 19. This NCU 80 includes a ring detection circuit 90, a dialing circuit 91 and a DC loop (or pseudo inductance) circuit 92. The ring detection circuit 90 is comprised of voltage dividing resistors R41 and R42. The dialing circuit 91 is comprised of a photocoupler PC and a resistor R43. This dialing circuit 91 outputs a dial signal to the wires L1 and L2 of the telephone line based on a signal from a dial signal generator (not shown). The DC loop circuit 92 includes voltage dividing resistors R44 and R45, a capacitor C41 for bypassing the AC signal, transistors TR1 and TR2 for forming a DC loop, and an emitter resistance R46 of the transistor TR2.

Accordingly, the ring detection circuit 90 divides the voltage on the telephone line by the voltage dividing resistors R41 and R42. This divided voltage is input to the modem circuit 85 shown in FIG. 19 wherein the call and the off-hook is detected. The dialing circuit 91 inputs the signal from the dialing signal generator and outputs a dial signal to the wires L1 and L2 of the telephone line via the photocoupler PC. The DC loop circuit 92 divides the DC voltage on the telephone line by the voltage dividing resistors R44 and R45. This divided voltage is then applied to the base of the transistor TR1 as the bias voltage of the transistors TR1 and TR2. As a result, an approximately instant DC current flows to the telephone line via the transistors TR1 and TR2.

Figure 24:
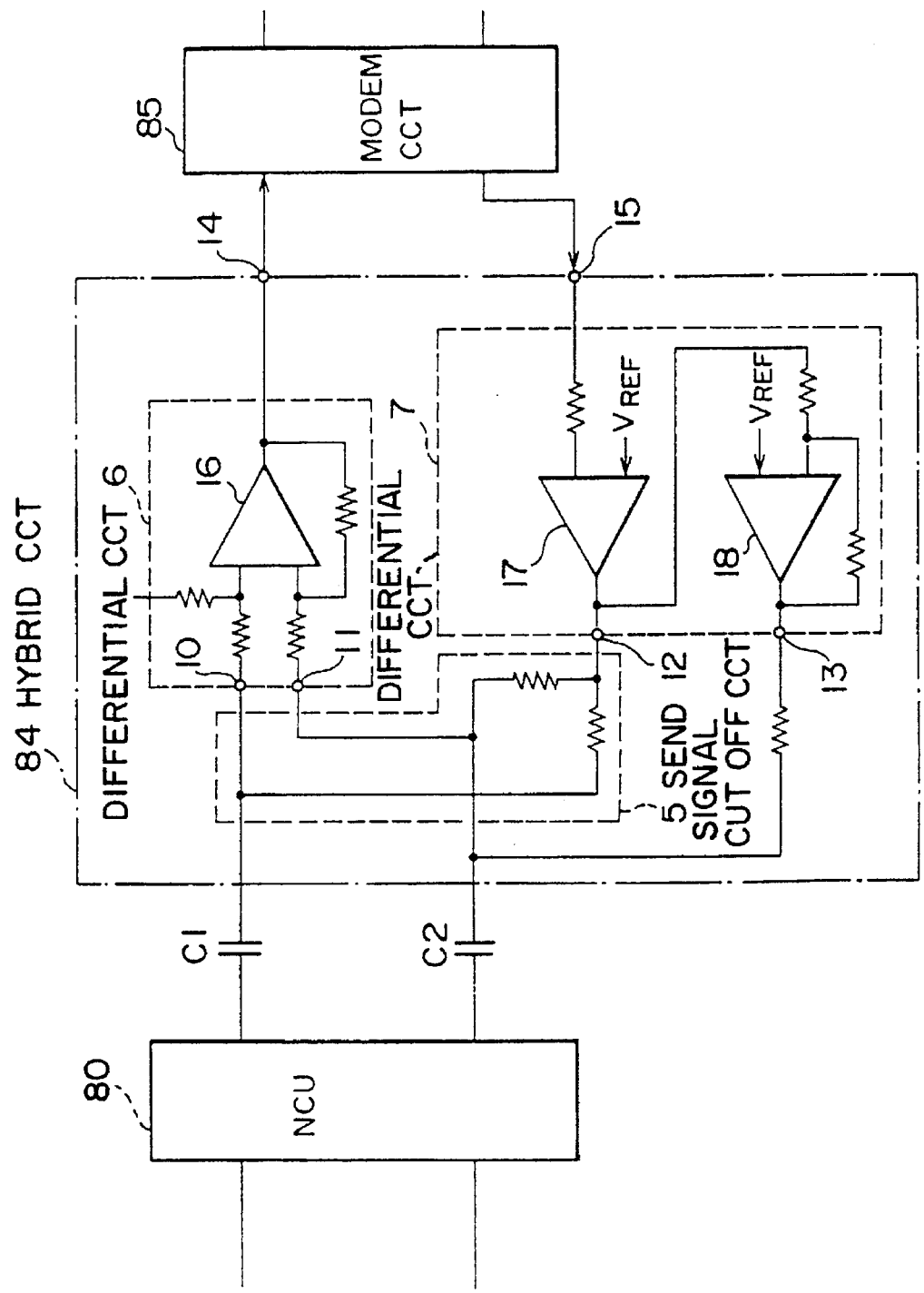
FIG. 24 is a circuit diagram showing an embodiment of a hybrid circuit shown in FIG. 19.

FIG. 24 shows an embodiment of the hybrid circuit 84 shown in FIG. 19. In FIG. 24, those parts which are basically the same as those corresponding parts in FIG. 4 are designated by the same reference numerals, and a description thereof will be omitted.

The hybrid circuit 84 shown in FIG. 24 includes a send signal cut off circuit 5, and differential circuits 6 and 7. The send signal cut off circuit 5 prevents the send signal from appearing at the output of the differential circuit 6. The hybrid circuit 84 is coupled to the NCU 80 via the capacitors C1 and C2. The hybrid circuit 84 inputs the balanced signals from the telephone line and outputs unbalanced signals to the modem circuit 85. In addition, the hybrid circuit 84 inputs unbalanced signals from the modem circuit 85 and outputs balanced signals to the telephone line.

When receiving the signal from the telephone line, the AC signal component of the received signal which is received from the telephone line via the NCU 80 is input to the differential circuit 6. The received signal is essentially comprised of balanced signals. The signal from the capacitor C1 is input to the non-inverting input terminal 10 of the differential circuit 6. The signal from the capacitor C2 is input to the inverting input terminal 11 of the differential circuit 6. The polarity of the signal input to the inverting input terminal 11 is inverted by taking the input signal from the non-inverting input terminal 10 as a reference voltage, and is output from the received signal output terminal 14. Accordingly, the input balanced signals are output from the differential circuit 6 as unbalanced signals.

When transmitting the signal to the telephone line, the send signal (unbalanced signals) which is converted into the analog form in the modem circuit 85 is input to the send signal input terminal 15 of the operational amplifier 17 within the differential circuit 7, and the polarity of the send signal is inverted before being output from the inverted signal output terminal 12. In addition, the output of the operational amplifier 17 is input to the inverting input terminal of the operational amplifier 18, and the polarity of this output is inverted before being output from the non-inverting output terminal 13. The signal is output from the non-inverting output terminal 13 with the same phase as the signal input to the send signal input terminal 15. The outputs of the operational amplifiers 17 and 18 are passed through the capacitors C1 and C2 as balanced signals and are output to the telephone line via the NCU 82.

Figure 25:
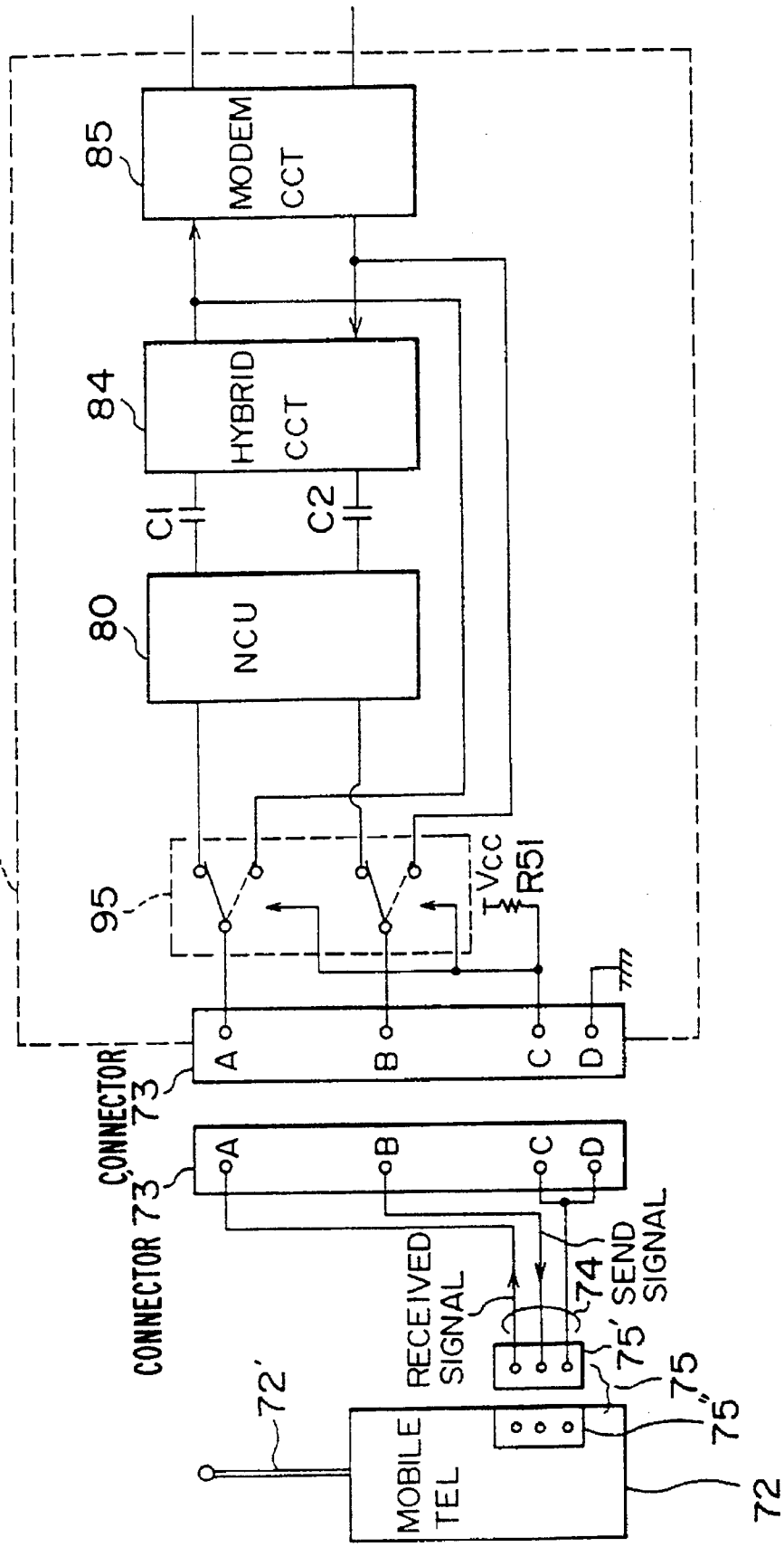
FIG. 25 is a system block diagram showing an essential part of a fifth embodiment of the modem unit according to the present invention.

FIG. 25 shows an essential part of a fifth embodiment of the modem unit according to the present invention. In FIG. 25, those parts which are the same as those corresponding parts in FIG. 19 are designated by the same reference numerals, and a description thereof will be omitted.

In this embodiment, a modem IC card 71A is provided with a switch 95 which switches the connection between a case where the input signal of the modem IC card 71A is input to the NCU 82 (that is, to connect to the telephone line) and a case where the input signal of the modem IC card 71A is input to the modem circuit 85 (that is, to connect to the mobile telephone 72).

When making the data communication via the mobile telephone 72, the connecting cable 74 connects the modem IC card 71A and the mobile telephone 72, and the connection of the switch 95 is switched so as to connect the terminals A and B of the connector 73 to the modem circuit 85. When making the data communication via the telephone line 255, a connecting cable such as the connecting cable 74A shown in FIG. 21 is used to connect the modem IC card 71A to the telephone line 255. In this case, the connection of the switch 95 is switched so as to connect the terminals A and B of the connector 73 to the NCU 82.

Figure 26:
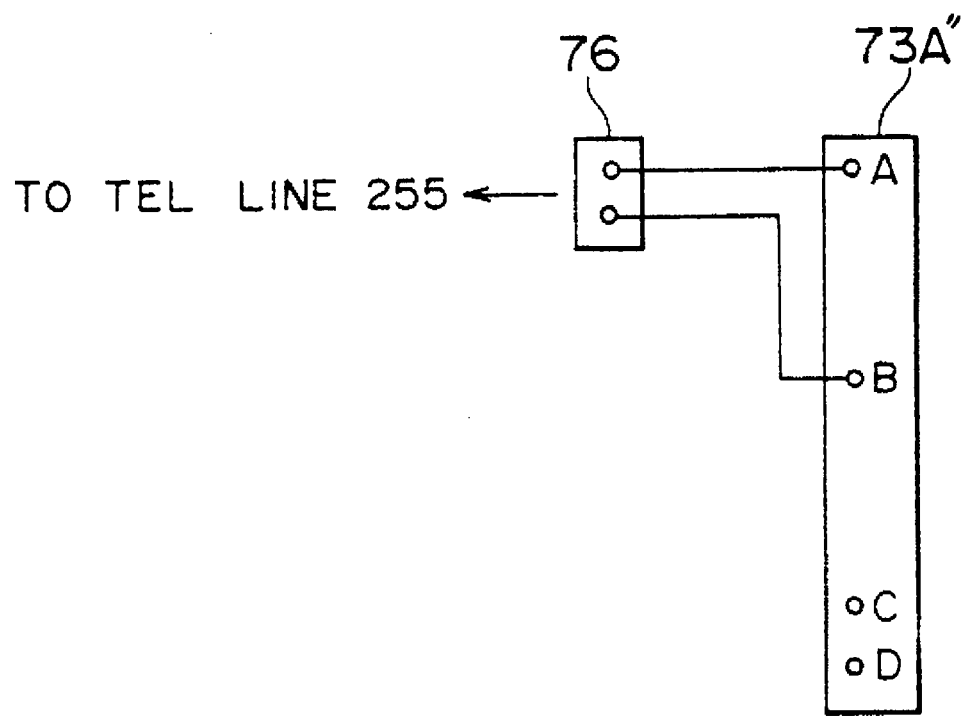
FIG. 26 shows an embodiment of a connecting cable used in the fifth embodiment.

FIG. 26 shows an embodiment of the connecting cable which is used to connect the modem IC card 71A to the telephone line 255. In FIG. 26, those parts which are the same as those corresponding parts in FIG. 21 are designated by the same reference numerals, and a description thereof will be omitted. In FIG. 26, a connector 73A" has four terminals A, B, C and D corresponding to the terminals A, B, C and D of the connector 73 of the modem IC card 71A.

According to the fourth and fifth embodiments, it is possible to easily make a data communication using the personal computer and the mobile telephone, even at a location where no telephone line is available. In addition, the connection of the modem IC card to the mobile telephone or to the telephone line can be easily achieved by changing the connecting cable. Further, it is also possible to provide a switch in the modem IC card so that the same connecting cable may be used to connect the modem IC card to the mobile telephone or to the telephone line by merely switching the connection of the switch. Moreover, the connections of the modem IC card to the mobile telephone and the telephone line can both be realized using a connector having a small number of terminals.

There are modem units which can be connected to an external unit having functions different from the original functions of the modem unit. But the modem unit must form a DC loop circuit with the telephone line in the off-hook state, so that the off-hook of the terminal equipment can be detected at the central office from the current change caused by the off-hook. The DC current which flows to this DC loop circuit must be in the range of 20 to 120 mA according to the standard, for example. Hence, it is necessary to conform to this standard also when the external unit is connected to the modem unit.

Figure 27:
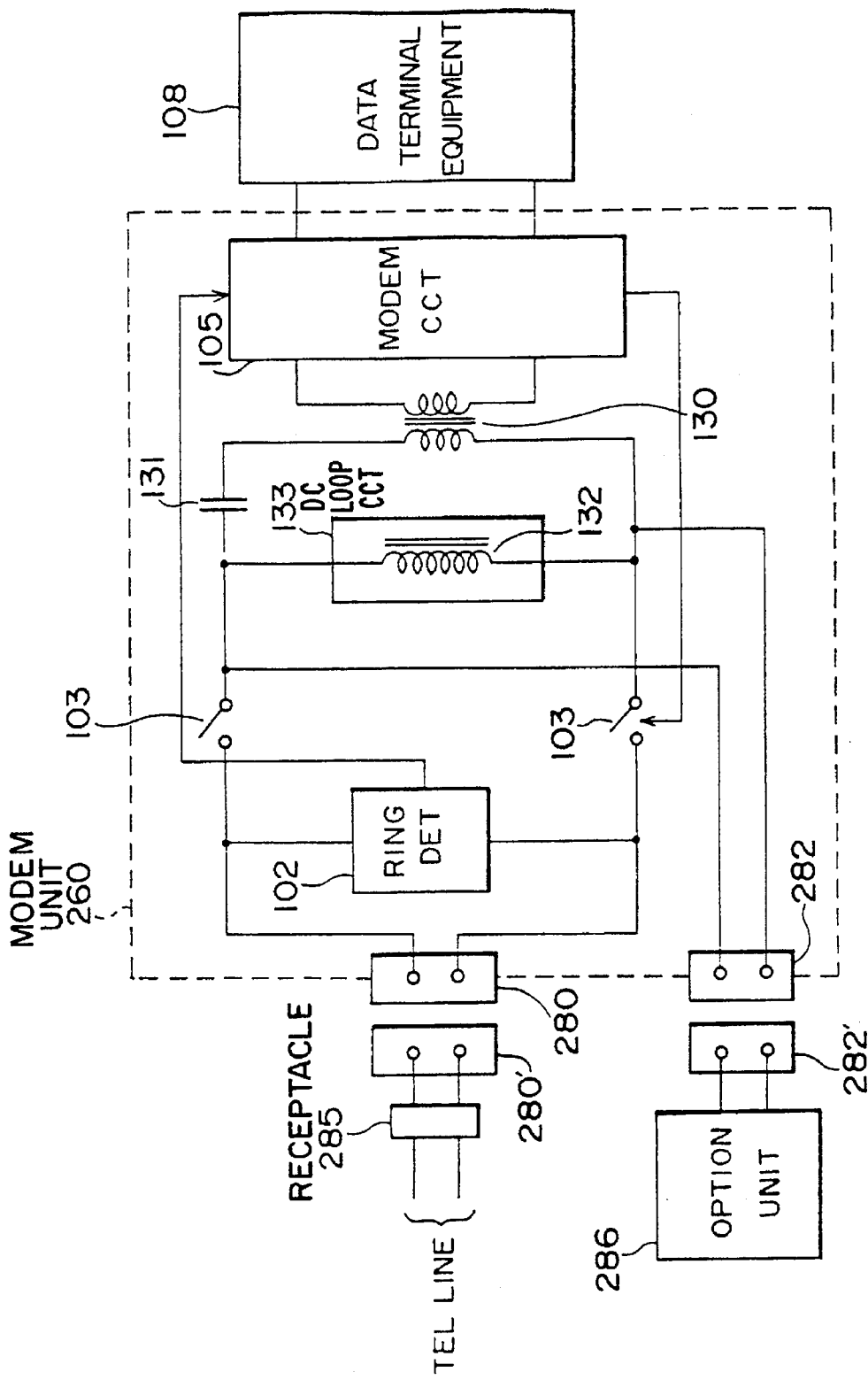
FIG. 27 is a system block diagram showing a conceivable modem unit which is connectable to an external unit.

FIG. 27 shows a conceivable modem unit which is connectable to an external or option unit. In FIG. 27, those parts which are the same as those corresponding parts in FIG. 18 are designated by the same reference numerals, and a description thereof will be omitted.

In FIG. 27, the connector 280 is integrally formed on the modem unit 260. A connector 280' is connected to a connecting cable of a receptacle 285 which connects to the telephone line, and is connectable to the connector 280 of the modem unit 260. The receptacle 285 connects to a connector (not shown) of the telephone line. A connector 282 is integrally formed on the modem unit 260. A connector 282' is connected to an end of a connecting cable of an external or option unit 286, and is connectable to the connector 282 of the modem unit 260.

For example, the option unit 286 uses the power which is supplied from the telephone line and functions as an external power unit of the modem unit 260. In this case, the connector 282' of the option unit 286 is connected to the connector 282 of the modem unit 260, so as to connect the option unit 286 and the modem unit 260. But in this conceivable arrangement, the option unit 286 is connected in parallel to the DC loop circuit. For this reason, the impedance with respect to the telephone line becomes small, thereby making it impossible to conform to the standard described above.

A description will now be given of sixth through twelfth embodiments of the modem unit according to the present invention, in which the current value standard with respect to the telephone line can be satisfied even when the option unit is connected to the modem unit. In the sixth through twelfth embodiments, the DC loop circuit of the modem unit is disconnected from the telephone line when the option unit is connected to the modem unit, so that a resistance approximately the same as that of the DC loop circuit is achieved by an internal circuit of the option circuit. If the internal impedance of the option unit is relatively high, the DC loop circuit may remain connected to the telephone line.

First, a description will be given of the sixth embodiment, by referring to FIGS. 28(A) and 28(B). In FIGS. 28(A) and 28(B), those parts which are the same as those corresponding parts in FIG. 27 are designated by the same reference numerals, and a description thereof will be omitted.

In FIG. 28(A), only an essential part of a modem unit 301 is shown. The modem unit 301 integrally comprises a first connector 280 and a second connector 307. The connector 280' is connected to the telephone line via the receptacle 285. When the connector 280' is connected to the connector 280 of the modem unit 301, terminals A and B of the connector 280' respectively connect to terminals A and B of the connector 280. The terminals A and B of the connector 280 are respectively connected to wires L1 and L2 which connect to the DC loop circuit 133.

The connector 307 of the modem unit 301 includes a terminal C which is connected to the wire L1, a terminal D which is connected directly to the DC loop circuit 133, and a terminal E which is connected to the wire L2. A connector 307' is connected to the connector 307 of the modem unit 301 when connecting the option unit 309 to the modem unit 301. Terminals C and E of the connector 307' are connected to an internal circuit 309a of the option unit 309. This internal circuit 309a has an impedance which is approximately the same as that of the DC loop circuit 133. The terminals C, D and E of the connector 307' respectively connect to the terminals C, D and E of the connector 307 of the modem unit 301 when the connectors 307' and 307 are connected to each other.

FIG. 28(B) shows a connector 307" which is connected to the connector 307 of the modem unit 301 when no option unit is connected to the modem unit 301. This connector 307" also has terminals C, D and E; however, the terminals D and E are short-circuited by a short-circuit line SCL.

When connecting the modem unit 301 to the telephone line, the connector 280' is connected to the connector 280 of the modem unit 301. In addition, when connecting the option unit 309 to the modem unit 301, the connector 307' is connected to the connector 307 of the modem unit 301. As a result, a loop is formed. This loop starts from the telephone line and ends at the telephone line via the terminal A of the connector 280', the terminal A of the connector 280, the terminal C of the connector 307, the terminal C of the connector 307', the internal circuit 309a of the option unit 309, the terminal E of the connector 307', the terminal E of the connector 307, the terminal B of the connector 280 and the terminal B of the connector 280'. The DC loop circuit 133 is disconnected from the telephone line.

Accordingly, by setting the impedance of the internal circuit 309a of the option unit 309 so as to conform to the standard of the telephone line, it is possible to make the current flowing through the telephone line to conform to the standard even when the option unit 309 is connected to the modem unit 301.

In addition, when no option unit is connected to the modem unit 301, the connector 307" shown in FIG. 28(B) is connected to the connector 307 of the modem unit 301. As a result, a loop is formed. This loop starts from the telephone line and ends at the telephone line via the terminal A of the connector 280', the terminal A of the connector 280, the DC loop circuit 133, the terminal D of the connector 307, the terminal D of the connector 307", the short-circuit line SCL, the terminal E of the connector 307", the terminal E of the connector 307, the terminal B of the connector 280 and the terminal B of the connector 280'. Therefore, a current conforming to the standard flows through the telephone line.

A description will now be given of the operating principle of the seventh embodiment, by referring to FIGS. 29(A) and 29(B). In FIGS. 29(A) and 29(B), those parts which are the same as those corresponding parts in FIGS. 28(A) and 28(B) are designated by the same reference numerals, and a description thereof will be omitted.

When connecting the option unit 309 to the modem unit 301, a connector 280A is connected to the connector 280 of the modem unit 301 as shown in FIG. 29(A). As a result, the terminals A and B of the connector 280A are respectively connected to the terminals A and B of the connector 280, thereby connecting the modem unit 301 to the telephone line via the receptacle 285. In addition, terminals C, D and E of the connector 280A are respectively connected to the terminals C, D and E of the connector 280, thereby connecting the modem unit 301 to the option unit 309. Hence, similarly to the sixth embodiment shown in FIGS. 28(A) and 28(B), the DC loop of the telephone line is formed via the internal circuit of the option unit 309, and the DC loop circuit 133 is disconnected from the telephone line. For this reason, it is possible for a current which conforms to the standard, to flow through the telephone line by appropriately setting the impedance of the internal circuit within the option unit 309.

When an option unit is not connected to the modem unit 301, a connector 280B is connected to the connector 280 of the modem unit 301 as shown in FIG. 29(B). In this case, since the short-circuit line SCL short-circuits the terminals D and E of the connector 280B, the DC loop circuit 133 is connected to the telephone line and it is possible for a current which conforms to the standard to flow through the telephone line.

FIGS. 30(A) and 30(B) show the seventh embodiment in more detail. In FIGS. 30(A) and 30(B), those parts which are the same as those corresponding parts in FIGS. 27, 29(A) and 29(B) are designated by the same reference numerals, and a description thereof will be omitted.

FIG. 30(A) shows the case where an option unit is not connected to the modem unit 301, and FIG. 30(B) shows the case where the option unit 309 is connected to the modem unit 301.

In FIG. 30(A), the connector 280B is connected to the connector 280 of the modem unit 301 when connecting the telephone line to the modem unit 301 but not to an option unit. The connector 280B includes terminals which are connected to the telephone line via the receptacle 285, and terminals which are short-circuited by the short-circuit line SCL. Hence, when the connector 280B is connected to the connector 280, the modem unit 301 is automatically connected to the telephone line and the loop is formed via the short-circuit line SCL similarly as described above with reference to FIG. 28(B).

In FIG. 30(B), the connector 280A is connected to the connector 280 of the modem unit 301 when connecting the modem unit 301 to the telephone line and to the option unit 309. The connector 280A includes terminals which are connected to the telephone line via the receptacle 285, and terminals which are connected to the option unit 309. In this case, the loop is formed via the internal circuit of the option unit 309, similarly as described above with reference to FIG. 28(A).

A description will now be given of an eighth embodiment of the modem unit according to the present invention, by referring to FIG. 31. In FIG. 31, those parts which are the same as those corresponding parts in FIGS. 28(A) and 29(B) are designated by the same reference numerals, and a description thereof will be omitted. In this embodiment, it is assumed that the internal circuit of the option unit 309 has a high impedance.

In FIG. 31, a connector 280C is connected to the connector 280 of the modem unit 301. Terminals A and B of the connector 280C respectively connect to the terminals A and B of the connector 280, and terminals C, D and E of the connector 280C respectively connect to the terminals C, D and E of the connector 280. As a result, the modem unit 301 is connected to the telephone line via the terminals A and B and the receptacle 285. In addition, the modem unit 301 is connected to the option unit 309 via the terminals C, D and E. Because the terminals D and E of the connector 280C are short-circuited, both the option unit 309 and the DC loop circuit 133 are connected in parallel to the telephone line. However, the internal circuit of the option unit 309 has a high impedance. Therefore, the current flowing through the telephone line is determined by the DC loop circuit 133 and conforms to the standard.

If an option unit does not need to be connected to the modem unit 301, the connector 280B shown in FIG. 29(B) is connected to the connector 280 in place of the connector 280C.

A description will now be given of a ninth embodiment of the modem unit according to the present invention, by referring to FIG. 32. In FIG. 32, those parts which are the same as those corresponding parts in FIGS. 28(A) and 28(B) are designated by the same reference numerals, and a description thereof will be omitted. In this embodiment, the connecting cable of the receptacle is drawn out via the option unit.

In FIG. 32, a connector 280D is connected to the connector 280 of the modem unit 301. Terminals A and B of the connector 280D respectively connect to the terminals A and B of the connector 280, and terminals C, D and E of the connector 280C respectively connect to the terminals C, D and E of the connector 280. As a result, the modem unit 301 is connected to the telephone line via the terminals A and B, the option unit 309 and the receptacle 285. More specifically, the receptacle 285 is connected to the option unit 309. In addition, the modem unit 301 is connected to the option unit 309 via the terminals C, D and E. In this embodiment, the signal at the terminal A is the same as the signal at the terminal C, and thus, it is possible to use a single terminal in common as the terminals A and C. The current flowing through the telephone line is also determined by the DC loop circuit 133 and conforms to the standard, similarly to the above-described embodiment.

If an option unit does not need to be connected to the modem unit 301, the connector 280B shown in FIG. 29(B) is connected to the connector 280 in place of the connector 280D.

A description will now be given of a tenth embodiment of the modem unit according to the present invention, by referring to FIG. 33. In FIG. 33, those parts which are the same as those corresponding parts in FIGS. 23, 28(A) and 28(B) are designated the same reference numerals, and a description thereof will be omitted.

In this embodiment, the pseudo inductance circuit (or DC loop circuit) 92 is comprised of active elements, and the input side of the pseudo inductance circuit 92 is connected to the connector 280.

If an option unit is not to be connected to the modem unit 301, the terminals C and D of the connector 280 are short-circuited. Hence, the DC voltage on the telephone line is divided by the resistors R44 and R45 and applied to the transistors TR1 and TR2 as the bias voltage. As a result, an approximately constant current flows in a loop circuit which starts from the telephone line and ends at the telephone line via the diode D1 of the diode bridge 22, the transistor TR1, the transistor TR2, the resistor R46 and the diode D4 of the diode bridge 22 or, via the diode D2 of the diode bridge 22, the transistor TR1, the transistor TR2, the resistor R46 and the diode D3 of the diode bridge 22.

When connecting the option unit to the modem unit 301, the terminals C and E of the connector 280 are connected to the option unit and the terminals C and D of the connector 280 are open-circuited. Of course, the terminals C and D of the connector 280 may be short-circuited if the internal circuit of the option unit has a high impedance. As a result, no current flows to the resistors R44 and R45, and the base voltage of the transistor TR1 becomes equal to the emitter voltage of the transistor TR2, and no current flows to the transistors TR1 and TR2.

A description will now be given of an eleventh embodiment of the modem unit according to the present invention, by referring to FIG. 34. In FIG. 34, those parts which are the same as those corresponding parts in FIG. 33 are designated by the same reference numerals, and a description thereof will be omitted.

In this embodiment, the pseudo inductance circuit (or DC loop circuit) 92 is comprised of active elements, and the output side of the pseudo inductance circuit 92 is connected to the connector 280.

If an option unit is not to be connected to the modem unit 301, the terminals C and D of the connector 280 are short-circuited. Hence, the pseudo inductance circuit 92 operates similarly to the tenth embodiment.

When connecting the option unit to the modem unit 301, the terminals C and E of the connector 280 are connected to the option unit and the terminals C and D of the connector 280 are open-circuited. Of course, the terminals C and D of the connector 280 may be short-circuited if the internal circuit of the option unit has a high impedance. As a result, the outputs of the transistors TR1 and TR2 are disconnected from the telephone line, and the telephone line and the option unit are connected. By setting the resistances of the resistors R44 and R45 to sufficiently high resistances, the current flowing through these resistors R44 and R45 becomes negligible.

A description will now be given of a twelfth embodiment of the modem unit according to the present invention, by referring to FIG. 35. In FIG. 35, those parts which are the same as those corresponding parts in FIGS. 19, 24 and 28 are designated by the same reference numerals, and a description thereof will be omitted.

In FIG. 35, the terminals A and B of the connector 280 of the modem unit 301 are respectively connected to the telephone line. When an option unit is not connected, the terminals D and E of the connector 280 are short-circuited, and the telephone line is connected to the pseudo inductance circuit 83. When connecting the option unit to the modem unit 301, the terminals C and E of the connector 280 are connected to the option unit, and the terminals D and E are open-circuited. Alternatively, if the internal circuit of the option unit has a high impedance, the terminals D and E of the connector 280 may be short-circuited.

The operation of the modem unit 301 at the time of the signal reception and signal transmission is basically the same as that described above.

Therefore, according to the sixth through twelfth embodiments, it is possible to automatically control the current flowing through the telephone line so as to conform to the standard when the off-hook is detected, even if the option unit is connected to the modem unit. In addition, the flexibility of the modem unit is greatly improved particularly when the entire modem unit is made in the form of the IC, that is, the modem IC card.

The advantages of the modem IC card having the entire modem unit made in the form of the IC have been described above. But when using the modem IC card with a portable data processing unit, for example, it is important that the power consumption of the modem IC card is small, particularly when the modem IC card is battery-operated. More specifically, it is desirable that the power consumption of the modem IC card is small so that the modem IC card can be used for a long time without the need to replace or charge the battery thereof.

A description will now be given of the problems of the conventional battery-operated modem unit, by referring to FIG. 36.

In FIG. 36, a modem unit 480 is connected between the telephone line and a terminal equipment 481 such as a portable personal computer. The modem unit 480 modulates send data which is output from the terminal equipment 481 into an analog signal, and transmits the analog signal to a remote end via the telephone line. In addition, the modem unit 480 demodulates analog received data which is received from the remote end via the telephone line into digital data, and supplies the digital data to the terminal equipment 481.

The modem unit 480 includes an oscillator 482, a power unit 483 which is a battery in this case, and a modem processor 484. The modem processor 484 is comprised of a modem controller 485 and a modem circuit 486.

The oscillator 482 generates clock pulses for driving the modem processor 484. The power unit 483 supplies the driving power to the modem processor 484. The modem processor 484 modulates the send data and demodulates the received data in response to the clock pulses generated from the oscillator 482.

The modem controller 485 controls the input and output of the send data and the received data, and also controls the modulation and demodulation. The modem controller 485 includes a clock pulse input terminal CLK for receiving the clock pulses, a power source voltage input terminal Vcc for receiving the power source voltage, an input terminal SD for receiving the send data from the terminal equipment 481, and an output terminal RD for outputting the demodulated received data.

The modem circuit 486 includes a modem and a processor. The modem modulates the send data in response to the clock pulses, and also demodulates the received data in response to the clock pulses. The processor executes predetermined processing on the data such as error correction, data compression and data expansion depending on the communication mode determined by the communication between the terminal equipment 481 and the terminal equipment (not shown) on the remote end.

However, conventionally, the frequency of the clock pulses generated from the oscillator 482 was fixed. Hence, although it is possible to reduce the power consumption of the modem unit 480 by decreasing the frequency, the processing speed of the modem unit 480 will deteriorate in this case. For this reason, the frequency of the clock pulses is set to a frequency which is as high as possible.

It is conceivable to obtain the power for the modem unit 480 from the telephone line. However, the power which can be obtained from the telephone line is small, and an LSI which can operate at such a small power only has a communication speed of approximately 1200 bps at the maximum. However more recent modem units generally operate at the communication speed of 2400 bps and requires functions such as self-error correction, data compression/ expansion. Consequently, it is virtually impossible to satisfactorily drive such a modem unit by the power obtained from the telephone line.

It is also conceivable to have the terminal equipment carry out the functions such as self-error correction and data compression/expansion, but this would only shorten the life of the battery which drives the terminal equipment.

A description will now be given of the operating principle of thirteenth and fourteenth embodiments of the modem unit according to the present invention, by referring to FIG. 37. In these embodiments, the modem unit is normally driven by high-frequency clock pulses when the power source voltage of the modem unit is sufficiently high. However, if the power source voltage decreases, the frequency of the clock pulses is decreased automatically so as to operate at a lower power consumption. It is also possible to simplify the processes by eliminating the error correction function, for example. The modem unit on the remote end is notified of the mode of the modem unit, so that the communication can be made according to the mode.

In FIG. 37, a modem unit 501 has the form of the modem IC card and is loaded into a terminal equipment 506 which may be a portable personal computer. Of course, the modem unit 501 in principle may be connected externally to the terminal equipment 506.

The modem unit 501 generally includes a battery 515, a power source voltage detection circuit 502, a voltage holding circuit 503, a clock generator 504, and a modem processor 507.

The battery 515 may be built into the modem unit 501 or may be the power unit of the terminal equipment 506 in the case where the modem unit 501 is loaded into the terminal equipment 506. For the sake of convenience, it will be assumed that the battery 515 is built into the modem unit 501.

The voltage detection circuit 502 detects the voltage state of the battery 515. The voltage holding circuit 503 holds a voltage state value indicative of the voltage level detected by the voltage detection circuit 502. The clock generator 504 generates clocks having different frequencies. The clock generator 504 includes a clock frequency selector 505 which selects the clock frequency at which the modem unit 501 is to operate. The modem processor 507 carries out processes such as error correction, data compression and data expansion in addition to modulating the send data and demodulating the received data.

The modem processor 507 includes a modem controller 516, a function processor 511 and a modem 509. The modem controller 516 includes a modem function determination circuit 508 and a message send circuit 514, and carries out the control functions of the modem unit 501. The modem function determination circuit 508 determines the function to be processed by the modem unit 501. The function processor 511 includes an error correction circuit 512 and a data compression/expansion circuit 513, and carries out functions other than modulation and demodulation, such as error correction and data compression/expansion. The error correction circuit 512 corrects the error in the data, and the data compression/expansion circuit 513 compresses and expands the data. The modem 509 includes a switching circuit 510 which switches the communication path to the remote end from the terminal equipment 506 to the modem function determination circuit 506 when notifying the mode of the modem unit 501 to the terminal equipment on the remote end. This mode indicates the selected functions such as the communication speed and error correction.

The voltage detection circuit 502 constantly monitors the voltage from the battery 515, and outputs a voltage state value indicative of the detected voltage level. The voltage holding circuit 503 holds this voltage state value. The clock generator 504 selects the clock frequency which is used to drive the modem unit 501 depending on the voltage state value held in the voltage holding circuit 503. If the voltage level of the battery 515 is sufficiently high, the clock generator 504 selects a high clock frequency. The clock generator 504 selects a low clock frequency if the voltage level of the battery 515 is low. The modem processor 507 operates responsive to the clock pulses having the clock frequency which is selected by the clock frequency selector 505 of the clock generator 504.

The modem function determination circuit 508 selects the required function or functions depending on the voltage state value and the function request information from the terminal equipment 506. For example, if the voltage level of the battery 515 is sufficiently high, it is possible to satisfy all of the required functions requested from the terminal equipment 506, and these functions are selected. If the voltage level of the battery 515 is low, the processing in the modem processor 509 is simplified so that a high-speed process can be carried out even in response to the low-clock frequency. More specifically, if the terminal equipment 506 requests the error correction and the data compression/expansion, the modem function determination circuit 508 determines whether to carry out only the error correction, to carry out only the data compression/expansion or not to carry out the error correction and the data compression/expansion, for example. If one of the error correction and the data compression/expansion is to be selected, the error correction is selected with a priority over the data compression/expansion.

Prior to starting the communication, the modem function determination circuit 508 notifies the remote end of the determined processing function via the switching circuit 510 and the telephone line, so as to set the communication mode. In addition, the modem function determination circuit 508 also notifies the terminal equipment 506 of the set mode. The terminal equipment 506 makes the data communication with the terminal equipment on the remote end in accordance with the mode which is set by the modem unit 501.

The function processor 511 inputs the function request information from the remote end via the switching circuit 510, and determines the function. In addition, based on the function request information from the terminal equipment 506, the function processor 511 supplies the processable function which is determined by the modem unit 501 depending on the voltage state value to the terminal equipment 506 via the message sending circuit 514.

If a low function request is made from the terminal equipment 506 when the voltage level of the battery 515 is sufficiently high, that is, if the instruction from the terminal equipment 506 indicates that error correction and data compression/expansion are not required, for example, the communication can be made at a sufficiently high speed even in response to low-frequency clock pulses. Hence, in this case, the modem function determination circuit 508 instructs the clock frequency selector 505 to select the low clock frequency, so as to extend the serviceable life of the battery 515.

The modulation and demodulation operations of the modem 509 are the same as those of the conventional modem unit. In addition, the operations of the data compression/expansion circuit 513 and the error correction circuit 512 are the same as those of the conventional modem unit, except that the processing by the data compression/expansion circuit 513 and the error correction circuit 512 are started in response to an instruction from the function determination circuit 508.

According to these embodiments, the modem unit 501 can operate even when the voltage level of the battery 515 decreases. In addition, the deterioration in the processing quantity caused by the decreased clock pulse frequency is compensated for by reducing the functions to be carried out, so as to enable a high-speed communication even when the clock pulse frequency is low. Furthermore, since the function selection can be accomplished in steps, it is possible to carry out as many functions as possible depending on the voltage level of the battery 515.

Moreover, if the terminal equipment 506 does not request high functions in a state where the voltage level of the battery 515 is high, it is possible to select the low clock pulse frequency so as to prevent unnecessary wear of the battery 515.

Of course, it is possible to operate only the modem controller 516 in response to the clock pulses which are selected by the clock frequency selector 505, and operate the modem 509 in response to basic clock pulses.

A more detailed description will now be given of the thirteenth embodiment, by referring to FIG. 38. In FIG. 38, a modem unit 520 and a terminal equipment 530 respectively correspond to the modem unit 501 and the terminal equipment 506 shown in FIG. 37. In addition, a battery 521, a voltage detection circuit 522, a voltage state value holding circuit 524, a clock generator 525 and a modem processor 527 shown in FIG. 38 respectively correspond to the battery 515, the voltage detection circuit 502, the voltage state value holding circuit 503, the clock generator 504 and the modem processor 507 shown in FIG. 37. In this embodiment, a modem controller 528 of the modem processor 527 is driven by clock pulses which are selected depending on the voltage level of the battery 521. In addition, a modem 529 of the modem processor 527 is driven by basic clock pulses. This modem 529 is provided on an LSI which is independent of an LSI on which the remaining parts of the modem unit 520 are provided.

The voltage detection circuit 522 includes voltage comparators 523, 523' and 523". The voltage comparator 523 compares the power source voltage from the battery 521 and a threshold value TH1, so as to detect the state of the power source voltage. For example, the voltage comparator 523 outputs a signal "1" if the power source voltage is higher than the threshold value TH1 and outputs a signal "0" if lower. Similarly, the voltage comparator 523' compares the power source voltage and a threshold value TH2, so as to detect the state of the power source voltage. The voltage comparator 523" compares the power source voltage and a threshold value TH3, so as to detect the state of the power source voltage.

The voltage holding circuit 524 holds the state of the power source voltage as the voltage state value depending on the outputs of the voltage comparators 523, 523' and 523". For example, if the threshold values are such that TH1>TH2>TH3, the voltage state value is set to "011" when the power source voltage is lower than TH1 and higher than TH2. In this case, the state of the power source voltage can be held as a voltage state value having three stages.

A reset signal RST is supplied to the voltage state value holding circuit 524 and to the modem controller 528.

The clock generator 525 includes an oscillator 525' and a frequency divider 526. The oscillator 525' generates basic clock pulses having a maximum clock pulse frequency of 30 MHz, for example. The frequency divider 526 frequency-divides the frequency of the basic clock pulses output from the oscillator 525' depending on the voltage state value which is held by the voltage state value holding circuit 524. For example, the frequency divider 526 generates clock pulses having clock frequencies of 30/n MHz, where n denotes the frequency dividing ratio.

The modem processor 527 includes the modem controller 528, the modem 529 and a function processor 529'.

The frequency divider 526 determines the frequency dividing ratio of the basic clock pulses depending on the voltage state value which is held in the voltage state holding circuit 524, and outputs the clock pulses having the frequency-divided frequency. For example, if the voltage level of the battery 521 is sufficiently high, the voltage state value is large, and the basic clock pulses having the frequency of 30 MHz are selectively output from the frequency divider 526 in this case. However, if the voltage level of the battery 521 decreases, the voltage state value decreases, and the clock pulses having the frequency of 20 MHz are output from the frequency divider 526. Hence, the clock pulses having the maximum operable frequency are selected and output from the frequency divider 526 depending on the voltage level of the battery 521, i.e., the power source voltage level.

The voltage state value from the voltage state value holding circuit 524 is input to the input port of the modem controller 528. The modem controller 528 compares this voltage state mode and the function request from the terminal equipment 530, and sets the most appropriate operation mode, that is, the mode in which the most appropriate function process is selected.

The modem controller 528 and the function processor 529' operate responsive to the clock pulses determined by the frequency divider 526. The modem 529 operates responsive to the basic clock pulses which have the frequency of 30 MHz and are output from the oscillator 525'.

A description will now be given of an embodiment of the modem processor 527, by referring to FIG. 39. In FIG. 39, those parts which are the same as those corresponding parts in FIG. 38 are designated by the same reference numerals, and a description thereof will be omitted.

The modem controller 528 includes registers 540 and 541, a register comparator 542, a register 543, a function determination circuit 544, a command analyzer 545 and a message sending circuit 546. The modem 529 includes a switching circuit 547. The function processor 529' includes an error correction circuit 548 and a data compression/expansion circuit 549.

In the modem controller 528, the register 540 stores the function request information which is received from the terminal equipment 530 via the command analyzer 545. The register 541 stores the voltage state value input from the voltage state value holding circuit 524. The register comparator 542 compares the contents of the registers 540 and 541. The register 543 stores the comparison result output from the register comparator 542.

The function determination circuit 544 determines the function which is to be processed in the modem unit 520 depending on the content of the register 543. The error correction circuit 548 and the data compression/expansion circuit 549 are turned ON/OFF, that is, controlled to active/inactive state, depending on the determination result of the function determination circuit 544. The command analyzer 545 analyzes the function request information from the terminal equipment 530. In addition, when the command analyzer 545 receives from the terminal equipment 530, a query command of the function process which is determined by the function determination circuit 544, the command analyzer 545 commands the message send circuit 546 to transfer a message related to this function.

The message send circuit 546 stores the information read out from the register 543 and sends this information to the terminal equipment 530 depending on the function to be processed, determined by the function determination circuit 544 or depending on the function information query command from the terminal equipment 530.

A description will now be given of the operation of the system shown in FIG. 39. The frequency divider 526 outputs the clock pulses with frequencies dependent on the voltage state value, and then supplies them to the modem controller 528. The voltage state value held in the voltage state holding circuit 524 is input to the register 541 via the input port of the modem processor 527. The function request command from the terminal equipment 530 is input to the command analyzer 545, and the analyzed command is stored in the register 540. The register comparator 542 compares the values stored in the registers 540 and 541, and stores the comparison result in the register 543.

For example, the register comparator 542 compares the voltage state value and the request value which is determined depending on the request from the terminal equipment 530. This request value has a large value when the function request is large such as the case where both the error correction and data compression/expansion are requested, and is small when the function request is small, such as the case where there is no function request and both the error correction and data compression/expansion are unnecessary. The register comparator 542 selects the larger value and stores this value into the register 543.

The function determination circuit 544 determines the function to be processed depending on the value stored in the register 543, and selects the function of the function processor 529'. If the error correction is required, the function determination circuit 544 turns ON a start signal which is supplied to the error correction circuit 548, and the function determination circuit 544 otherwise turns this start signal OFF. In addition, if the data compression/expansion is required, the function determination circuit 544 turns ON a start signal which is supplied to the data compression/expansion circuit 549, and the function determination circuit 544 otherwise turns this start signal OFF.

Prior to creating the data communication, it is necessary to notify the terminal equipment on the remote end, of the functions of the terminal equipment 530. Hence, the switching circuit 547 switches the communication path from the path to the telephone line to the path from the terminal equipment 530 to the function determination circuit 544. The function determined by the function determination circuit 544 is notified to the remote end, and the remote end carries out control so as to make the processing by the same function. Such a control may be realized according to the CCITT Recommendations V.42/42bis. The function determination circuit 544 notifies the terminal equipment 530 of the function determined as a result of the communication with the remote end, as an indication message.

The function determination circuit 544 also inputs the function request information from the remote end via the switching circuit 547, and determines the function.

In this state, the terminal equipment 530 cannot confirm whether the message which is received as the indication message is caused by the active selection of the modem unit 520 or by an erroneous operation. Hence, the function determination circuit 544 sends to the message send circuit 546, a function selection message which indicates that the indication message is caused by the active selection of the function determination circuit 544. The message end circuit 546 sends this function selection message to the terminal equipment 530.

When the command analyzer 545 receives from the terminal equipment 530, a query command of a function which can be processed by the modem unit 520, the command analyzer 545 reads the value stored in the register 543 into the message send circuit 546. The message send circuit 546 then sends the content of the register 543 to the terminal equipment 530.

A more detailed description will now be given of the fourteenth embodiment, by referring to FIGS. 40 and 41. FIG. 40 shows the fourteenth embodiment, and FIG. 41 shows an embodiment of the modem controller 528 shown in FIG. 40. In FIGS. 40 and 41, those parts which are the same as those corresponding parts in FIGS. 38 and 39 are designated by the same reference numerals, and a description thereof will be omitted.

In this embodiment, a determination result which is related to the function to be processed and is made in the function determination circuit 544 of the modem controller 528, is reflected to the selection of the frequency dividing ratio in the frequency divider 526. More specifically, the voltage state value holding circuit 524 includes a voltage state value selection circuit 524' which selects a voltage state value corresponding to the determination result made in the function determination circuit 544. The selected voltage state value is supplied to the frequency divider 526.

If the power source voltage is high and the voltage state value is large, the content of the register 543 is reflected to the selection of the frequency dividing ratio of the frequency divider 526 when the request value from the terminal equipment 530 is small.

More specifically, the voltage state value selection circuit 524' compares the value of the register 543 referred to by the function determination circuit 544 and the value which is input to the voltage state value holding circuit 524 from the voltage detection circuit 522. If the value of the register 543 is smaller than the voltage state value detected by the voltage detection circuit 522, the content of the register 543 is selected and output from the frequency divider 526. The frequency divider 526 outputs clock pulses having a low frequency depending on the function which is determined by the function determination circuit 544. As a result, if the power source voltage is sufficiently high and the function request from the terminal equipment 530 is small, the clock pulse frequency is kept low so as to prevent unnecessary wear of the battery 521. Otherwise, the operation of this embodiment is basically the same as that of the fourteenth embodiment.

Therefore, according to the thirteenth and fourteenth embodiments, the communication will not be disabled immediately when the power source voltage of the modem unit decreases. Instead, the functions of the modem unit are automatically adjusted so that the communication can be continued with the reduced power source voltage, and the communication can be made at a low power consumption. Accordingly, the modem unit can be used for a longer period of time after the power source voltage begins to decrease.

Further, the present invention is not limited to these embodiments, but various variations and modifications may be made without departing from the scope of the present invention.

What is claimed is:

1. A modem unit adapted to be coupled between a land or radio telephone line and a terminal equipment, said modem unit comprising:

modem circuit means, coupled to the terminal equipment, for modulating data received from the terminal equipment and for demodulating data transmitted to the terminal equipment;

isolation means, coupled to said modem circuit means, for providing a DC isolation between the telephone line and the terminal equipment, said modem circuit means and said isolation means respectively provided on a single modem IC card; and said isolation means including capacitor means, coupled to the telephone line, for cutting off a DC current from the telephone line and for passing an AC signal from the telephone line; and the modem unit further comprises:

a first differential circuit comprising:

a non-inverting input terminal which receives a first received signal from one wire of the telephone line via the capacitor means;

an inverting input terminal which receives a second received signal from the other wire of the telephone line via the capacitor means; and an output terminal which supplies an output analog signal to said modem circuit means, wherein the analog signal is converted into a digital signal which is transmitted to the terminal equipment; and a second differential circuit comprising:

an input terminal which receives a digital signal originating from the terminal equipment, said modem circuit means converting the digital signal into an analog input signal; and a pair of output terminals which supply a first analog signal having a polarity inverted with respect to the analog input signal and a second analog signal having the same polarity as the analog input signal to the telephone line via the capacitor means.

2. The modem unit as claimed in claim 1, wherein the first differential circuit inputs balanced signals and outputs unbalanced signals, and the second differential circuit inputs unbalanced signals and outputs balanced signals.

3. The modem unit as claimed in claim 1, which further comprises cut off circuit means, coupled between the capacitor means and the first differential circuit, for cutting off a signal output from the second differential circuit so that said signal is prevented from being input to the first differential circuit.

4. The modem unit as claimed in claim 1, wherein the first differential circuit includes an operational amplifier, and the second differential circuit includes two operational amplifiers which are coupled in series.

5. The modem unit as claimed in claim 1, which further comprises pseudo inductance circuit means including a loop circuit, for bypassing a DC current from the telephone line, said pseudo inductance circuit means being comprised of active elements.

6. A modem unit adapted to be coupled between a land or radio telephone line and a terminal equipment, said modem unit comprising:

modem circuit means, coupled to the terminal equipment, for modulating data received from the terminal equipment and for demodulating data transmitted to the terminal equipment;

isolation means, coupled to said modem circuit means, for providing a DC isolation between the telephone line and the terminal equipment, said modem circuit means and said isolation means respectively provided on a single modem IC card;

network control means having terminals for coupling to the telephone line;

connector means having first terminals for coupling to the telephone line, said first terminals being coupled to the terminals of said network control means, said isolation means including hybrid circuit means for coupling the telephone line and said modem circuit means with respect to an AC signal; and said connector means further including a pair of second terminals which are coupled to said hybrid circuit means and a third terminal which is coupled to said network control means, said second and third terminals being connected to an external unit, one of said second terminals and said third terminal being short-circuited when no external unit is coupled to the modem unit.

7. The modem unit as claimed in claim 6, wherein the external unit includes an internal circuit which has an internal impedance approximately equal to that of a DC loop formed by the modem unit, said second terminals coupling to the internal circuit, said one of the second terminals and the third terminal being open-circuited.

8. A modem unit adapted to be coupled between a land or radio telephone line and a terminal equipment, said modem unit comprising:

modem circuit means, coupled to the terminal equipment, for modulating data received from the terminal equipment and for demodulating data transmitted to the terminal equipment;

isolation means, coupled to said modem circuit means, for providing a DC isolation between the telephone line and the terminal equipment, said modem circuit means and said isolation means respectively provided on a single modem IC card;

network control means having terminals for coupling to the telephone line;

connector means having first terminals for coupling to the telephone line, said first terminals being coupled to the terminals of said network control means, said isolation means including hybrid circuit means for coupling the telephone line and said modem circuit means with respect to an AC signal; and said connector means further including a pair of second terminals which are coupled to said hybrid circuit means and a third terminal which is coupled to said network control means, said second and third terminals being connected to an external unit, one of said second terminals and said third terminal being short-circuited when said connector means is coupled to the external unit which has a high impedance.

9. A modem unit adapted to be coupled between a land or radio telephone line and a terminal equipment, said modem unit comprising:

modem circuit means, coupled to the terminal equipment, for modulating data received from the terminal equipment and for demodulating data transmitted to the terminal equipment;

isolation means, coupled to said modem circuit means, for providing a DC isolation between the telephone line and the terminal equipment, said modem circuit means and said isolation means respectively provided on a single modem IC card;

a battery for supplying power to various parts of the modem unit;

detection means, coupled to said battery, for detecting an output voltage level of said battery; and selection means, coupled to said detection means, for selecting a frequency of a clock which drives said modem circuit means depending on the voltage level detected by said detection means, said modem circuit means including determination means, coupled to said detection means, for determining a modem function of said modem circuit means based on the voltage level detected by said detection means and function request information specified from the terminal equipment.

10. The modem unit as claimed in claim 9, wherein said modem circuit means includes switching means, coupled to said determination means, for switching a communication path to the telephone line from the terminal equipment to said determination means so as to notify the modem function determined by said determination means to a terminal equipment on a remote end.

11. The modem unit as claimed in claim 9, wherein said modem circuit means includes send circuit means, coupled to said detection means, for notifying the terminal equipment of a modem function which can be processed depending on the voltage level detected by said detection means, said send circuit means notifying the modem function determined by said determination means prior to a start of a data communication or responsive to a request from the terminal equipment.

12. The modem unit as claimed in claim 9, wherein said selection means inputs function information determined by said determination means and selectively outputs a clock having a frequency lower than normal depending on the modem function if said determination means determines the modem function responsive to a request from the terminal equipment.

13. The modem unit as claimed in claim 9, wherein said modem circuit means comprises:

a modem which carries out modulation and demodulation of signals based on a basic clock;

a function processor, coupled to said modem, which carries out functions other than the modulation and demodulation; and a modem controller, coupled to said detection means, said selection means and said function processor, which controls said function processor, wherein said modem controller operates in response to a clock which is determined based at least one of on the voltage level detected by said detection means and the modem function determined by said determination means.

* * * * *

UNITED STATES PATENT AND TRADEMARK OFFICE
CERTIFICATE OF CORRECTION

PATENT NO. : 5,655,009
DATED : Aug. 5, 1997
INVENTOR(S) : ARAI et al.

It is certified that error appears in the above-identified patent and that said Letters Patent is hereby corrected as shown below:

Col. 23, line 61, change "29(B)" to --28(B)--.

Col. 33, line 41 (Claim 4, line 4), delete "which are".

Signed and Sealed this

Thirteenth Day of January, 1998

Attest:

BRUCE LEHMAN

*Attesting Officer*    *Commissioner of Patents and Trademarks*